(12) United States Patent
Diekfuss et al.

(10) Patent No.: US 10,810,873 B2
(45) Date of Patent: Oct. 20, 2020

(54) TRAFFIC SIGNAL AND SIGN SUPPORT STRUCTURES AND SYSTEM

(71) Applicant: P4 Infrastructure, Inc., Milwaukee, WI (US)

(72) Inventors: Joseph A. Diekfuss, Waukesha, WI (US); Christopher M. Foley, Milwaukee, WI (US)

(73) Assignee: P4 Infrastructure, Inc., Milwaukee, WI (US)

( * ) Notice: Subject to any disclaimer, the term of this patent is extended or adjusted under 35 U.S.C. 154(b) by 0 days.

(21) Appl. No.: 16/263,703

(22) Filed: Jan. 31, 2019

(65) Prior Publication Data
US 2019/0236944 A1    Aug. 1, 2019

Related U.S. Application Data

(60) Provisional application No. 62/624,478, filed on Jan. 31, 2018, provisional application No. 62/743,421, filed on Oct. 9, 2018.

(51) Int. Cl.
*G08G 1/00* (2006.01)
*G08G 1/095* (2006.01)
*E04H 12/22* (2006.01)
*F16M 13/02* (2006.01)

(52) U.S. Cl.
CPC ......... *G08G 1/095* (2013.01); *E04H 12/2253* (2013.01); *F16M 13/02* (2013.01)

(58) Field of Classification Search
CPC ............................ G08G 1/095; E04H 12/2253
USPC ....................................................... 340/907
See application file for complete search history.

(56) References Cited

U.S. PATENT DOCUMENTS

| | | | | |
|---|---|---|---|---|
| 3,645,057 A | * | 2/1972 | Kaplan ............... | E04H 12/2284 52/295 |
| 4,148,456 A | * | 4/1979 | Garchinsky ............... | G09F 7/18 248/219.4 |
| 5,340,069 A | * | 8/1994 | Niemeyer ............. | F21V 21/116 248/214 |

(Continued)

FOREIGN PATENT DOCUMENTS

WO    WO-2015085032 A1 *  6/2015   ............. H05B 47/19

OTHER PUBLICATIONS

Foley et al., "Structural Analysis of Sign Bridge Structures and Luminaire Supports," Research Report WHRP 04-03, Wisconsin Highway Research Program, Mar. 2004, 243 pages.

(Continued)

*Primary Examiner* — Ojiako K Nwugo
(74) *Attorney, Agent, or Firm* — Reinhart Boerner Van Deuren s.c.

(57)    ABSTRACT

Disclosed herein are embodiments of a traffic signal or sign support structure. The structure includes a vertical pole having a first end and a second end. The first end is configured to be mounted to a foundation. The structure also includes a mast arm arranged substantially horizontally relative to the vertical pole. The mast arm has a third end and a fourth end. Additionally, the structure includes a pole junction assembly configured to connect the third end of the mast arm to the second end of the pole. In particular, the mast arm and the pole are each joined to the pole junction assembly in an area of geometric continuity.

28 Claims, 36 Drawing Sheets

(56) References Cited

U.S. PATENT DOCUMENTS

| | | | |
|---|---|---|---|
| 6,685,154 B1* | 2/2004 | Blyth | E01F 9/696 248/219.1 |
| 7,523,912 B1* | 4/2009 | Woods | E01F 9/696 116/63 R |
| 2006/0033336 A1* | 2/2006 | Pulver | E01F 9/696 285/417 |
| 2007/0129158 A1* | 6/2007 | Watts | A63G 31/02 472/137 |
| 2012/0111682 A1* | 5/2012 | Andre | B60L 50/52 191/40 |

OTHER PUBLICATIONS

Foley et al., "Fatigue Risks in the Connections of Sign Support Structures," Research Report WHRP 0092-09-07, Wisconsin Highway Research Program, Feb. 2013, 204 pages.

Foley et al., "Reliability-Based Inspection Protocols for Mast-Arm Sign Support Structures," Journal of Structural Engineering, vol. 142, No. 7, American Society of Civil Engineers, Reston, VA, 2016, 10 pages.

Foley et al., "Detail Categories for Reliability-Based Fatigue Evaluation of Mast-Arm Sign Support Structures," Journal of Structural Engineering, vol. 142, No. 7, American Society of Civil Engineers, Reston, VA, 2016a, 9 pages.

Diekfuss et al., "Modeling Error Uncertainty Characterization for Reliability-Based Fatigue Assessment in Sign Support Structures", Journal of Structural Engineering, vol. 142, No. 7, American Society of Civil Engineers, Reston, VA, 2016b, 10 pages.

Roy et al., "Cost-Effective Connection Details for Highway Sign, Luminaire, and Traffic Signal Structures," Research Report NCHRP Project 10-70, Web-Only Document 176, National Cooperative Research Program, Transportation Research Board, Mar. 2011, 236 pages.

* cited by examiner

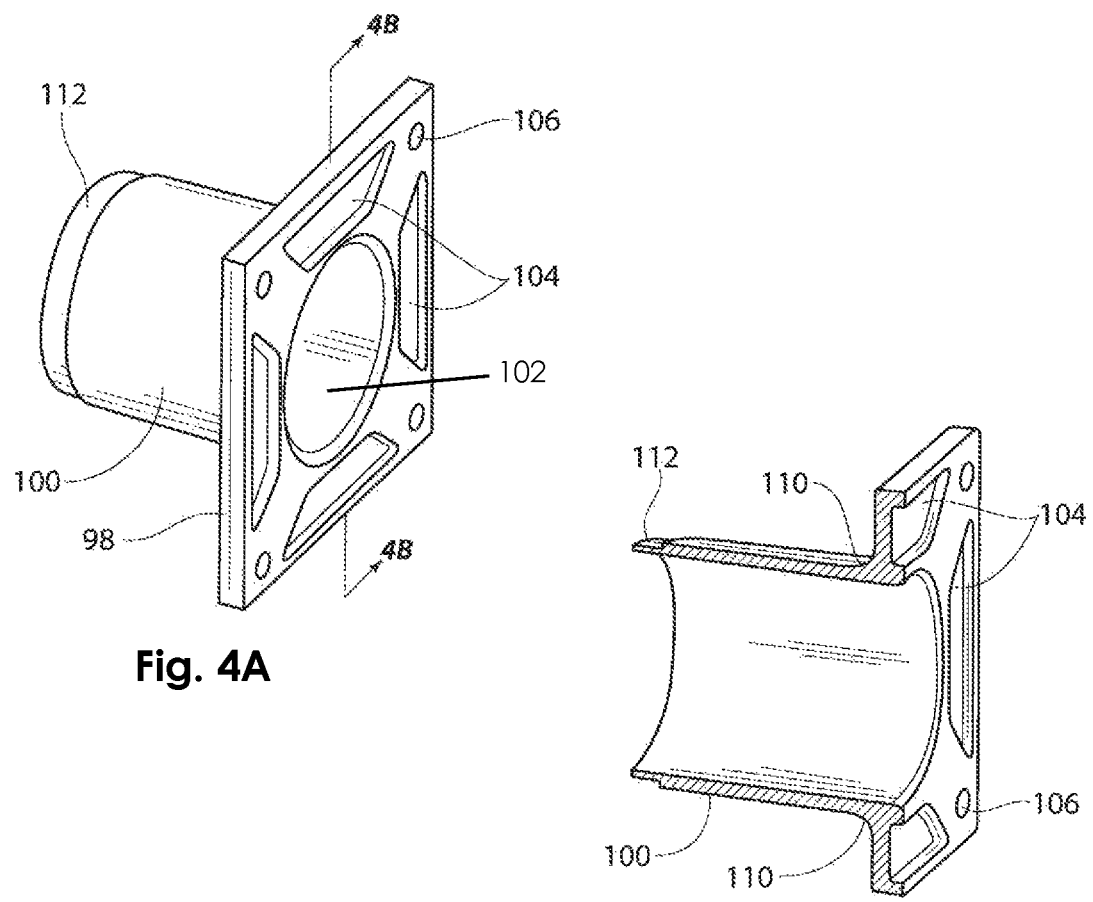
Fig. 4A
Fig. 4B
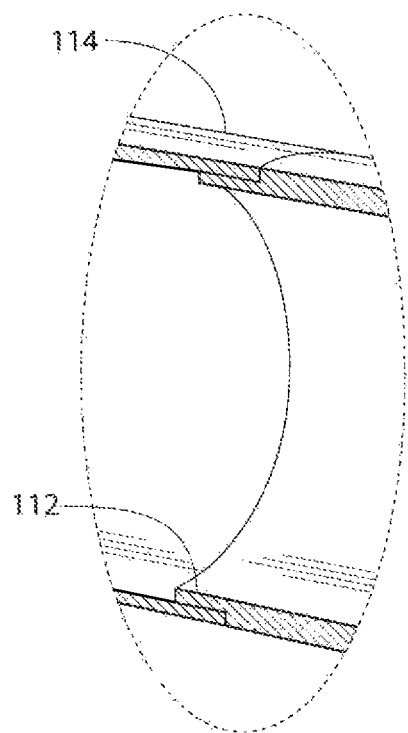
Fig. 4C

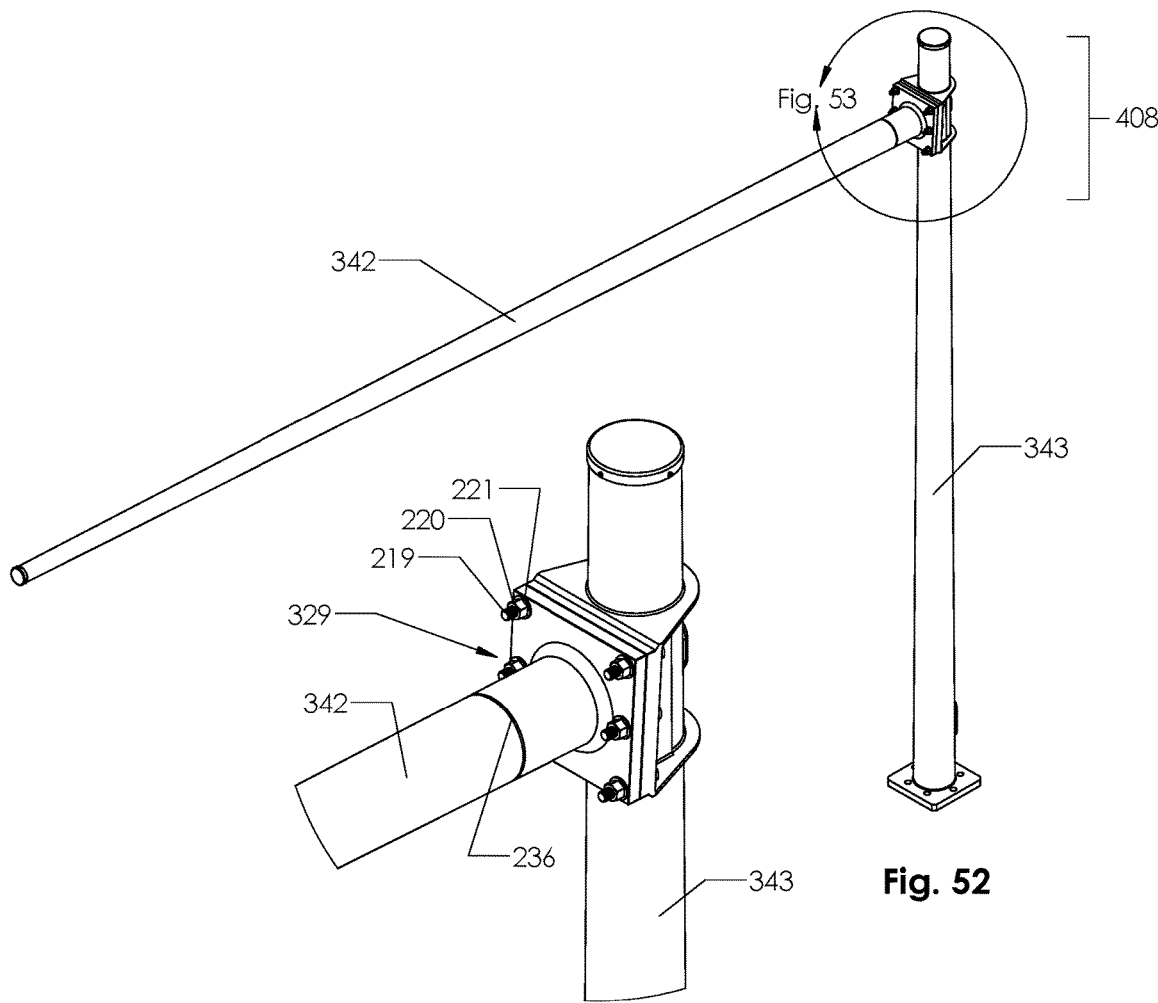
Fig. 53
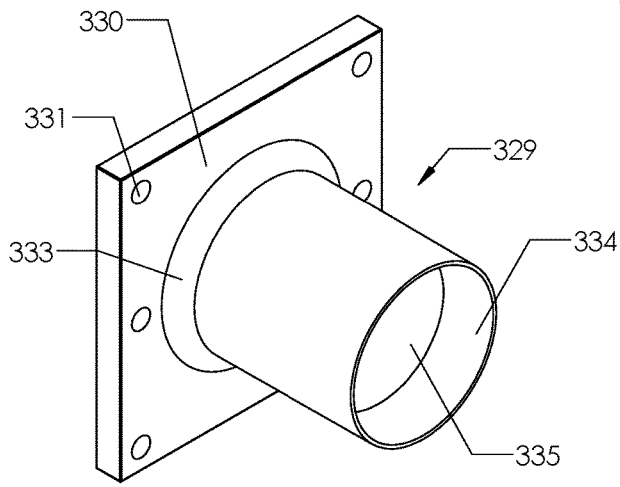
Fig. 52
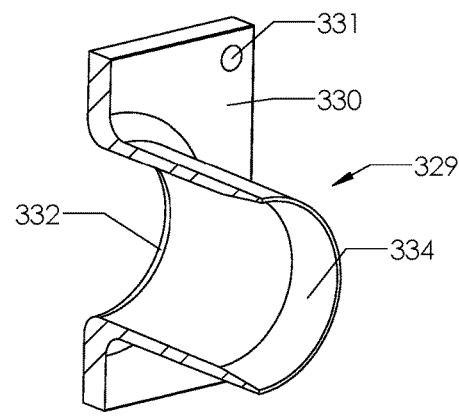
Fig. 54
Fig. 55

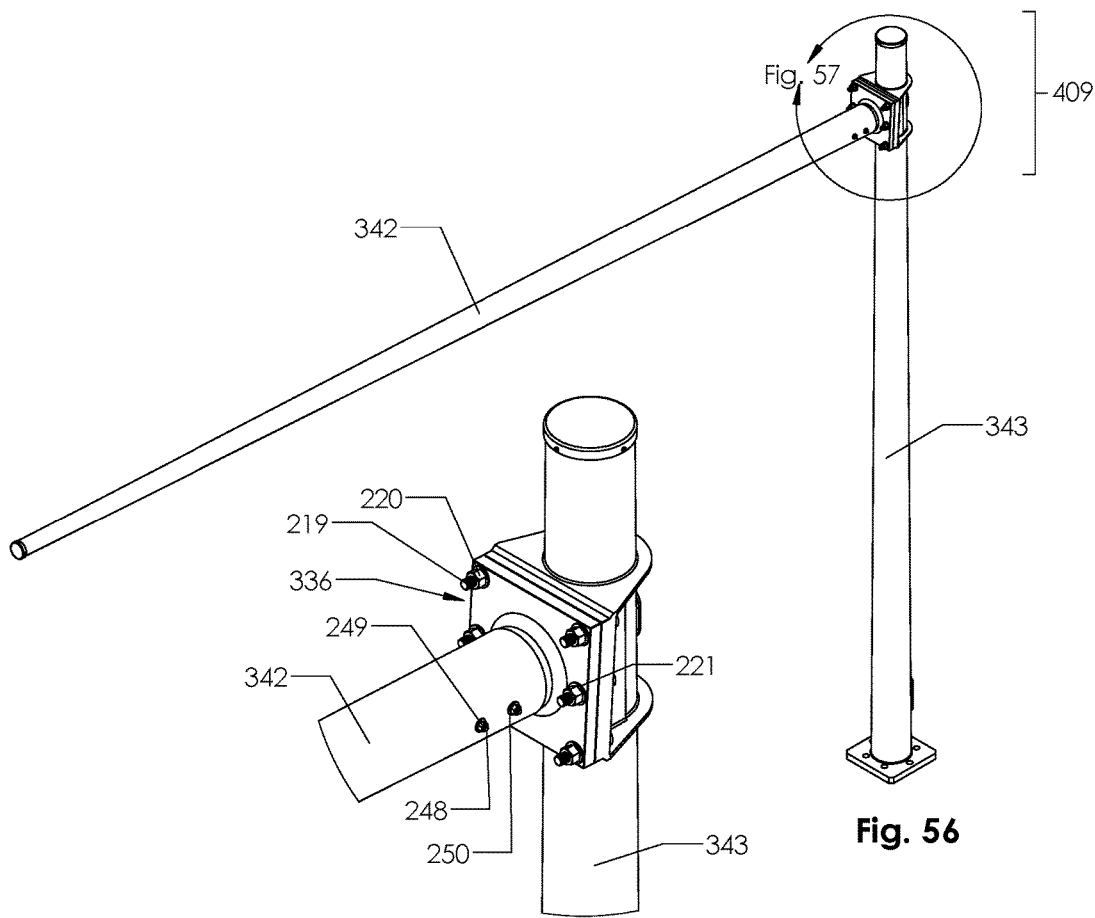
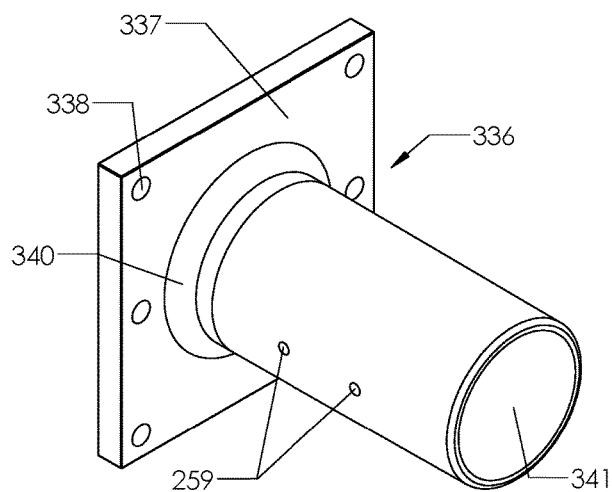
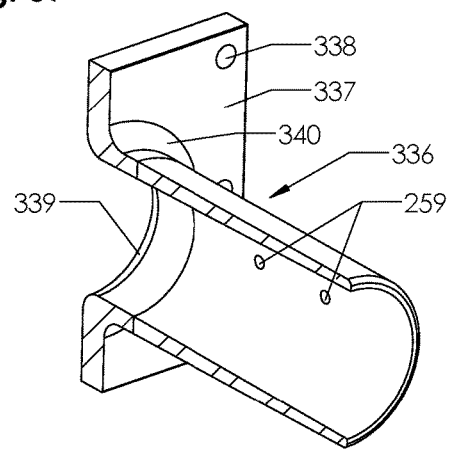
Fig. 56
Fig. 57
Fig. 58
Fig. 59

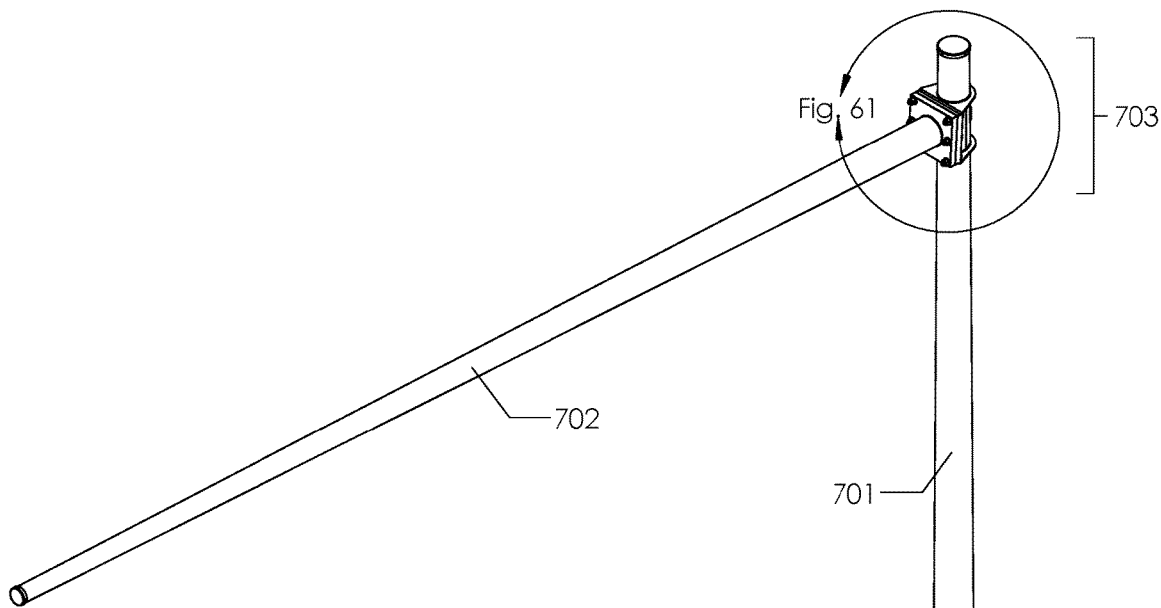
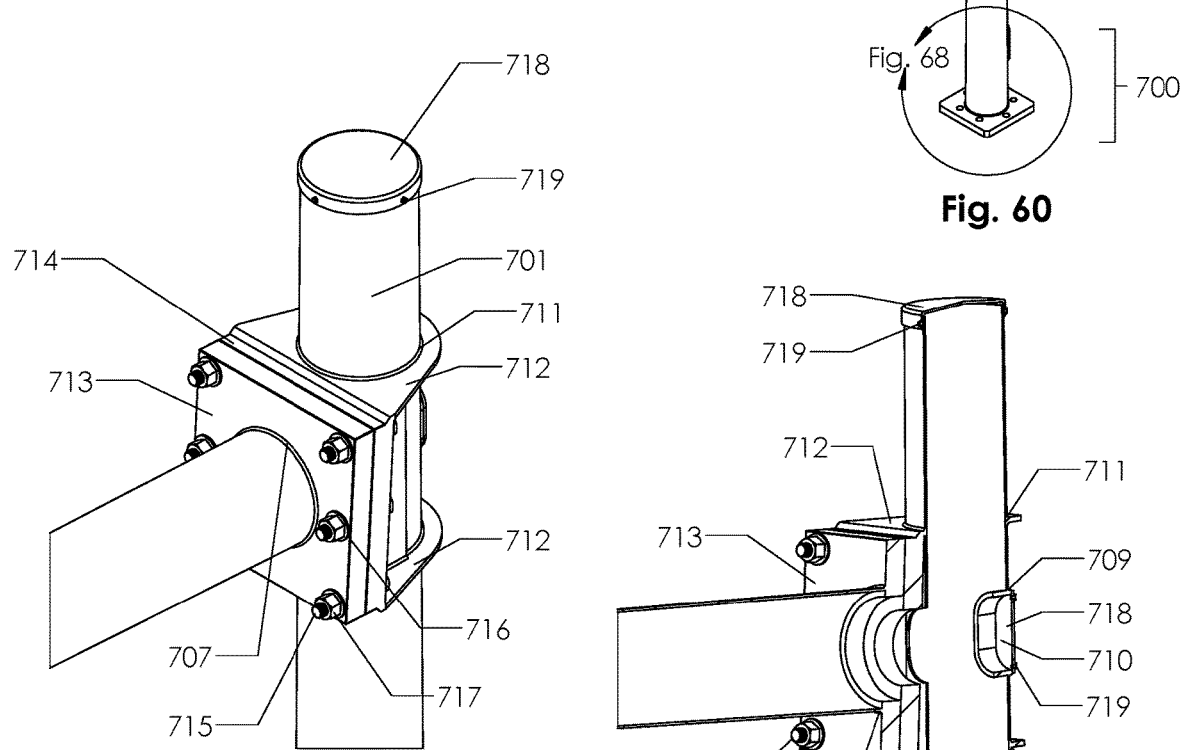
Fig. 60
Fig. 61
Fig. 62

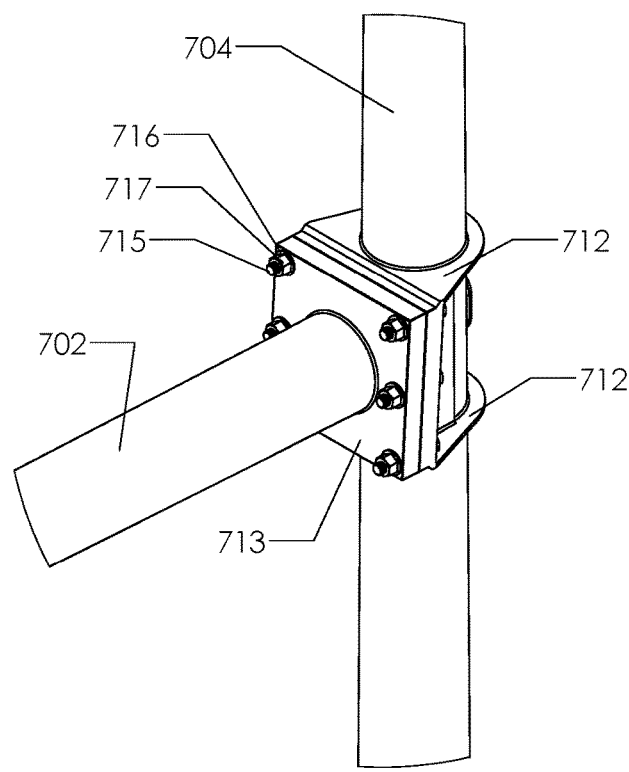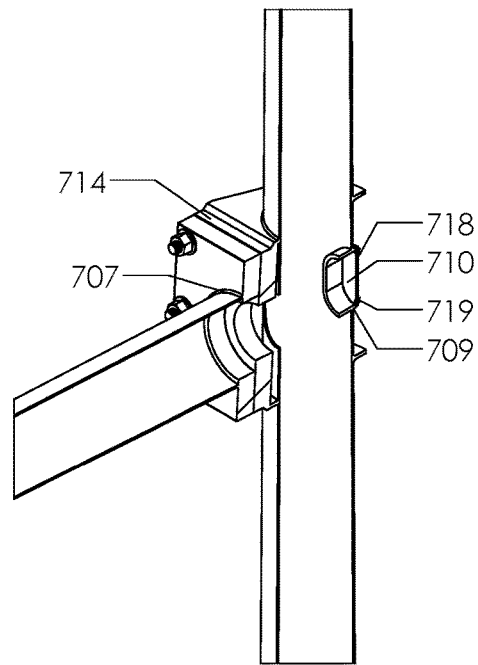
Fig. 66   Fig. 67
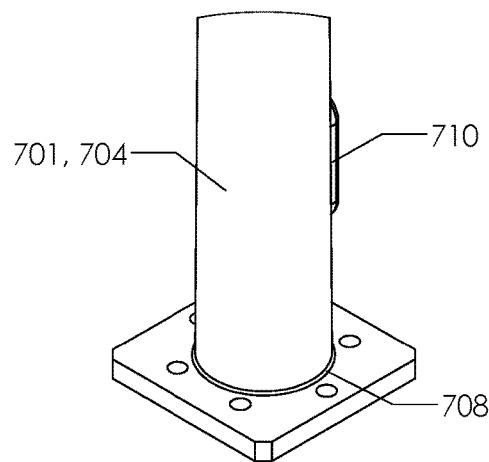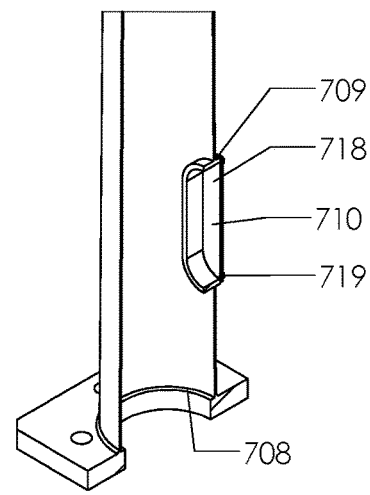
Fig. 68   Fig. 69

TRAFFIC SIGNAL AND SIGN SUPPORT STRUCTURES AND SYSTEM

CROSS-REFERENCE TO RELATED PATENT APPLICATION

This patent application claims priority to U.S. Provisional Application No. 62/624,478, filed Jan. 31, 2018, and to U.S. Provisional Application No. 62/743,421, filed Oct. 9, 2018, the entire teachings and disclosures of both applications are incorporated herein by reference thereto.

BACKGROUND

Traffic signal and traffic sign support structures which have a vertical pole, horizontal mast arm(s), and in some cases horizontal luminaire arm(s), are subject to environmental loading conditions and traffic-induced loading conditions that cause structural degradation and failure. These include vertical and horizontal cyclic oscillations caused by galloping (Den Hartog instability), natural turbulence in wind gusts, truck-induced gust pressures, and in rare cases, vortex-shedding. These persistent oscillations create attendant cyclic tensile strain ranges of varying magnitude leading to high-cycle fatigue damage and potential fracture at critical locations including: the base of the pole, the connection between the mast arm and pole, the connection between the luminaire arm and pole, and locations adjacent to internal wiring access ports.

In the past, various connection devices and methods have been used to mitigate fatigue damage, fracture potential, and the danger of structural failure. However, these past devices and methods have been largely unsuccessful such that traffic signal support and sign support structures require trained engineers to monitor their integrity on a regular basis.

The present invention eliminates fatigue-sensitive details (and thus fatigue-induced fracture). The present invention moves the location of critical stress-range cycles away from locations with large magnitude stress concentrations (due to connection geometry) to locations with significantly reduced stress concentration and greatly improved fatigue performance. As a result, the apparatuses of the present invention require no in-service field monitoring. The invention is not only cost effective by eliminating the need for field monitoring personnel, but also by way of the method of manufacture, which employs ferrous alloy castings and engineered modular pre-fabricated components.

SUMMARY

A variety of different embodiments of the presently disclosed traffic signal and sign support structure will be described herein. These exemplary embodiments utilize pre-fabricated ferrous alloy cast components at the base of the pole, at the connection between the mast arm and pole, and/or at the connection between the luminaire arm and the vertical pole extension (if the structure is intended to support street lighting).

Force transfer mechanisms are facilitated through high strength bolts, high strength threaded rod, full-penetration groove welds or friction, depending on the embodiment considered and the location within the structure. The connections are designed to simplify structural load path, reduce stress concentrations, reduce the time required for field erection of the structural system, and eliminate fatigue sensitive connection details.

Embodiments of the disclosure relate to a traffic signal or sign support structure. The structure includes a pole having a first end and a second end in which the first end is configured to be mounted to a foundation. The structure also includes a mast arm arranged an angle of between about 75° to about 125° relative to the pole. The mast arm has a third end and a fourth end. Additionally, the structure includes a pole junction assembly configured to connect the third end of the mast arm to the second end of the pole. In the structure, the mast arm and the pole are each joined to the pole junction assembly in an area of geometric continuity.

In embodiments, the pole junction assembly includes a first portion and a second portion. The first portion extends from the second end of the pole along a first longitudinal axis of the pole, and the first portion includes a first plate. The second portion includes a connection portion. The third end of the mast arm is sleeved around the connection portion such that the second portion extends along a second longitudinal axis of the mast arm. The second portion also includes a second plate. The first plate and the second plate are connected via a plurality of bolts, and the second end of the pole is welded to the first portion. Further, the third end of the mast arm is welded to the second portion. Each of the welds is a complete joint penetration weld ground smooth to adjacent surface.

In such embodiments, the structure further includes a base including a transverse plate, a pole attachment portion, and a fillet in the transition between the pole attachment portion and the transverse plate. The base is configured to mount the first end of the pole to the foundation via a plurality of bolts extending through the transverse plate and into the foundation.

In embodiments, the pole junction assembly includes a first casting and a second casting. The first casting including a first flange arranged perpendicularly to a longitudinal axis defined by the pole and a first portion that extends from the first flange along the longitudinal axis towards the second end of the pole. The second casting includes a second flange arranged perpendicularly to the longitudinal axis and a second portion that extends from the first flange along the longitudinal axis and away from the second end of the pole. The second casting also includes a first spherical portion extending from the second portion and a mast arm attachment portion extending from the spherical portion at a first angle transverse to the longitudinal axis. The first flange of the first casting is joined to the second flange of the second casting with a plurality of bolts. Further, the third end of the mast arm is joined to the second casting with a complete joint penetration weld ground smooth to adjacent surfaces.

In such embodiments, the horizontal portion of the second casting includes a first beveled edge that reduces a first wall thickness of the mast arm attachment portion to a second wall thickness of the third end of the mast arm. Further, in embodiments, the first vertical portion of the first casting includes a second beveled edge that reduces a third wall thickness of the first portion to a fourth wall thickness of the second end of the pole, and the first casting is joined to the second end of the vertical pole with a complete joint penetration weld ground smooth to adjacent surfaces. Further, in certain embodiments, the second casting further includes an extension pole attachment portion extending from the first spherical portion along the longitudinal axis. The structure further includes an extension pole having a fifth end and a sixth end. The fifth end is sleeved over the extension pole attachment portion of the second casting. The structure also includes a luminaire connector casting having a third portion connected to the sixth end of the extension pole, a second spherical portion extending from the third portion, and a first angled extension portion extending from the second spherical portion at a second angle transverse to the longitudinal axis. The structure further includes a first luminaire mast arm having a seventh end and an eighth end. The seventh end is sleeved over the angled extension portion. In such an embodiment, the first luminaire mast arm may be secured to the first angled extension portion with a threaded rod and nuts. The threaded rod is inserted through the seventh end of the first luminaire mast arm and through the first angled extension portion, and the nuts are threaded onto opposite ends of the threaded rod.

In certain embodiments, the luminaire connector casting further includes a second angled extension portion extending from the second spherical portion at a third angle transverse to the longitudinal axis, and the structure further includes a second luminaire mast arm having a ninth end and a tenth end in which the ninth end is sleeved over the second angled extension portion. In such embodiments, the second angle is the same as the third angle, and the first angle is less than the second angle.

In still other embodiments, the pole junction assembly includes a first portion extending from the second end of the pole along a longitudinal axis defined by the pole, a first spherical portion extending from the first portion, and a first mast arm attachment portion extending from the first spherical portion at a first angle transverse to the first portion. The third end of the mast arm is sleeved over the first mast arm attachment portion.

In such embodiments, the first mast arm attachment portion includes at least a first set of holes that includes a first hole and a second hole arranged diametrically. The third end of the mast arm includes at least a second set of holes, including a third hole and a fourth hole also arranged diametrically. A threaded rod is inserted through the first hole, the second hole, the third hole, and the fourth hole and secured on opposite ends by nuts tightened against the third end of the mast arm. Further, in certain embodiments, the first portion of the pole junction assembly may have a beveled edge that reduces a first wall thickness of the first portion to a second wall thickness of the second end of the pole. The first portion is joined to the second end of the vertical pole with a complete joint penetration weld ground smooth to adjacent surfaces.

Additionally, in some embodiments, the pole junction assembly further includes a second mast arm attachment portion configured to connect a second mast arm to the vertical pole. The second mast arm includes a fifth end and a sixth end. The fifth end of the mast arm is sleeved over the second mast arm attachment portion. In such embodiments, the first mast arm and the second mast arm may form an angle of between about 90° and 180° around the longitudinal axis.

In still other embodiments, the pole junction assembly may further include an extension pole attachment portion extending from the first spherical portion. The traffic signal or sign support structure may further include an extension pole having a fifth end and a sixth end. The fifth end is sleeved over the extension pole attachment portion of the pole junction assembly. The structure may also include a luminaire connector casting having a second portion connected to the sixth end of the vertical extension pole, a second spherical portion extending from the second portion, and a first angled extension portion extending from the second spherical portion at a second angle transverse to the longitudinal axis. The structure also includes a first luminaire mast arm having a seventh end and an eighth end. The seventh end is sleeved over the angled extension portion. The first luminaire mast arm is secured to the first angled extension portion with a threaded rod and nuts. The threaded rod is inserted through the seventh end of the first luminaire mast arm and through the first angled extension portion, and the nuts are threaded onto opposite ends of the threaded rod.

In embodiments, the luminaire connector casting further includes a second angled extension portion extending from the second spherical portion at a third angle transverse to the longitudinal axis. In such embodiments, the traffic signal or sign support structure further includes a second luminaire mast arm having a ninth end and a tenth end in which the ninth end is sleeved over the second angled extension portion. In embodiments, the first luminaire mast arm and the second luminaire mast arm form an angle of between about 90° and 180° around the longitudinal axis.

In other additional or alternative embodiments, the second portion of the luminaire connector casting has a beveled edge that reduces a first wall thickness of the second portion to a second wall thickness of the sixth end of the extension pole. The luminaire connector casting is joined to the sixth end of the vertical extension pole with a complete joint penetration weld ground smooth to adjacent surfaces.

In embodiments, the structure further includes a pole connector casting. The casting has a flange arranged perpendicularly to a longitudinal axis defined by the pole and a portion that extends from the flange along the longitudinal axis towards the first end of the pole. The portion is joined to the first end of the pole with a complete joint penetration weld ground smooth to adjacent surfaces. Further, a plurality of anchor rods are inserted through the flange into the foundation to anchor the pole to the foundation.

In embodiments, the pole junction assembly includes a connection plate having a first side and a second side, two stiffening rings extending from the first side of the connection plate around the vertical pole, a flange having a third side and a fourth side, and an extension portion extending from the fourth side of the flange. Each of the two stiffening rings is welded to the vertical pole, and the third side of the flange faces the second side of the connection plate. The flange is connected to the connection plate with a plurality of bolts. The third end of the mast arm is joined to the extension portion with a complete joint penetration weld ground smooth to adjacent surfaces.

In other embodiments, the pole junction assembly includes a connection plate having a first side and a second side, two stiffening rings extending from the first side of the connection plate around the vertical pole, a flange having a third side and a fourth side, and an extension portion extending from the fourth side of the flange. Each of the two stiffening rings is welded to the vertical pole, and the third side of the flange faces the second side of the connection plate. The third end of the mast arm is sleeved over the extension portion, and the extension portion includes at least a first set of holes. The first set of holes includes a first hole and a second hole arranged diametrically. The third end of the mast arm includes at least a second set of holes, including a third hole and a fourth hole arranged diametrically. A threaded rod is inserted through the first hole, the second hole, the third hole, and the fourth hole and secured on opposite ends by nuts tightened against the third end of the mast arm.

Additional features and advantages will be set forth in the detailed description that follows, and, in part, will be readily apparent to those skilled in the art from the description or recognized by practicing the embodiments as described in the written description and claims hereof, as well as the appended drawings. It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments. In the drawing, like numerals refer to like structures.

FIG. 4A is a perspective view of the mast arm casting used in Exemplary Embodiment 1;

FIG. 4B is a cutaway view of FIG. 4A taken from line 4B-4B;

FIG. 4C is a close-up view of the connection between the mast arm and the junction assembly used in Exemplary Embodiment 1;

FIG. 52 is a perspective view of Exemplary Embodiment 9;

FIG. 53 is a perspective view of the junction between the mast arm and pole used in Exemplary Embodiment 9;

FIG. 54 is a perspective view of the mast arm connector casting used in Exemplary Embodiment 9;

FIG. 55 is a cross section cut through the mast arm connector casting used in Exemplary Embodiment 9;

FIG. 56 is a perspective view of Exemplary Embodiment 10;

FIG. 57 is a perspective view of the junction between the mast arm and pole used in Exemplary Embodiment 10;

FIG. 58 is a perspective view of the mast arm connector casting used in Exemplary Embodiment 10;

FIG. 59 is a cross section cut through the mast arm connector casting used in Exemplary Embodiment 10;

FIG. 60 is a prior art depiction of a perspective view of a traditional sign and traffic signal support structural system;

FIG. 61 is a prior art depiction of a perspective view of the mast arm to pole connection for a traditional sign and traffic signal support structural system;

FIG. 62 is a prior art depiction of a cross section cut through the mast arm to pole connection for a traditional sign and traffic signal support structural system;

FIG. 66 is a prior art depiction of a perspective view of the mast arm to pole connection for a traditional sign, traffic signal, and luminaire support structural system;

FIG. 67 is a prior art depiction of a cross section cut through the mast arm to pole connection for a traditional sign, traffic signal, and luminaire support structural system;

FIG. 68 is a prior art depiction of a perspective view of the pole base connection for a traditional sign, traffic signal, and luminaire support structural system; and FIG. 69 is a prior art depiction of a cross section cut through the pole base connection for a traditional sign, traffic signal, and luminaire support structural system.

DETAILED DESCRIPTION

Figure 1:
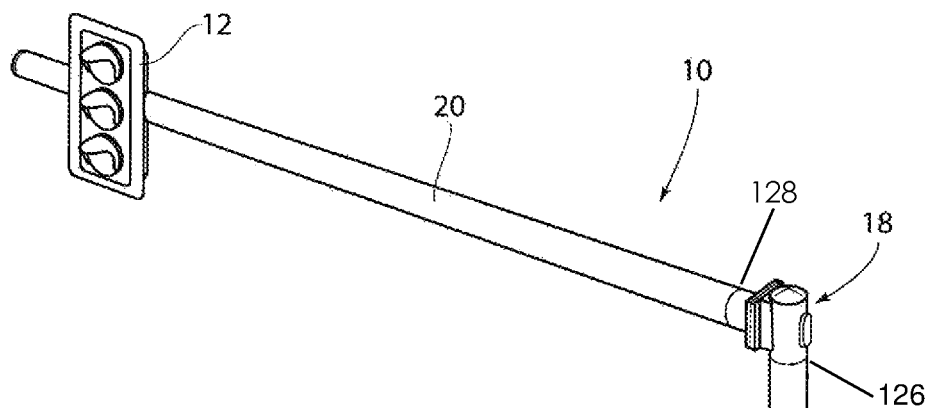
FIG. 1 is a perspective view of Exemplary Embodiment 1 of a monotube pole and mast arm.

While the preferred embodiments disclosed herein are described in relation to traffic sign and signal support structures, it should be noted that the method and apparatuses of the present invention are equally applicable to other analogous structures subject to conditions that could cause structural degradation and failure.

There are ten preferred embodiments that will be described herein. Prior to describing the preferred embodiments, it is prudent to describe the existing systems being supplanted for context and to gain a better understanding of the presently disclosed embodiments.

Existing Support Structural Systems

Typical sign and traffic signal support structures used world-wide are composed of numerous steel components. The major components for a typical sign and traffic signal support structure are shown in FIGS. 60-62, 68, and 69. The conventional support structures include a base 700, a vertical pole 701, a horizontal mast arm 702, and a built-up connection 703 mating the vertical pole 701 and the mast arm 702.

Referencing FIGS. 63 through 69, if the structure is also supporting street lighting, a longer vertical pole 704 is used to extend above the mast arm 702 to provide support for a luminaire arm 705 through a built-up connection 706. Sometimes these structures will support two luminaire arms. This is accomplished using the same luminaire arm and built-up connection as the depicted luminaire arm 705 and built-up connection 706, just mirrored about the centerline, or longitudinal axis, of the vertical pole 704.

The cross-section views shown in FIGS. 62, 65, 67, and 69 illustrate the locations of fillet and groove welds (complete and/or partial penetration) at various locations within the typically-used structural systems. The fabrication process currently employed for these structural systems generates locations of significant geometric discontinuity and therefore stress concentration. These locations within the typical structural systems are susceptible to high-cycle fatigue-induced fracture from traffic-induced vibrations (if mounted to a bridge superstructure), traffic-induced wind pressure, and naturally occurring wind pressure and the associated aeroelastic phenomena of vortex shedding and galloping (Foley, et al 2004). Furthermore, these regions of stress concentration have fatigue lives that are highly variable.

Design specifications (e.g., AASHTO 2014, 2015a, 2015b) specify fatigue life of structural steel components and systems using stress-life approaches whereby stress ranges are used to define an expected fatigue life of a particular fabrication detail. The design of new structural support systems is targeted to infinite fatigue life and therefore, analytical stress ranges in the structural system and components are limited to a range defined as the constant amplitude fatigue limit (CAFL) or the fatigue threshold.

The traditional structural systems (FIGS. 60-69) have a myriad of fatigue-critical details present within them. The locations of the welds defining these fatigue-critical locations are shown in FIGS. 62, 65, 67, and 69. The connection 703 of the mast arm 702 to the pole 701, 704 is facilitated using complete joint penetration (CJP) groove welds 707 or fillet welded socket-type connections (not shown). These types of welds 708 are also used at the base connection 700 of the pole 701, 704. Single-sided fillet welds 709 are used at the access ports 710. Two-sided fillet welds 711 connect the stiffening rings 712 to the pole 701, 704.

The conventional structural systems (FIGS. 60 and 63) also include a myriad of parts that require assembly via welding or bolting. The mast arm end plate 713 and pole-top connection plate 714 are mated in the field after welding them to the mast arm and pole top, respectively. High strength structural bolts 715, washers 716, and nuts 717 are used for connection of the mast arm to the pole. Anchor bolts, washers, and nuts (not shown) are used for connection of the pole to a foundation (not shown). The distal end of the mast arm, the top of the pole, and the handhole access ports are all covered with steel components 718 and secured to the structures using screws 719 (see, e.g., FIGS. 61-62 and 64-65).

The fabrication of the existing systems is labor intensive (expensive), and care must be exercised to limit distortion of the connection plates as the welds in the fabricated systems cool. These distortions can cause additional (difficult to quantify) stresses in the structural systems as the high-strength bolts 715 and nuts 717 are tightened in the field and the faying surfaces of the connecting plates 713 and 714 are drawn together.

The weld details in the traditional support structural systems are highly fatigue sensitive and the stress ranges allowed for infinite-life design are very low (Foley et al 2013; Foley and Diekfuss 2016; Diekfuss and Foley 2016a, 2016b). Design specifications (AASHTO 2015a, 2015b) indicate that the CJP welds 707, 708 located at the mast arm to connecting plate and pole base have CAFLs that range from 4.5 to 10.0 ksi and the CAFLs for the fillet welded socket-type connections at these locations range from 2.6 to 7.0 ksi. The CAFL assigned for design depends upon many parameters including the connection plate thicknesses, the mast arm and pole wall thicknesses, the mast arm and pole tube diameters and the relative distance of the high-strength bolts from the exterior diameter of the tubes (Roy et al 2011). The fillet welds located at the access ports have CAFL magnitudes of 7.0 ksi.

The exemplary embodiments disclosed hereinbelow utilize ferrous-alloy castings, in conjunction with CJP welds (ground smooth to adjacent surface), high strength bolts, high strength threaded rod, or static friction to facilitate force transfer between the structural elements discussed previously in regions of geometric continuity.

Referencing the latest design specifications (AASHTO 2014, 2015a, 2015b), the following benefits can be realized if the exemplary embodiments, as shown in FIGS. 1 through 59, are used in lieu of the traditional structures shown in FIGS. 60 through 69:

In embodiments, all welded connections utilize CJP groove welds (ground smooth to adjacent surface) and are located away from areas of geometric discontinuity (i.e., away from areas where a horizontal element transitions or is joined to a vertical element). Therefore, all CJP welds in the exemplary embodiments are located in areas geometric continuity and areas of low stress concentration. The CJP welded connections shown in the present disclosure can be considered as either full-penetration groove-welded splices with welds ground to provide a smooth transition between members, with or without backing ring removed (depending on the embodiment considered) or a CJP groove-welded butt splice, with weld soundness established by NDT and with welds ground smooth and flush parallel to the direction of stress. The minimum CAFL for this type of connection is 7.0 ksi and can be as high as 16.0 ksi.

A new sleeved and bolted cast connection is introduced by the present disclosure. Many of the embodiments of the present disclosure utilize sleeved and bolted connections as the primary force transfer mechanism between the mast arm(s) and vertical pole and luminaire arm(s) and vertical pole. In embodiments of the present disclosure, mast and luminaire arms are sleeved tightly over ferrous alloy castings facilitating force transfer through friction between mating components. In the regions of the sleeved connections, geometric continuity is maintained because horizontal components are sleeved over other horizontal components and vertical components are sleeved over other vertical components. The threaded rod is a redundant connection device only needed for extreme event loading scenarios like impact from an errant vehicle. The CAFL for the sleeved component is 16 ksi. The CAFL for the through bolted component is 7.0 ksi.

All exemplary embodiments take advantage of higher CAFLs when compared to the CJP and fillet welds used in the traditional systems (e.g., as shown in FIGS. 60-69). This indicates a potential for significant enhancement (actually orders of magnitude) in fatigue life for the exemplary embodiments over that of the traditional system. The exemplary embodiments also have the potential to significantly reduce material needed in the overall structural system resulting from fatigue-induced stress range limits imposed by design specifications.

The exemplary embodiments also provide benefits with regard to in-service durability. The external surface area shown in the prior art (FIGS. 60-69) is significant with highly irregular geometry and flat surfaces exposed to weather and wildlife. The present invention minimizes nearly all flat surfaces susceptible to water collection and their tendency to be wildlife shelves. The smooth outer surfaces of the present invention facilitate improved galvanizing operations (e.g. greater reliability and control of galvanizing thickness). These, in turn, tend to enhance in-service durability when subjected to the environment and wildlife (e.g. tendency for bird feces to accumulate).

Each of the ten exemplary embodiments will now be discussed in greater detail. For ease of reference, segments of each component may be described as "vertical" or "horizontal," which refers to the orientation of the structures shown in the figures. However, the use of "vertical" and "horizontal" is not meant to imply a mandatory arrangement of parts in all instances.

Exemplary Embodiment 1

A first embodiment is shown in FIGS. 1 through 6B. Structure 10 (and all structures included in the exemplary embodiments) is intended to bear one or more signals or signs 12. Structure 10 includes a base 14, a pole 16, a junction assembly 18, and a mast arm 20. In embodiments (including each of the exemplary embodiments discussed below), the mast arm 20 forms an angle with the pole 16 of from about 75° to about 125°. In further embodiments (including each of the exemplary embodiments discussed below), the mast arm 20 forms an angle with the pole 16 of from about 85° to about 110°. The base 14 and junction assembly 18 are constructed of hollow ferrous alloy castings. In embodiments, the casting-to-tube assemblies are pre-fabricated for installation onsite. In addition, the casting process for Exemplary Embodiment 1 allows for the inclusion of corresponding backing rings and flanges that help facilitate the fabrication process. The castings and tubes are coupled to one another using complete joint penetration (CJP) groove welds in regions of geometric continuity that are ground flush at the surfaces of the connecting parts. Referring to FIG. 3A, assembly 18 is preferably a singlepiece casting as opposed to the embodiment shown in FIG. 3B wherein assembly 18 is illustrated as being a 2-piece assembly.

Base 14 comprises a transverse plate 22 and an extension portion (depicted as vertical extension portion 24) with an aperture 26 therebetween. Base 14 further comprises a fillet 28 between transverse plate 22 and vertical extension portion 24, an extension portion backing ring 30, and bolt apertures 32 for retention of bolts 34. Base 14 is attached to a foundation 36 via bolts 34. Fillet 28 (and fillets 84, 86, and 110, which will be introduced infra) has a radius that is designed to reduce stress concentration at the change in geometric profile.

Transverse plate 22 has voids 38, and vertical extension portion 24 may include an outlet 40 having an outlet cap 42, and one or more outlet cap attachments 44.

In embodiments, voids 38 are included not only to reduce material usage and therefore reduce cost, but also serve the key function of improving the distribution of forces through transverse plate 22.

Figure 3A:
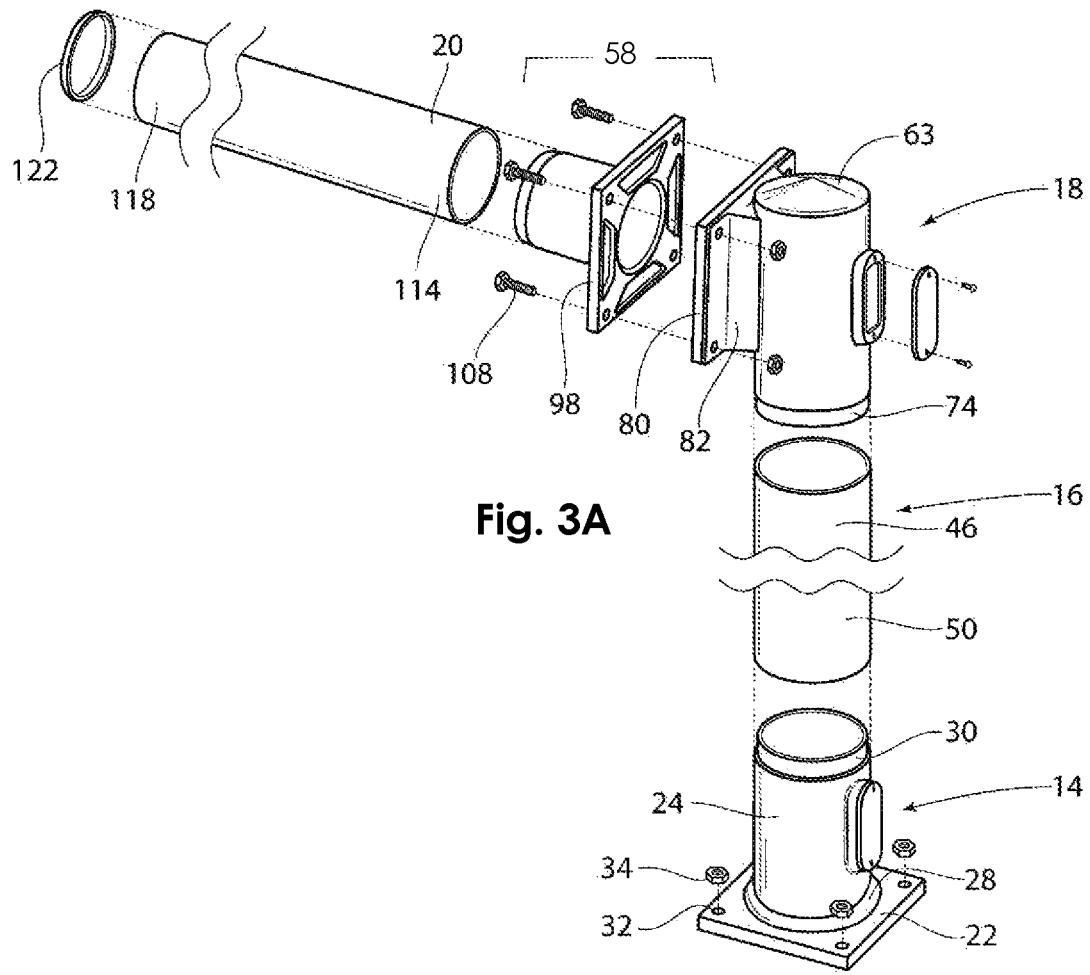
FIG. 3A is an exploded view of the embodiment shown in FIG. 1.
Figure 3B:
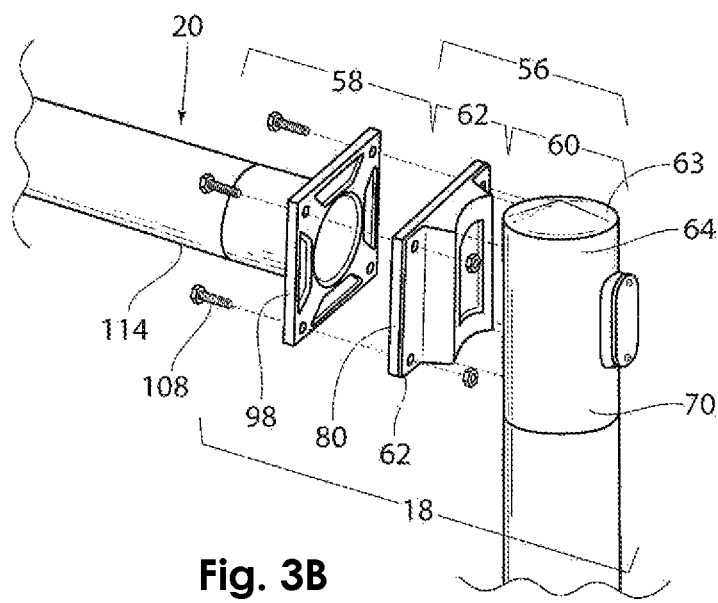
FIG. 3B is an exploded view of FIG. 1, now enumerating portions of the junction assembly for reference purposes.

Referring now to FIG. 3B, assembly 18 may be assembled from two castings, i.e., main body 56 and extension portion 58. Main body 56 has a first vertical portion 60 and a second horizontal portion 62. Vertical portion (or first portion) 60 further has an upper end 64 and a lower end 70. Lower end 70 also has a backing ring 74.

A vertical extension portion 24 of base 14 has a backing ring 30 that mates with pole 16 at lower end 50. Likewise, upper end 46 of pole 16 mates with backing ring 74 located at lower end 70 of vertical portion 60. The pieces are joined via complete joint penetration welds 124 and 126 (e.g., as shown in FIG. 1), and the exterior surfaces are ground smooth.

Figure 5A:
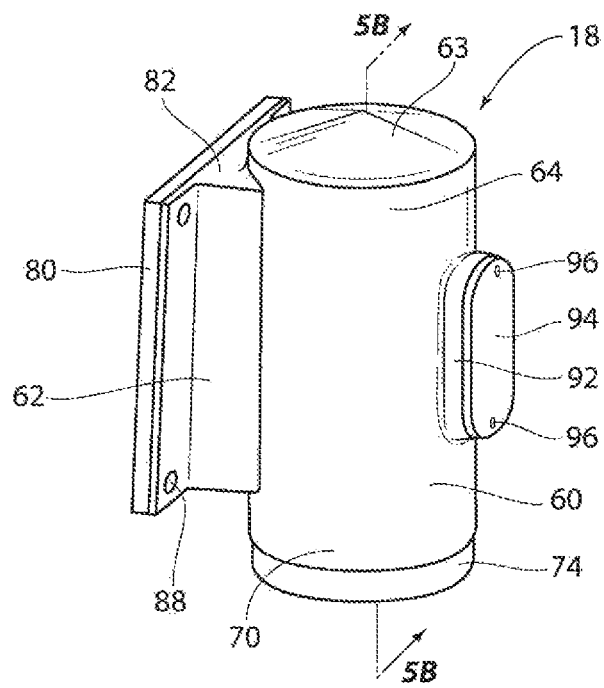
FIG. 5A is a perspective view of the pole top casting used in Exemplary Embodiment 1.
Figure 5B:
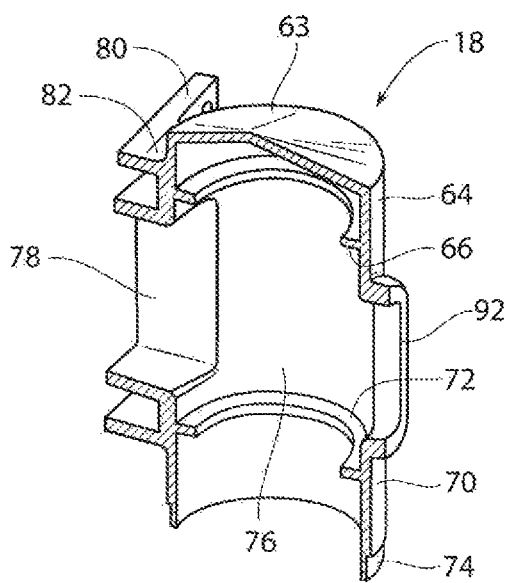
FIG. 5B is a cutaway view of FIG. 5A taken from line 5B-5B.

As seen in FIG. 5B, upper end 64 has an internal stiffening ring 66, and lower end 70 contains a stiffening ring 72. Sometimes complex features occur as a result of the casting process itself. Such is the case with stiffening rings 66 and 72. The interior stiffening rings serve to stiffen vertical portion 60 during service.

Figure 5C:
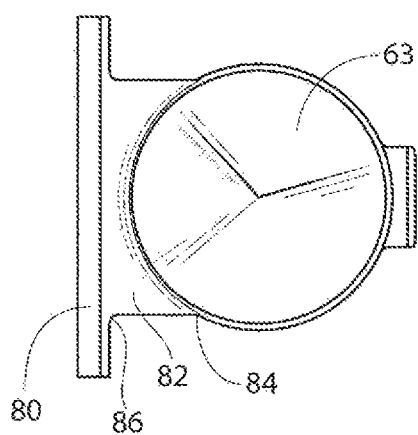
FIG. 5C is a top view of FIG. 5A.
Figure 5D:
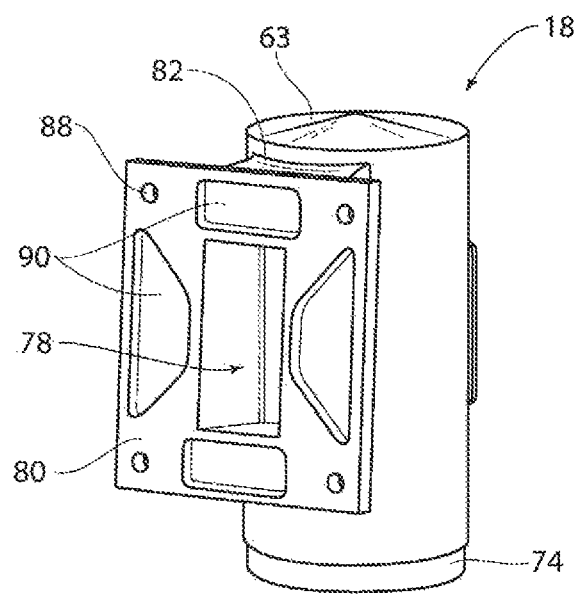
FIG. 5D is a view of the pole top casting shown in FIG. 5A from a different perspective.
Figure 6A:
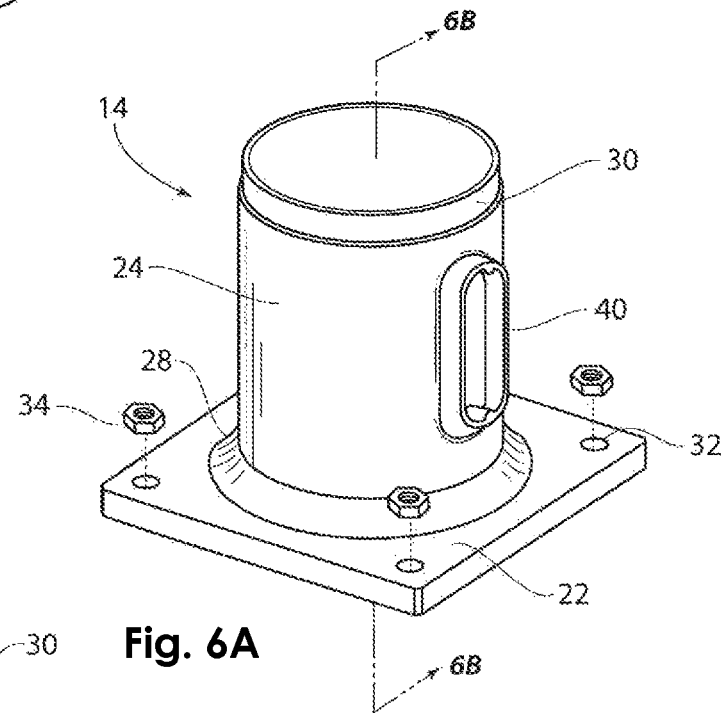
FIG. 6A is a perspective view of the pole base casting used in Exemplary Embodiment 1.
Figure 6B:
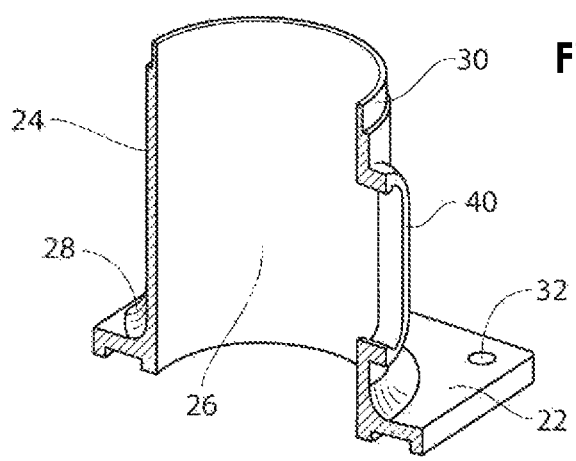
FIG. 6B is a cutaway view of FIG. 6A taken from line 6B-6B.
Figure 7:
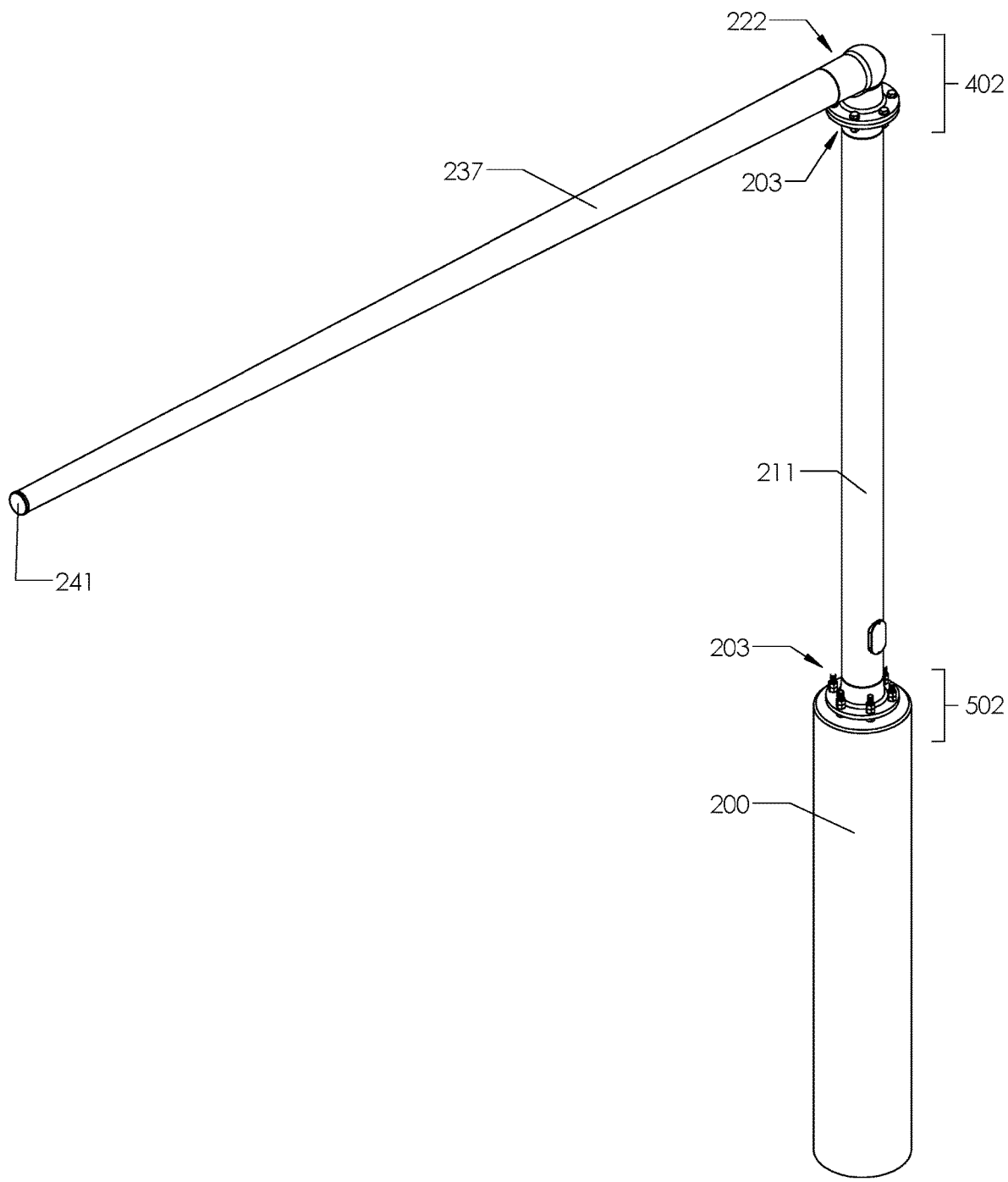
FIG. 7 is a perspective view of Exemplary Embodiment No. 2 (traffic signal and/or traffic signage omitted for clarity)

FIGS. 5B and 5C show main body 56 having a wall 76 that connects with horizontal portion (or second portion) 62, and an aperture 78 extending therebetween. Horizontal portion 62 includes a plate 80 and an extension support 82 which retains plate 80 against the circumference of wall 76.

Extension support 82 is connected to wall 76 and to plate 80 by way of fillets 84 and 86, the benefits and characteristics of which were discussed supra. Plate 80 has bolt apertures 88 and voids 90, and main body 56 may further be provided with an outlet 92, outlet cap 94, and cap attachments 96.

Extension portion 58 has a plate 98 and a mast arm connection portion 100 with an aperture 102 therebetween. Plate 98 also has voids 104, and bolt apertures 106, as well as bolts 108. A fillet 110 connects plate 98 with connection portion 100, which in turn is provided with a backing ring 112. As with void 38, voids 90 and 104 reduce material usage and improve the distribution of forces through plates 80 and 98.

Mast arm 20 has a proximal end 114 which is connected to casting 58 using a complete joint penetration weld 128 with surfaces ground smooth. As can be seen, e.g., in FIGS. 2A, 2B, and 2E, the mast arm 20 is joined to the casting 58 in a region of geometric continuity, i.e., horizontal-to-horizontal continuity. Mast arm 20 also has a distal end 118 which may be provided with an end cap 122.

Figure 2A:
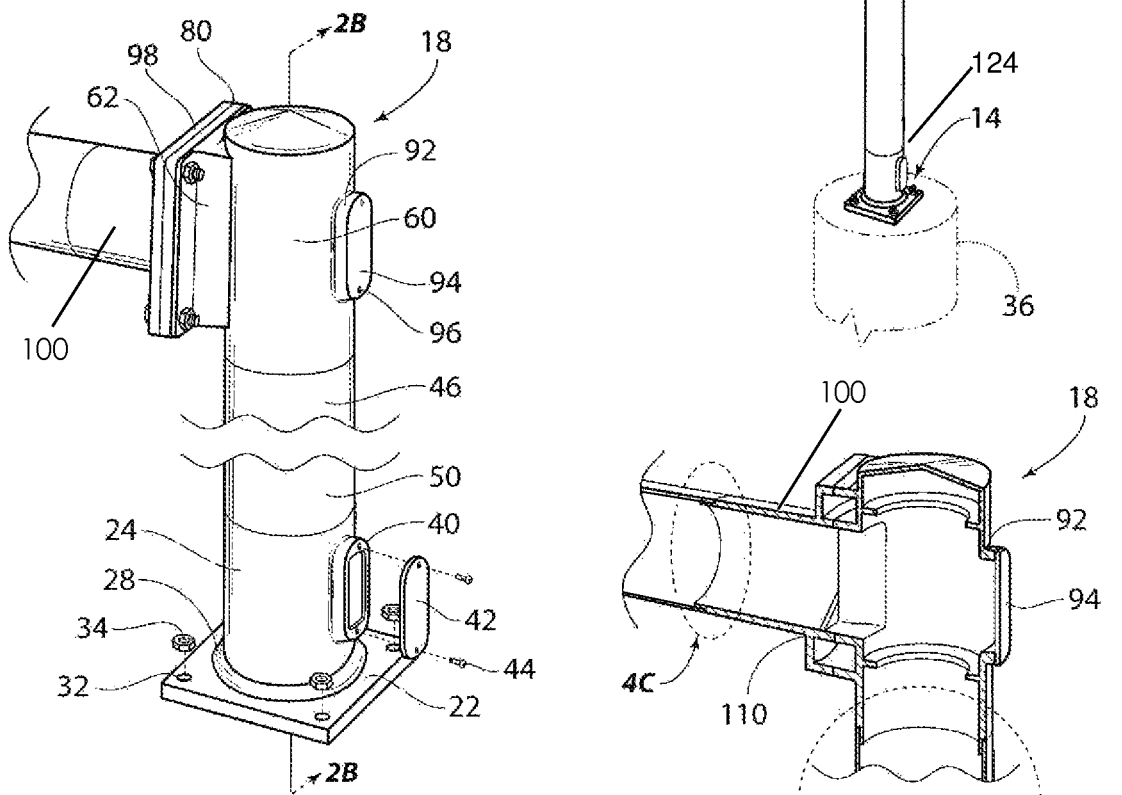
FIG. 2A is a close-up view of the pole base connection and mast arm to pole connection shown in FIG. 1.
Figure 2B:
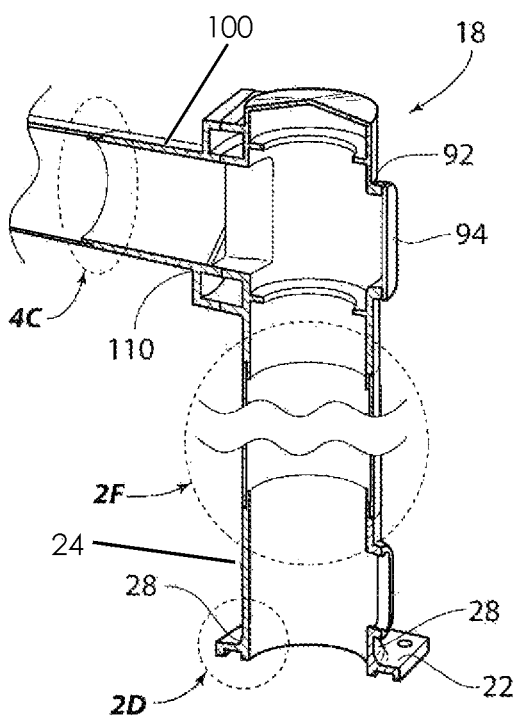
FIG. 2B is a cutaway view of FIG. 2A taken from line 2B-2B.
Figure 2C:
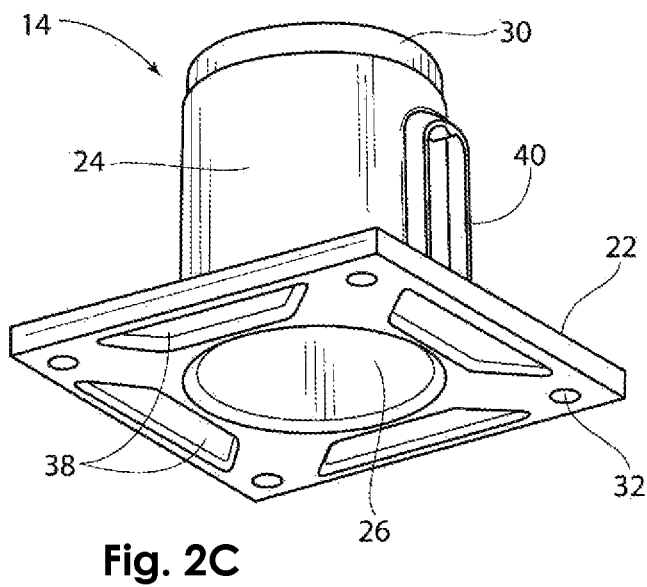
FIG. 2C is a bottom perspective view of the pole base.
Figure 2D:
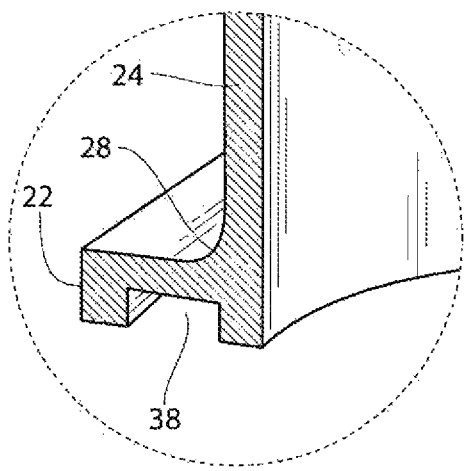
FIG. 2D is a close-up view of FIG. 2B taken from section 2D.
Figure 2E:
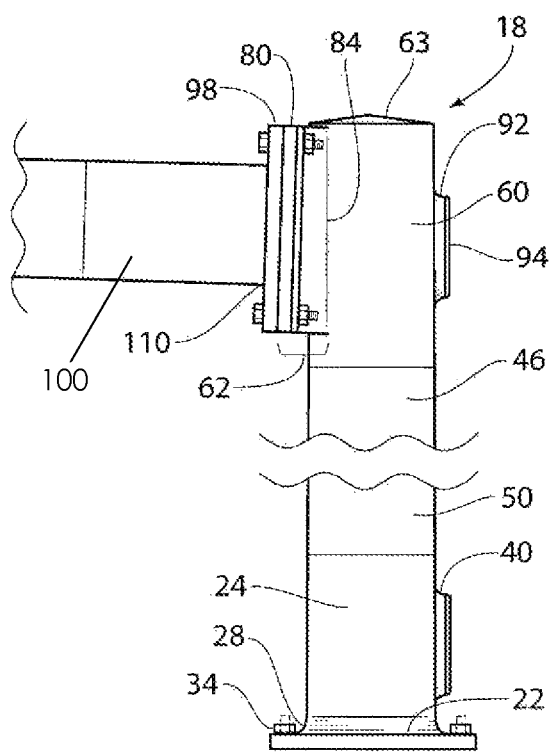
FIG. 2E is a side view of the embodiment shown in FIGS. 2A and 2B.
Figure 2F:
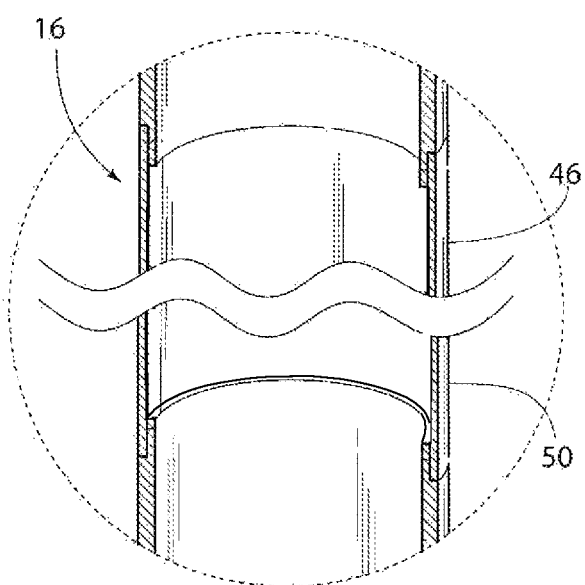
FIG. 2F is a close-up view of FIG. 2B taken from section 2F.

In the present embodiment, outlets 40 and 92 of base 14 and junction assembly 18, as shown in FIG. 2A, are designed into the casting mold from which the parts are made.

Exemplary Embodiment 2

Figure 8:
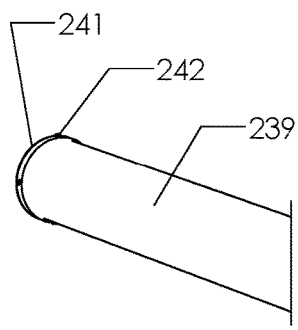
FIG. 8 is a perspective view of the end of a welded, tapered mast arm.

A second embodiment is shown in FIGS. 7 through 16. The major components used in Exemplary Embodiment 2 include two pole connector castings 203, a prismatic pole 211, a mast arm connector casting 222, and a tapered, welded mast arm 237. FIG. 8 shows the distal end of the tapered, welded mast arm 239, its end cap 241 and screws 242 securing the cap 241 in place. The tapered, welded mast arm 239 is also used in Exemplary Embodiment 5.

Figure 9:
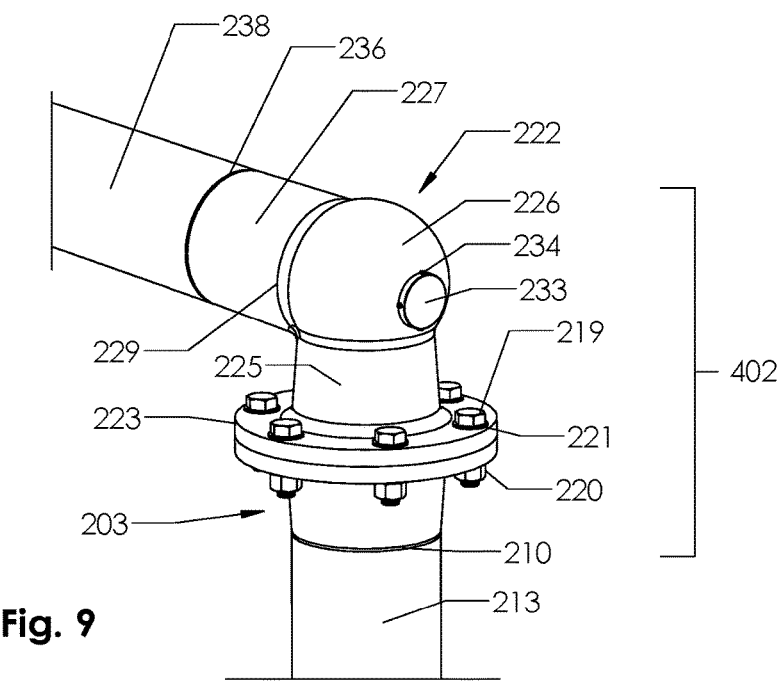
FIG. 9 is a perspective view of a junction between the mast arm and pole used in Exemplary Embodiment 2.
Figure 11:
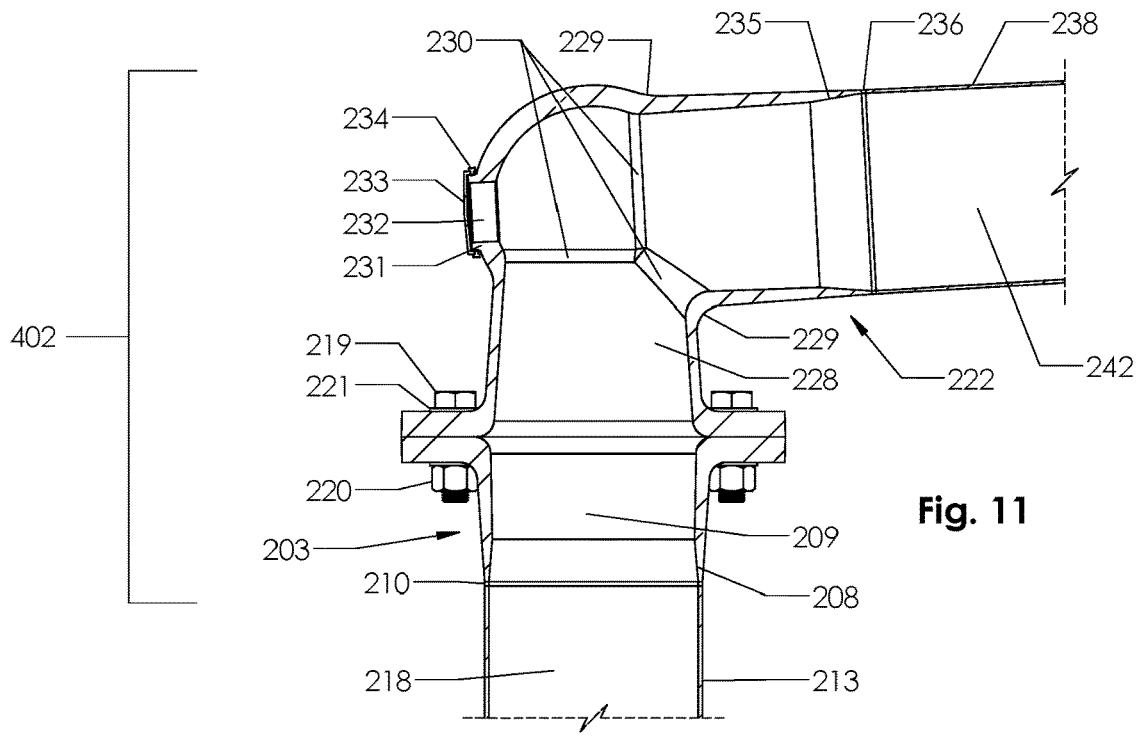
FIG. 11 is a cross section cut through the junction between the mast arm and pole used in Exemplary Embodiment 2.

FIGS. 9 and 11 illustrate the mast arm to pole junction assembly 402. This junction assembly 402 connects proximal end 238 of mast arm 237 to horizontal mast arm attachment portion 227 of casting 222 via CJP weld 236. Casting 222 is connected to casting 203 via high strength bolts 219, nuts 220, and washers 221. Bolts 219 penetrate flanges 223 and 204 through apertures 205 and 224, respectively. Casting 203 is connected to the top 213 of the pole 211 via CJP weld 210. The welded ends of the casting 203 and horizontal portion 227 are machined on their interior faces to include bevels 208 and 235, respectively, that reduce the thicknesses of the casting 203 and horizontal portion 227, respectively, to match the wall thickness of the vertical pole 211 and the mast arm 237, respectively. The bevels 208, 235 serve to eliminate any potential notch effect and simplify flow of stresses between tube and casting resulting in increased fatigue resistance.

Casting 222 is further comprised of a vertical (tapered) portion 225 and a spherical portions 226. Structurally optimized exterior and interior fillets 229 and 230 are used to transition between different portions of casting 222 to reduce stress concentrations. Similarly, casting 203 uses interior and exterior fillets 206 and 207 to transition from its vertical portion 225 to its flange 204.

Figure 10:
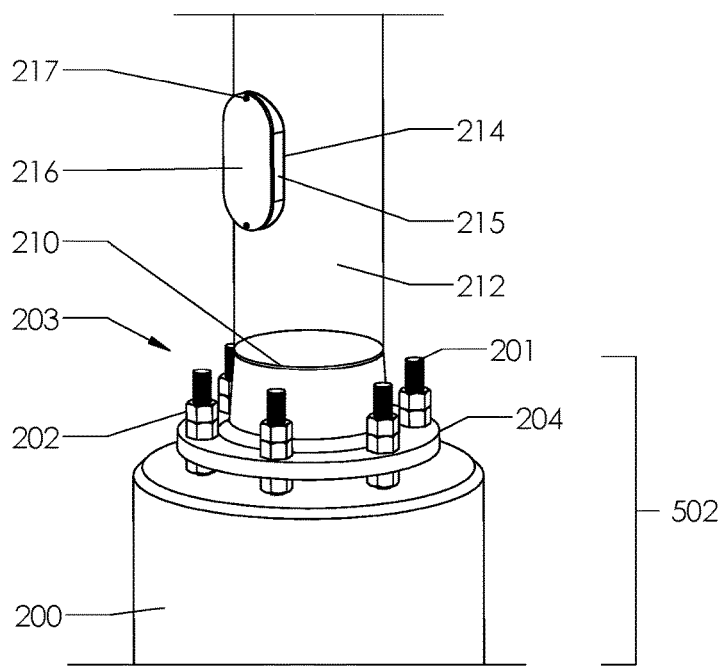
FIG. 10 is a perspective view of the junction between the pole and the concrete foundation used in Exemplary Embodiments 2 through 8.
Figure 12:
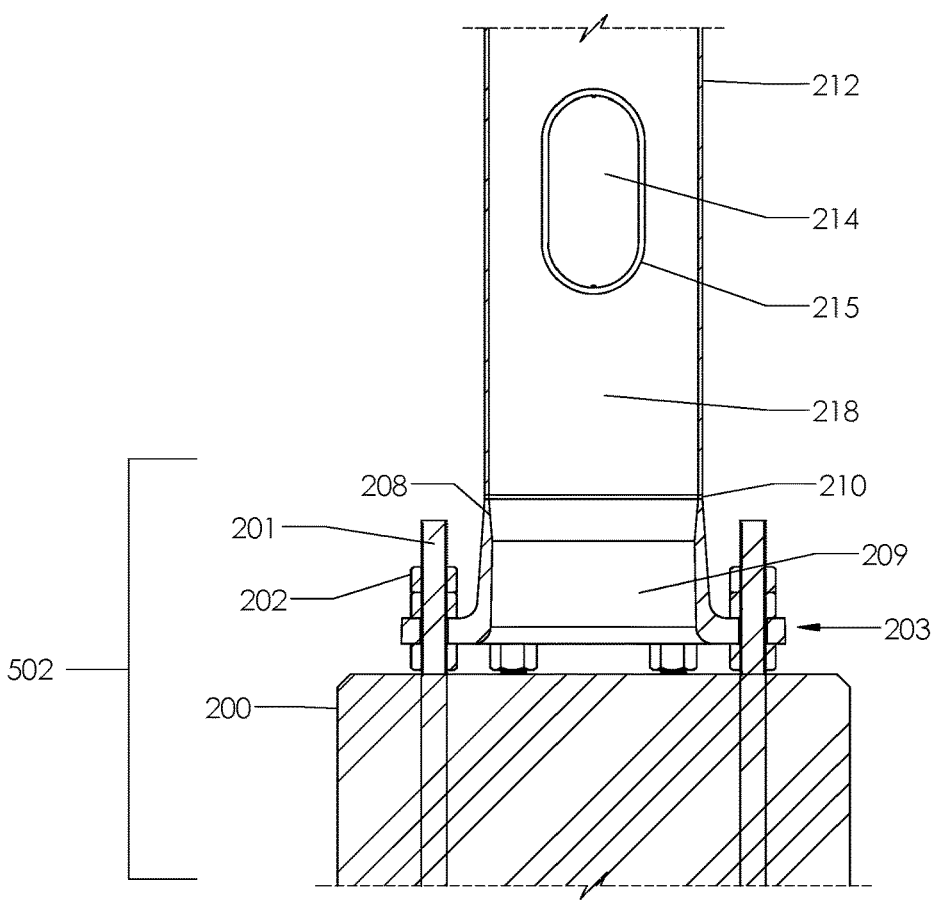
FIG. 12 is a cross section cut through the junction between the pole and the concrete foundation used in Exemplary Embodiments 2 through 8.
Figure 13:
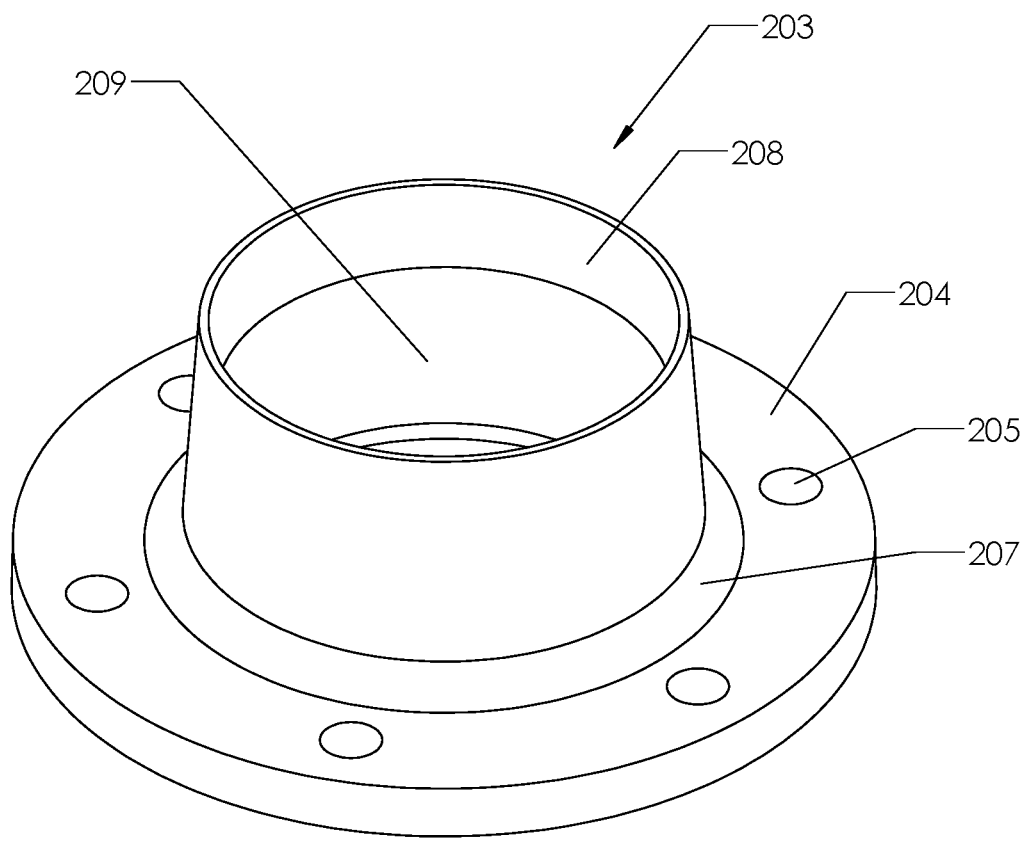
FIG. 13 is a perspective view of the pole connector casting used in Exemplary Embodiments 2 through 8.
Figure 14:
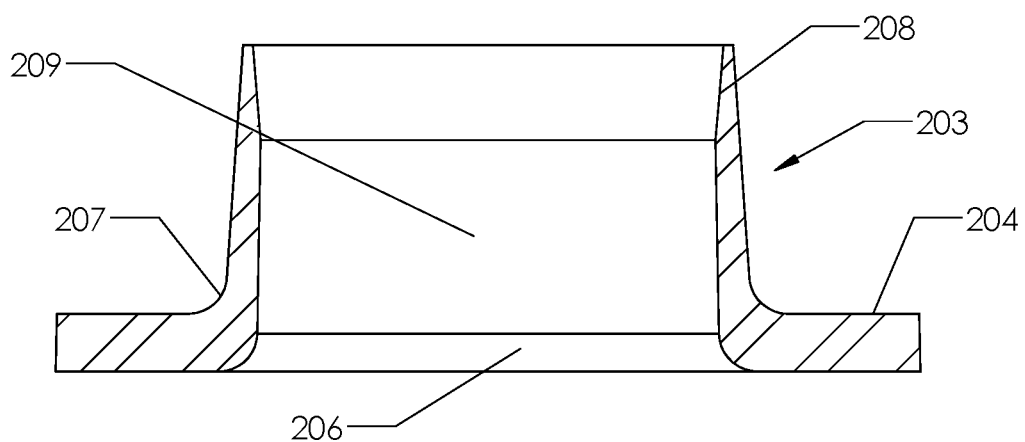
FIG. 14 is a cross section cut through the pole connector casting used in Exemplary Embodiments 2 through 8.
Figure 15:
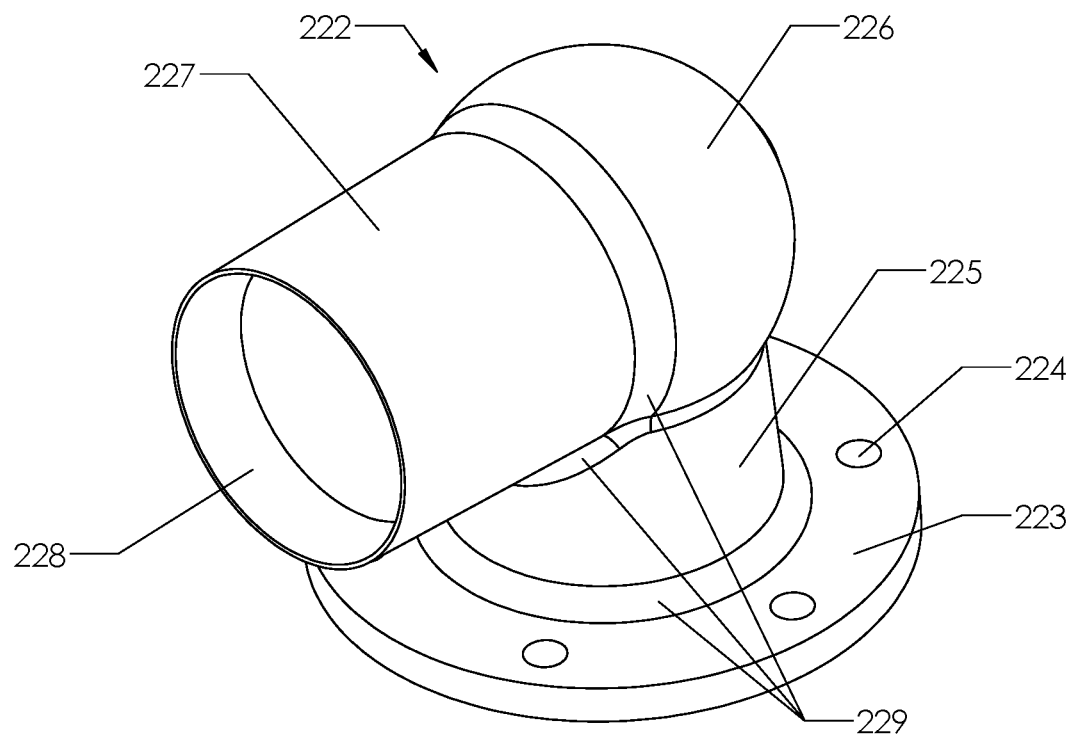
FIG. 15 is a perspective view of the mast arm connector casting used in Exemplary Embodiment 2.
Figure 16:
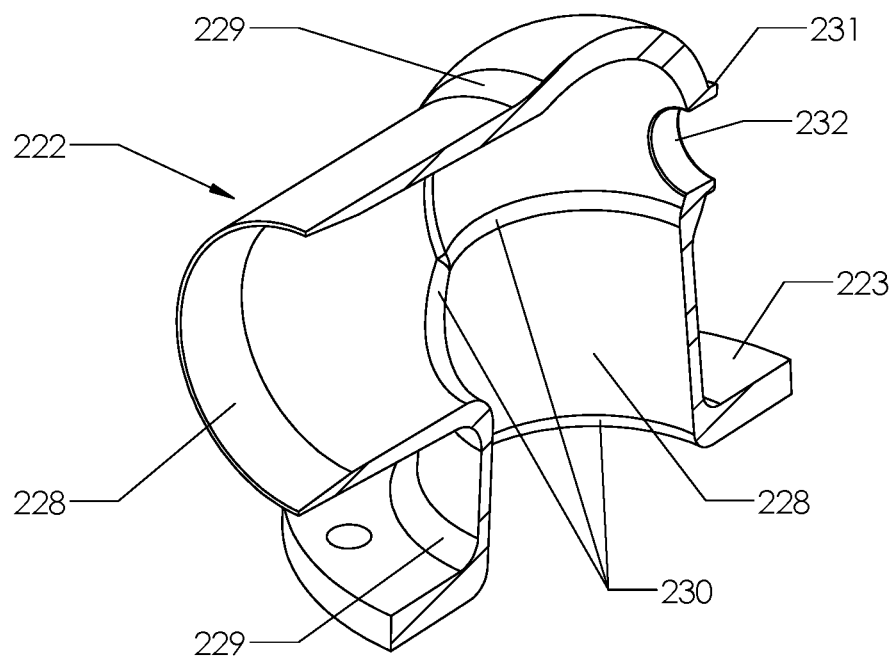
FIG. 16 is a cross section through the mast arm connector casting used in Exemplary Embodiment 2.
Figure 17:
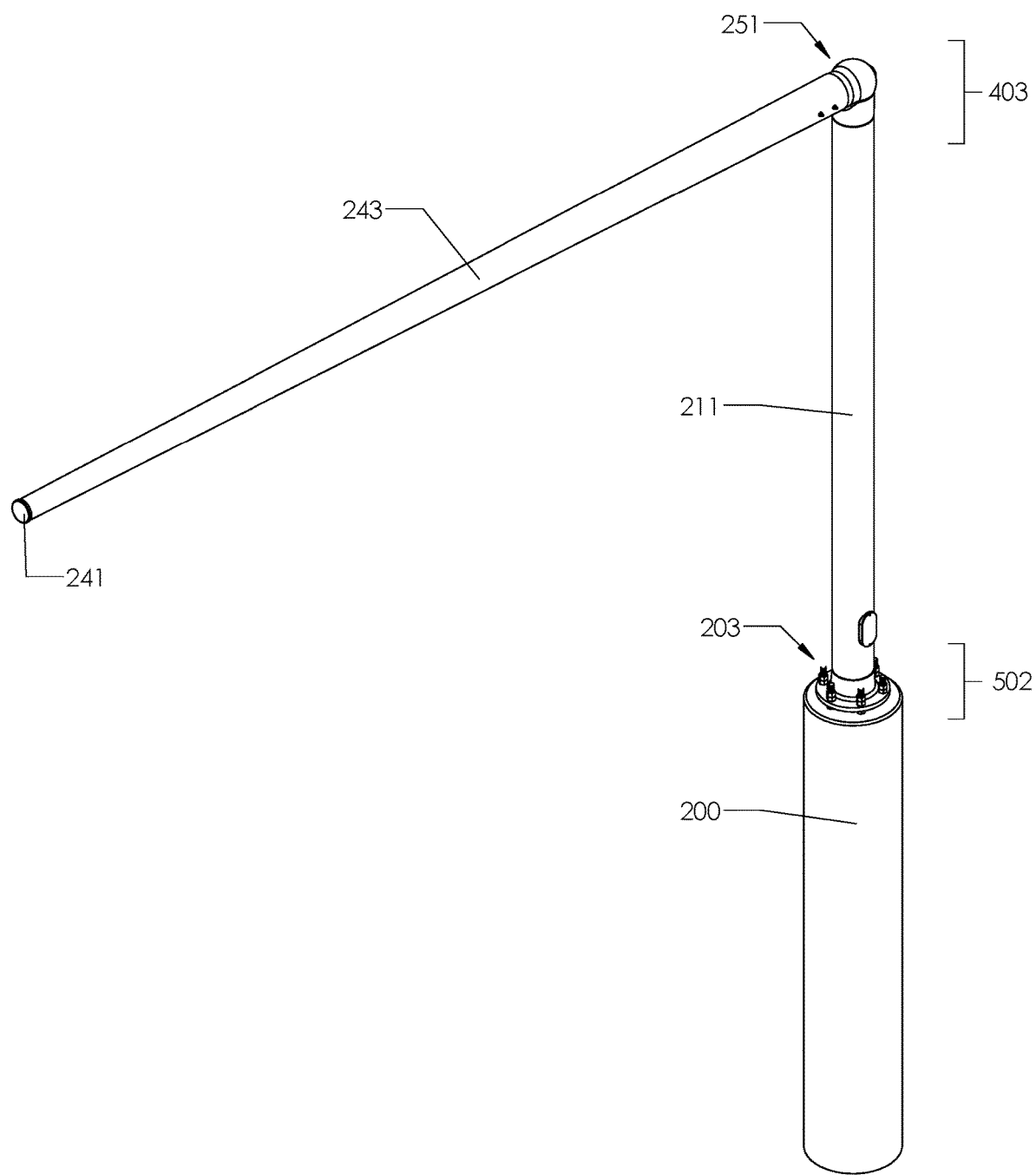
FIG. 17 is a perspective view of Exemplary Embodiment 3.

FIGS. 10 and 12 illustrate the pole to base junction assembly 502. Junction assembly 502 is used in Exemplary Embodiments 2 through 8. This junction connects the bottom 212 of pole 211 to casting 203 via CJP weld 210. Casting 203 is anchored to concrete foundation 200 using high strength anchor rods (bolts) 201 and nuts 202.

Each exemplary embodiment (1-10) discussed herein is a hollow structural system as shown by the mast-arm, pole, and casting through holes 209, 218, 228, 240, 246, 255, 265, 273, 290, 301, 309, 317, 335, and 341. The hollow nature of these structural systems facilitates wiring for lighting and traffic signals. It should be noted that a handhole access port 214 is shown in the bottom end 212 of the prismatic pole 211. Handhole 214 includes hole reinforcement components 215, a steel cover plate 216, and screws 217 to secure steel cover plate 216 in place.

In the depicted embodiments, all castings shown in Exemplary Embodiments 2 through 8, except casting 203, have been outfitted with handhole access ports 232 surrounded by reinforcement walls 231 and covered with a steel cap 233 which is secured in place by screws 234. In embodiments, the casting handholes within Exemplary Embodiments 2 through 8 are or may be of the same dimensions.

Exemplary Embodiment 3

Figure 18:
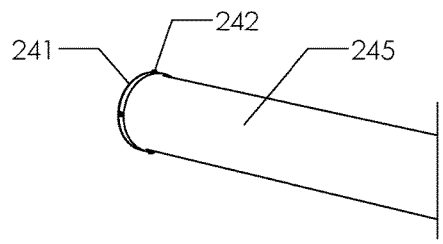
FIG. 18 is a perspective view of the end of a sleeved and bolted, tapered mast arm used in Exemplary Embodiments 3, 4, 6, 7, 8, and 10.

A third embodiment is shown in FIGS. 17 through 22. The major components used in Embodiment 3 include one pole connector casting 203, a prismatic pole 211, a mast arm connector casting 251, and a tapered, sleeved and bolted mast arm 243. FIG. 18 shows the distal end 245 of the tapered, sleeved and bolted mast arm 243, its end cap 241 and screws 242 securing the cap in place. The tapered, sleeved and bolted mast arm 243 is also used in Exemplary Embodiments 4, 6, 7, and 8.

Figure 19:
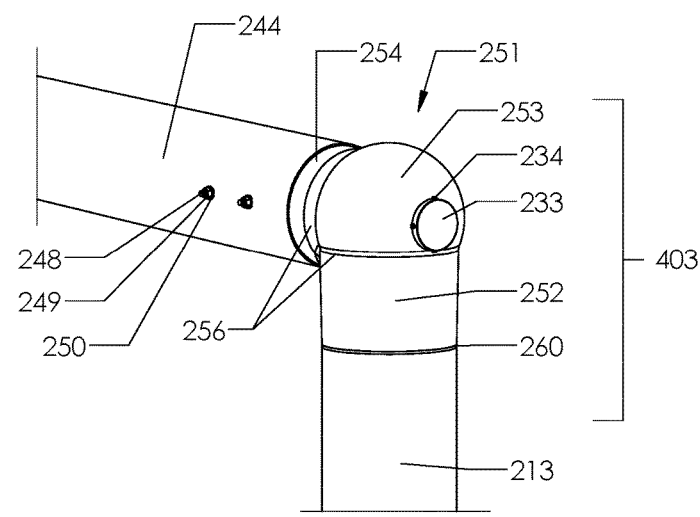
FIG. 19 is a perspective view of the junction between the mast arm and pole used in Exemplary Embodiment 3.
Figure 20:
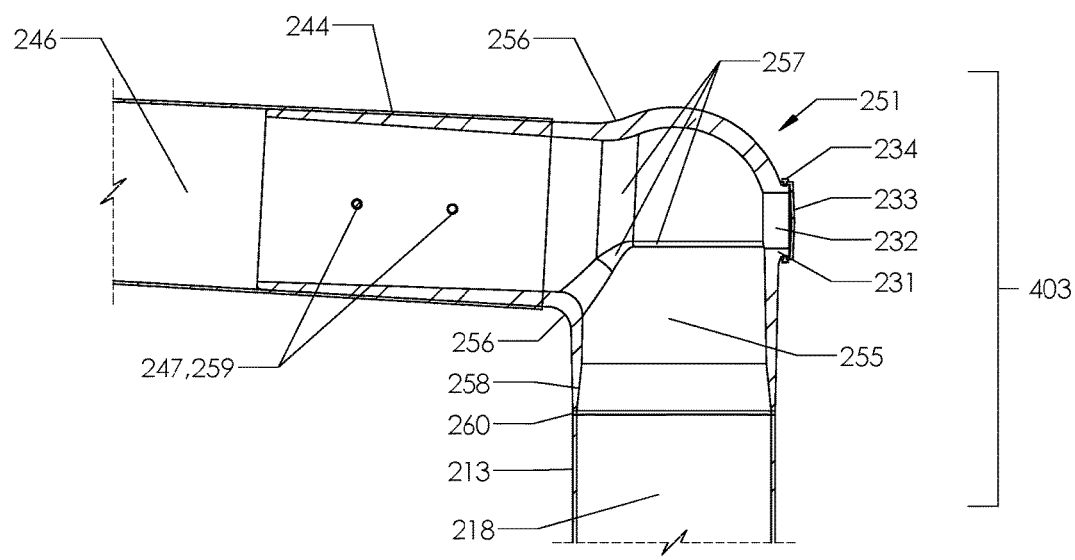
FIG. 20 is a cross section cut through the junction between the mast arm and pole used in Exemplary Embodiment 3.
Figure 21:
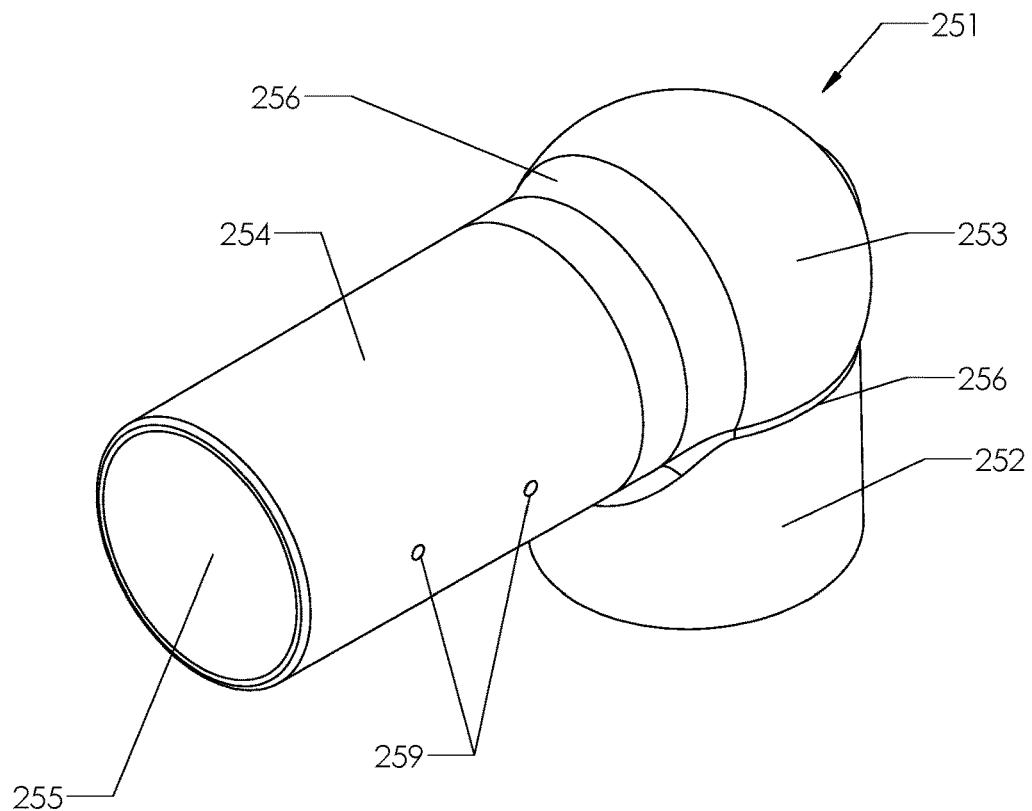
FIG. 21 is a perspective view of the mast arm connector casting used in Exemplary Embodiment 3.
Figure 22:
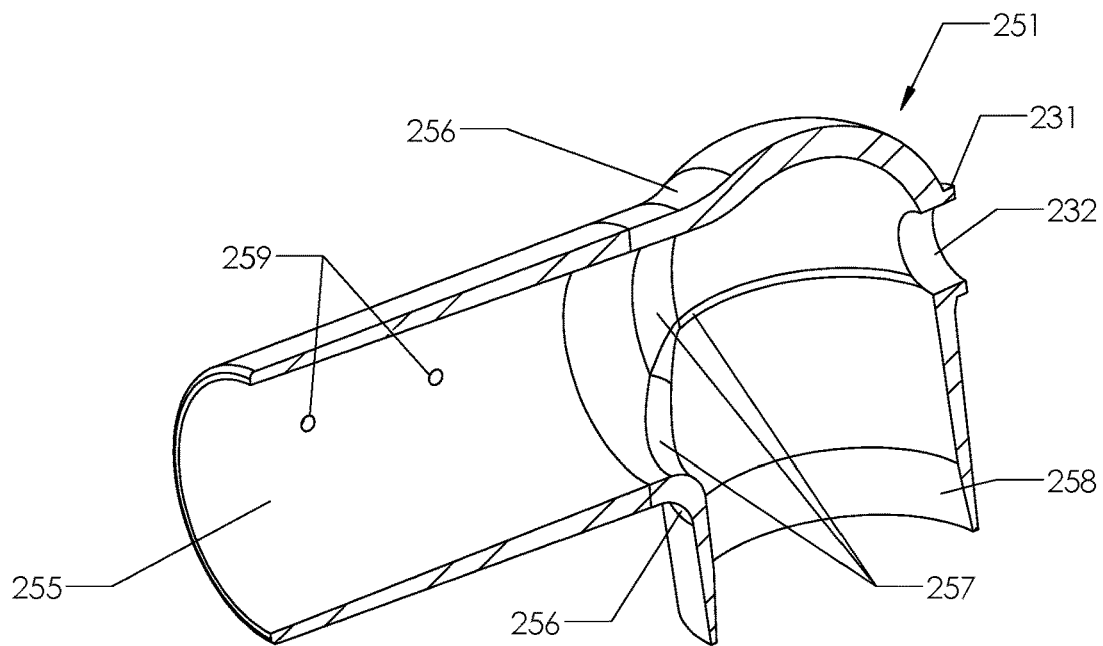
FIG. 22 is cross section cut through the mast arm connector casting used in Exemplary Embodiment 3.
Figure 23:
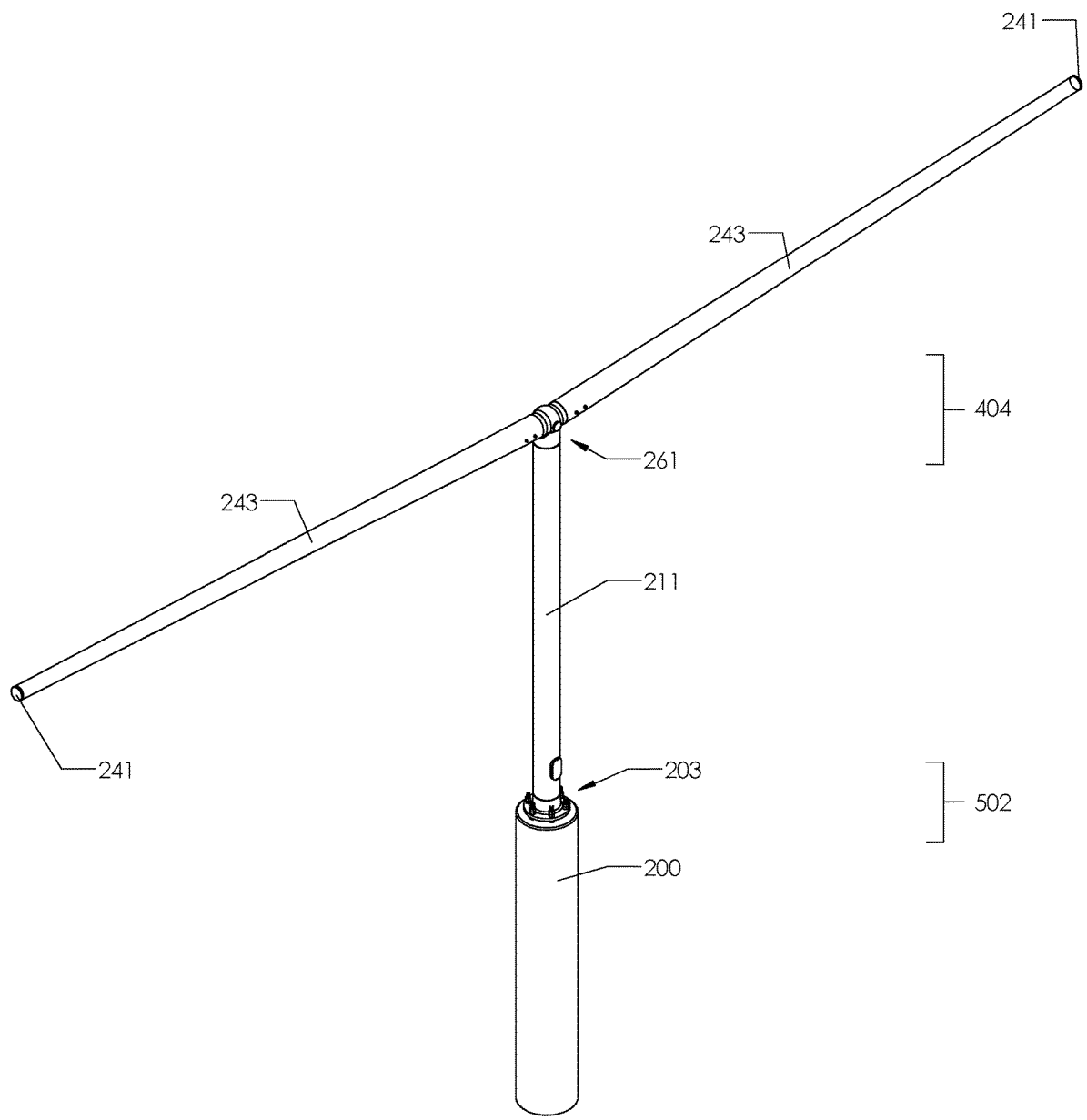
FIG. 23 is a perspective view of Exemplary Embodiment 4.

FIGS. 19 and 20 illustrate the mast arm to pole junction assembly 403. This junction assembly 403 connects proximal end 244 of mast arm 243 to horizontal portion 254 of casting 251 using a sleeved connection. In embodiments, the mast-arm 243 slides over the top of horizontal portion 254 a distance not less than one and a half times the internal diameter of the mast arm proximal end. In embodiments, holes 247, 259 may be drilled in the field after the mast arm has been secured tightly against the horizontal portion 254 of the casting 251; although, in other embodiments, these holes 247, 259 can also be drilled in the fabrication shop prior to galvanizing the connected components.

After the mast arm 243 is installed and the holes 247, 259 are drilled (whether drilling before or after sleeving of the mast arm 243 over the casting horizontal portion 254), high strength threaded rods 248 are inserted through the full diameter of the sleeved connection. In other words, the threaded rods 248 are continuous from one side of the mast-arm to the other. Washers 250 and high strength nuts 249 are used on each end of the threaded rod 248 and installed to a snug tight condition. In embodiments, the installer may damage the exposed threads on each side of the mast arm to prevent nuts from loosening. This description applies to all sleeved connections utilized in the present invention and will be referenced as needed for the remaining embodiments.

Junction assembly 403 also employs a CJP weld 260 to connect the bottom of the vertical portion 252 of casting 251 to the top 213 of the prismatic pole 211. A bevel 258 is machined into the interior wall of casting 251 to facilitate the weld process and to improve the flow of stress. This also results in a better detail for fatigue resistance. Bevel 258 is also used in the bottoms of castings 261, 296, and 312 for the same reasons mentioned previously.

Casting 251 is further comprised of a spherical portion 253, which is connected to 252 and 254 through structurally optimized exterior and interior fillets 256 and 257 to reduce stress concentrations.

Exemplary Embodiment 4

The fourth embodiment is shown in FIGS. 23 through 27. The major components used in Embodiment 4 include one pole connector casting 203, a prismatic pole 211, a mast arm connector casting 261, and two tapered, sleeved and bolted mast arms 243.

Figure 24:
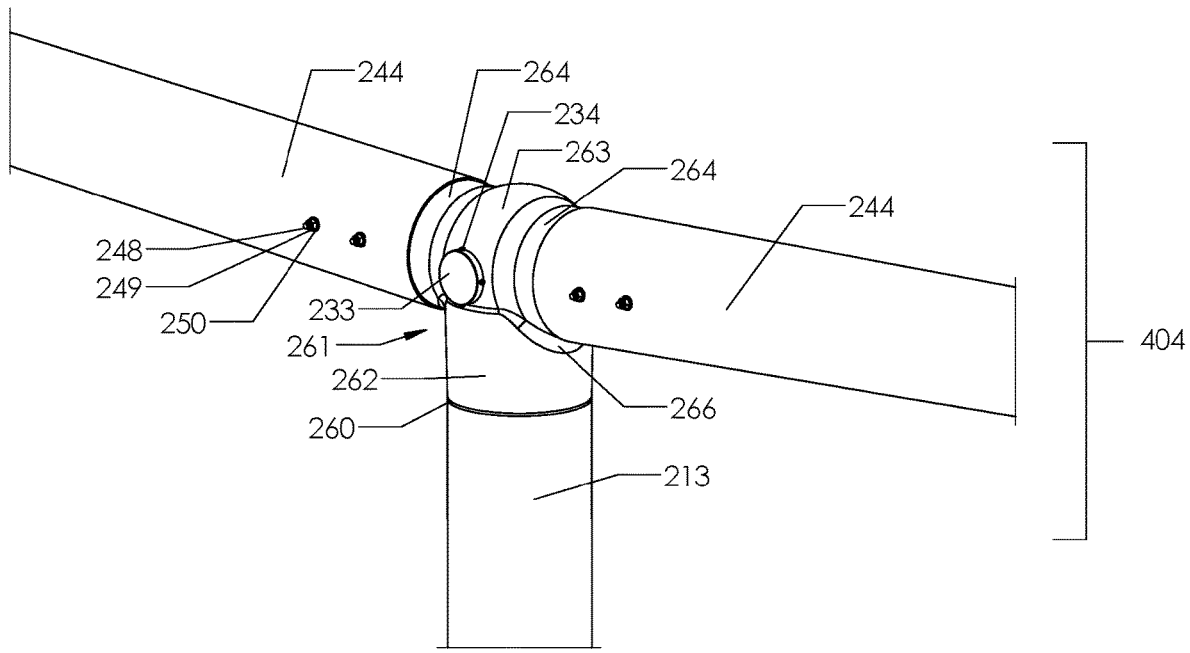
FIG. 24 is a perspective view of the junction between the mast arms and pole used in Exemplary Embodiment 4.
Figure 25:
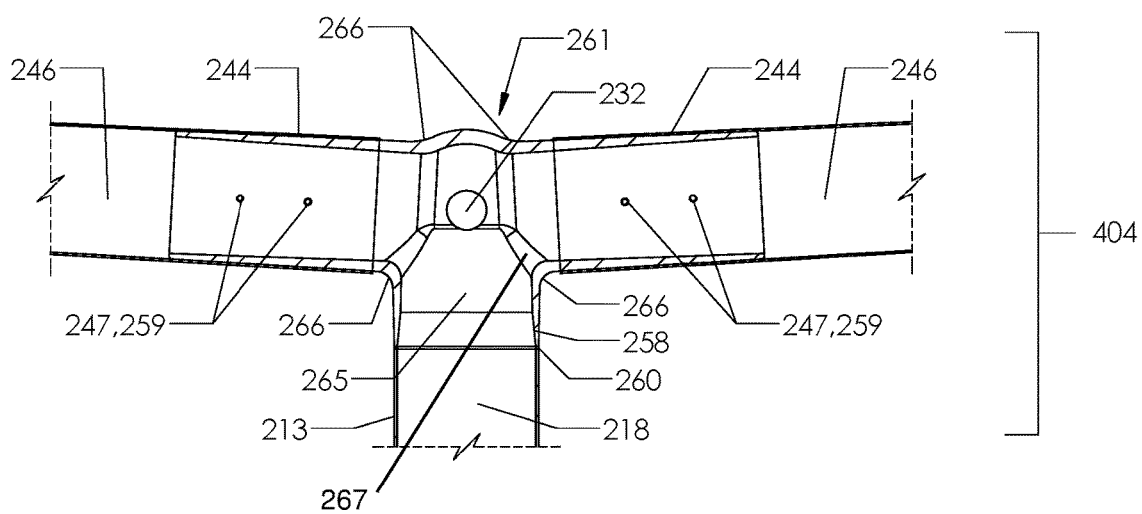
FIG. 25 is a cross section cut through the junction between the mast arms and pole used in Exemplary Embodiment 4.
Figure 26:
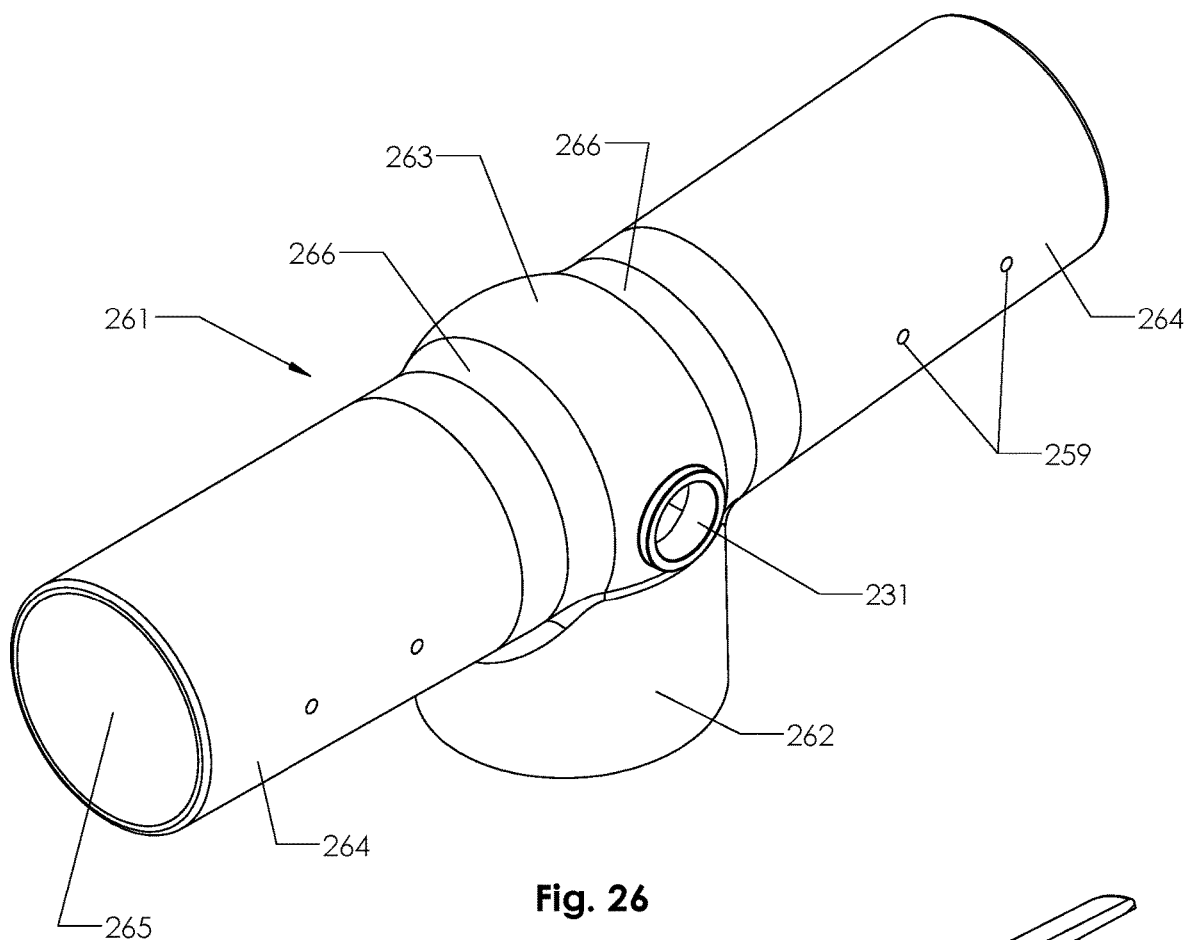
FIG. 26 is a perspective view of the mast arm connector casting used in Exemplary Embodiment 4.
Figure 27:
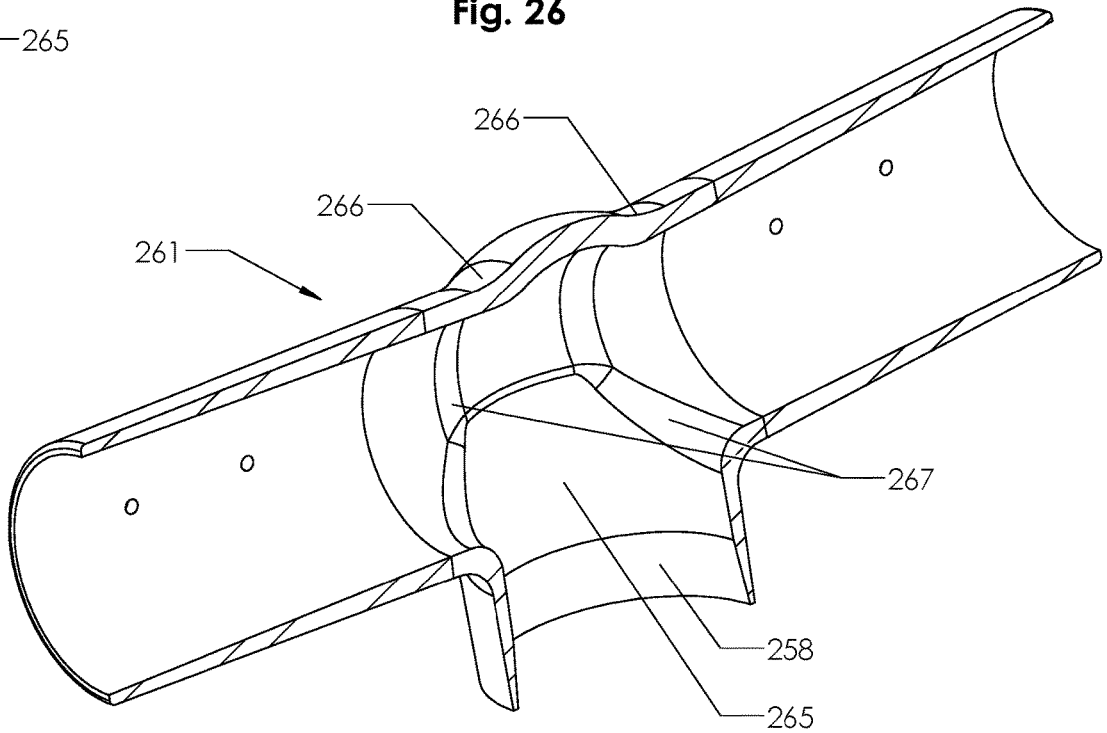
FIG. 27 is cross section cut through the mast arm connector casting used in Exemplary Embodiment 4.
Figure 28:
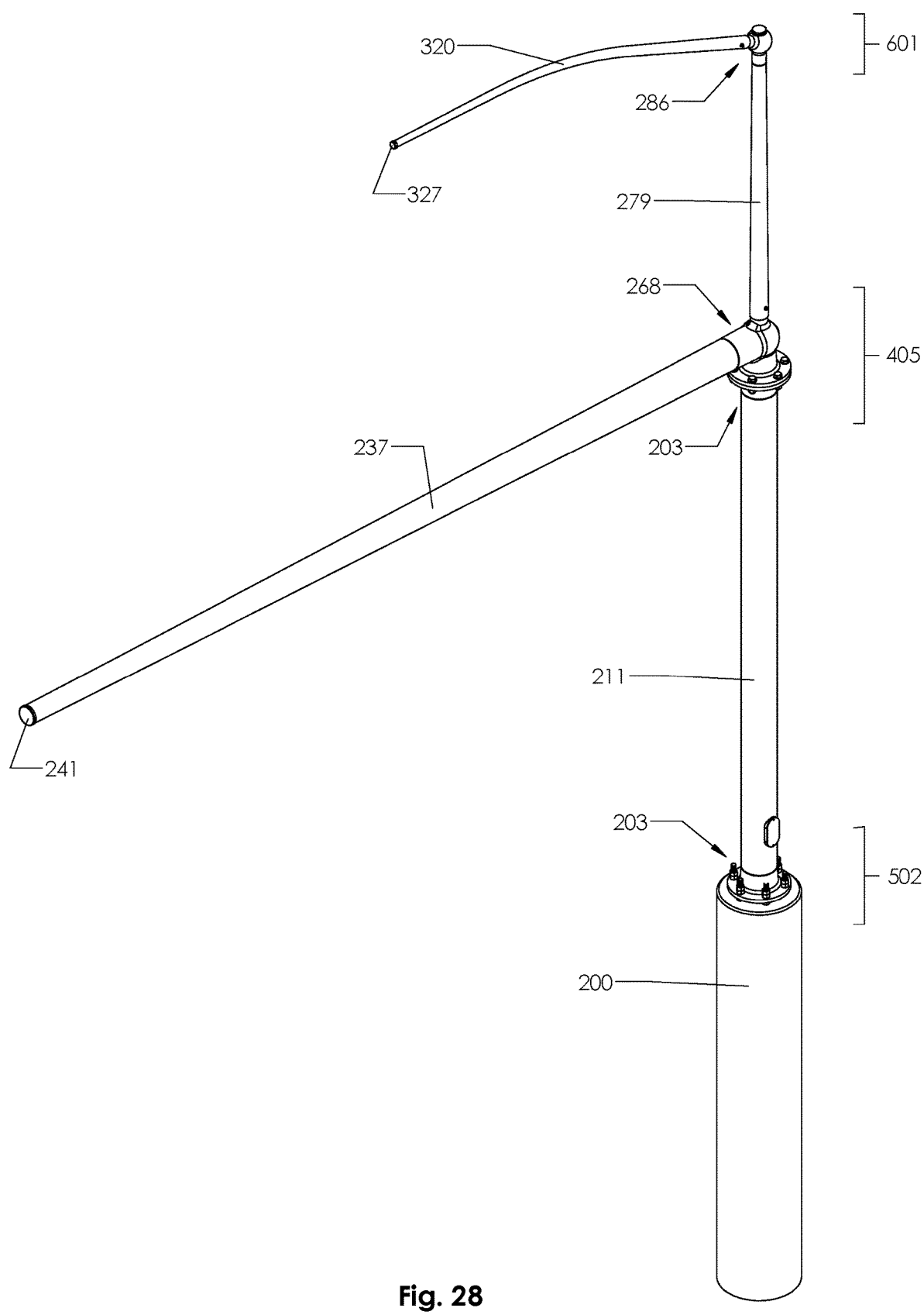
FIG. 28 is a perspective view of Exemplary Embodiment 5.

FIGS. 24 and 25 illustrate the mast arm to pole junction assembly 404. This junction assembly 404 connects proximal ends 244 of mast arms 243 to horizontal portions 264 of casting 261 using sleeved and threaded rod connections described previously. It should be noted that horizontal portions 264 (and 316 of casting 312) can be sized differently from one side of the casting to the other to accommodate different mast arm proximal end diameters. Junction assembly 404 also includes a CJP weld 260 between the bottom portion of casting 262 and the top 213 of the prismatic pole 211.

Casting 261 is further comprised of a spherical portion 263, which is connected to casting 262 and horizontal portions 264 through structurally optimized exterior and interior fillets 266 and 267 to reduce stress concentrations.

Exemplary Embodiment 5

A fifth embodiment is shown in FIGS. 28 through 36. The major components used in Exemplary Embodiment 5 include two pole connector castings 203, a prismatic pole 211, a mast arm connector casting 268, one tapered, welded mast arm 237, one tapered vertical extension pole 279, one luminaire connector casting 286, and one tapered (straight or curved) luminaire arm 320.

Figure 30:
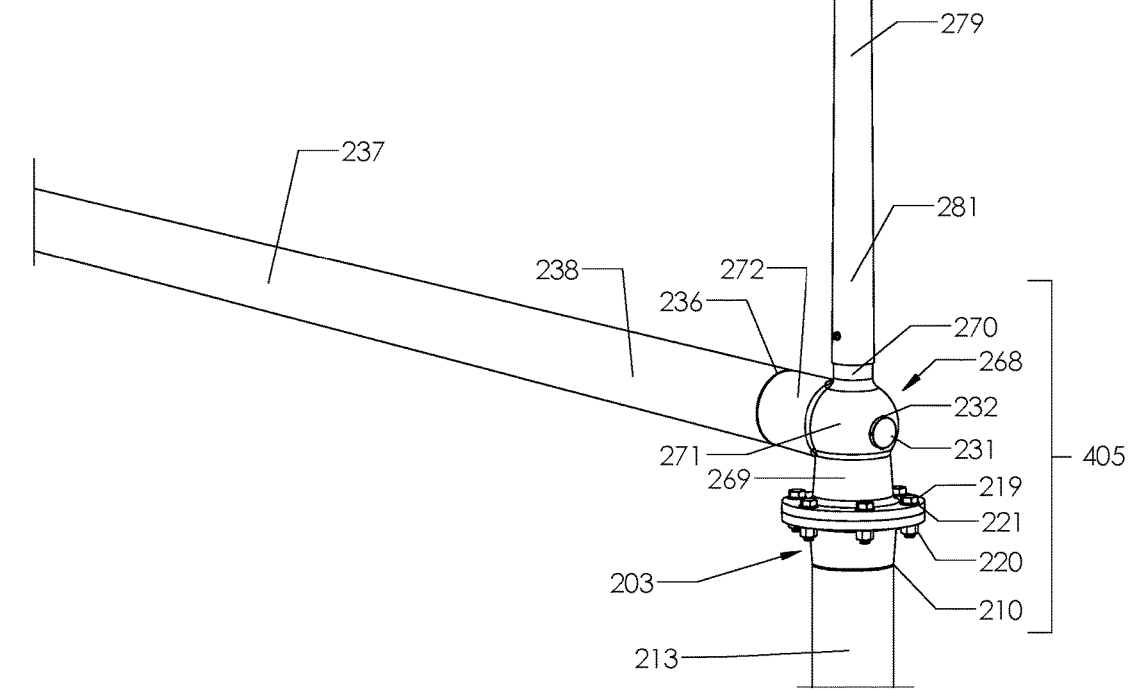
FIG. 30 is a perspective view of the junctions between the mast arm and pole and the luminaire arm and vertical pole extension used in Exemplary Embodiment 5.
Figure 32:
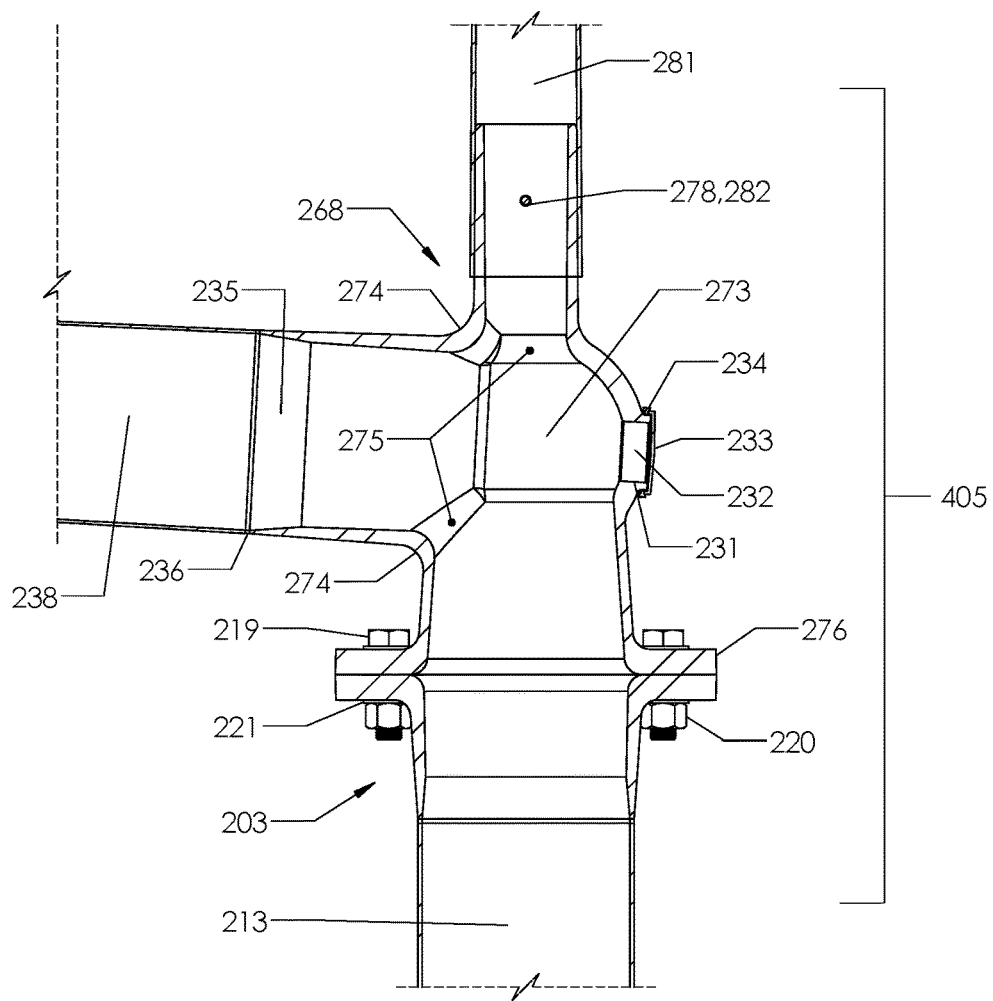
FIG. 32 is a cross section cut through the junction between the mast arm, pole, and vertical pole extension used in Exemplary Embodiment 5.
Figure 33:
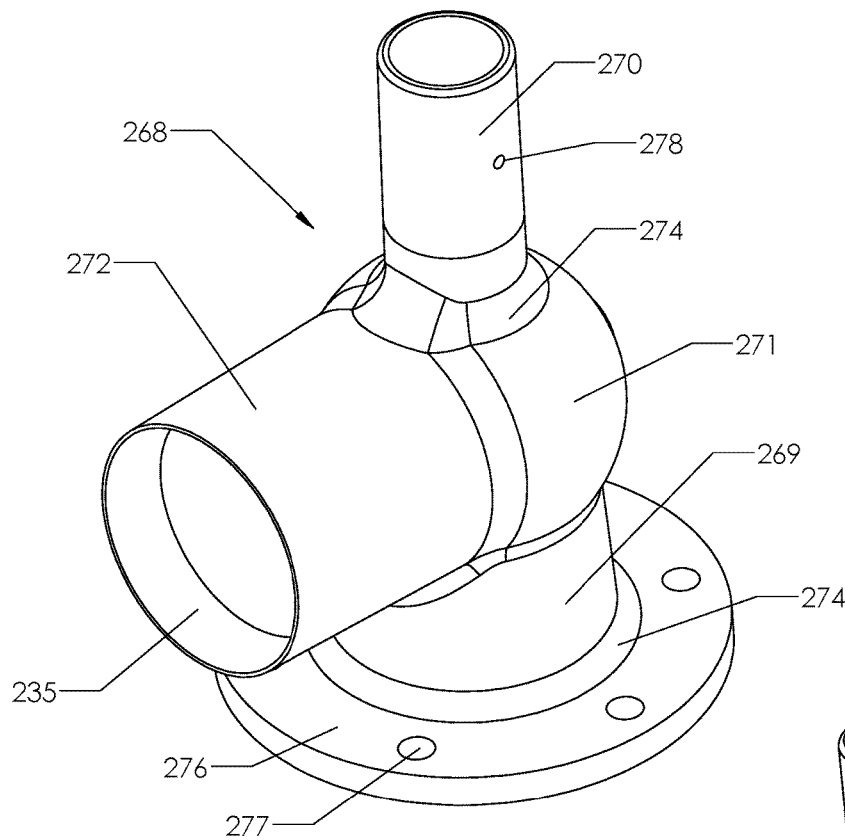
FIG. 33 is a perspective view of the mast arm connector casting used in Exemplary Embodiment 5.
Figure 34:
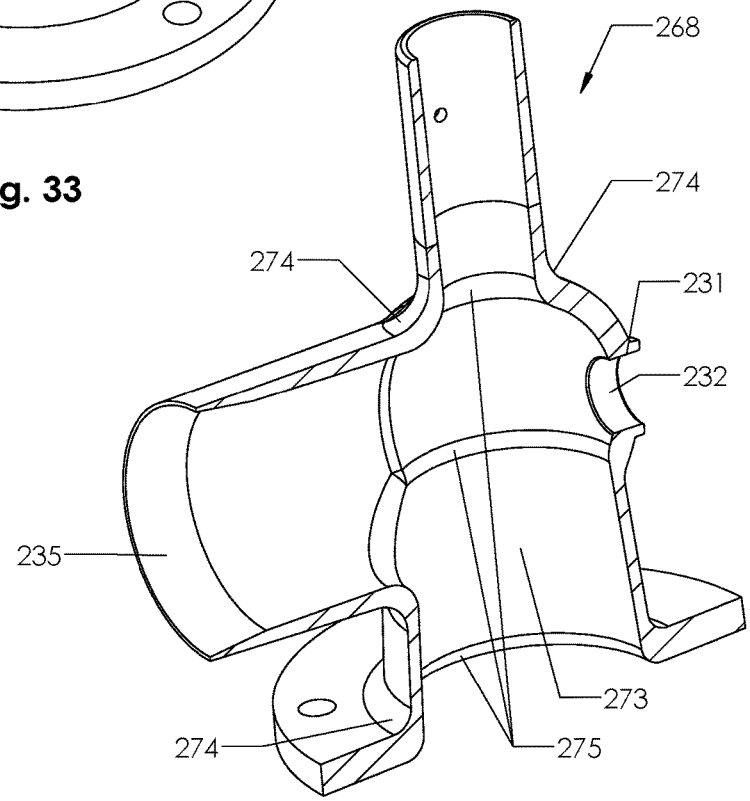
FIG. 34 is a cross section cut through the mast arm connector casting used in Exemplary Embodiment 5.
Figure 35:
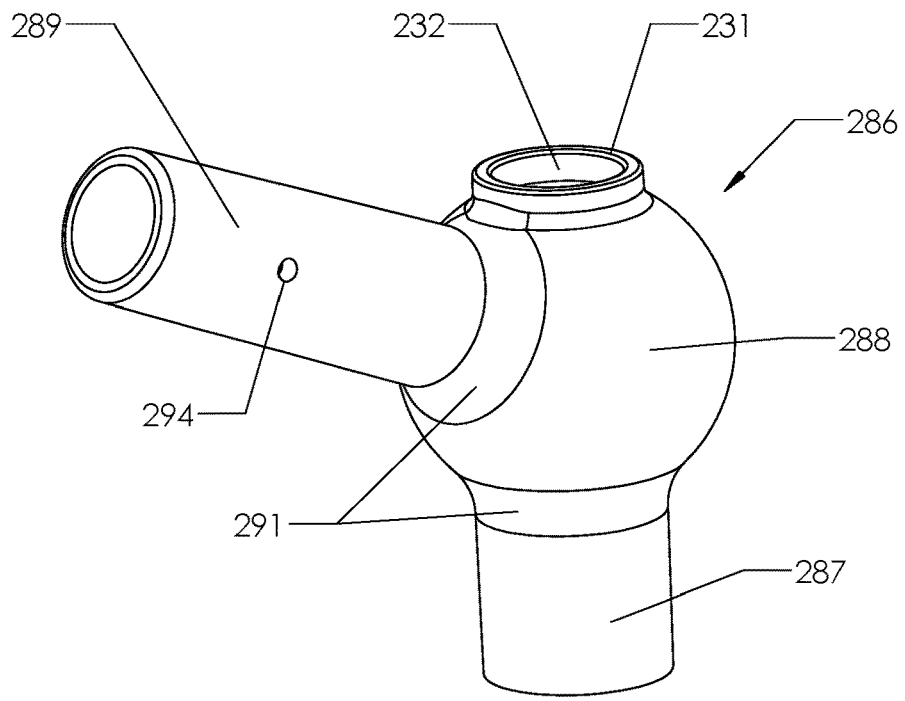
FIG. 35 is a perspective view of the luminaire arm connector casting used in Exemplary Embodiments 5 and 6.
Figure 36:
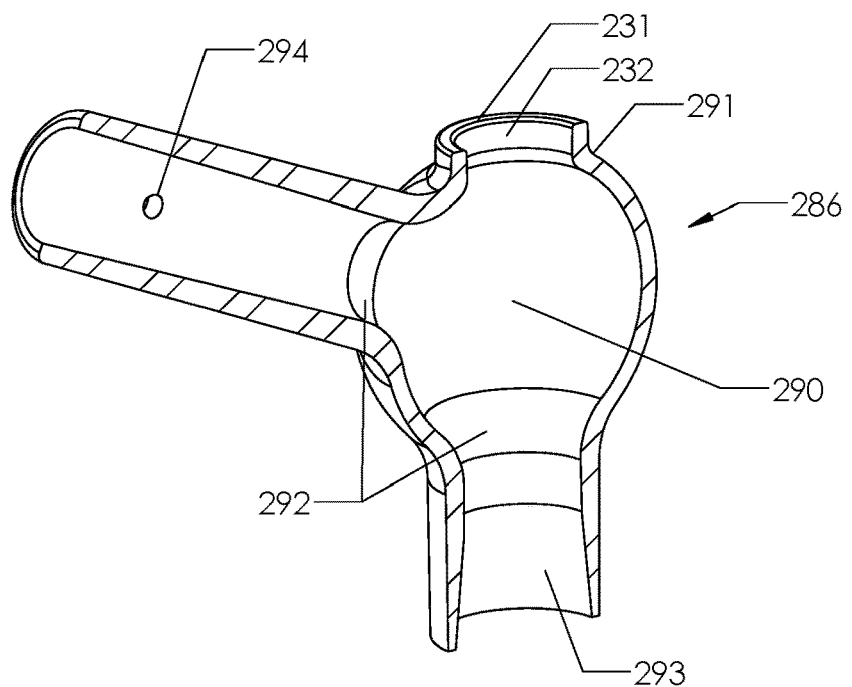
FIG. 36 is a cross section cut through the luminaire arm connector casting used in Exemplary Embodiments 5 and 6.
Figure 37:
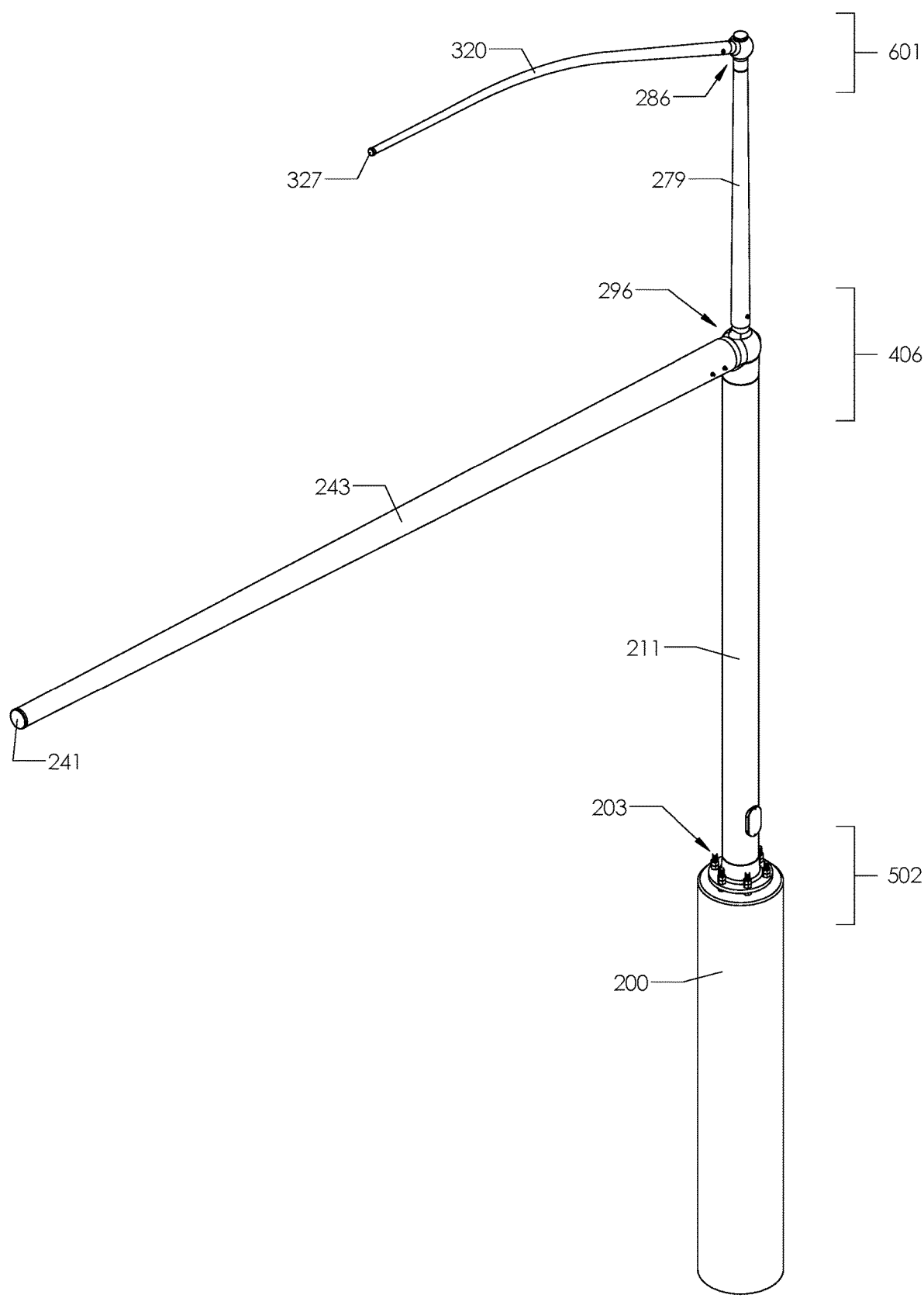
FIG. 37 is a perspective view of Exemplary Embodiment 6.
Figure 38:
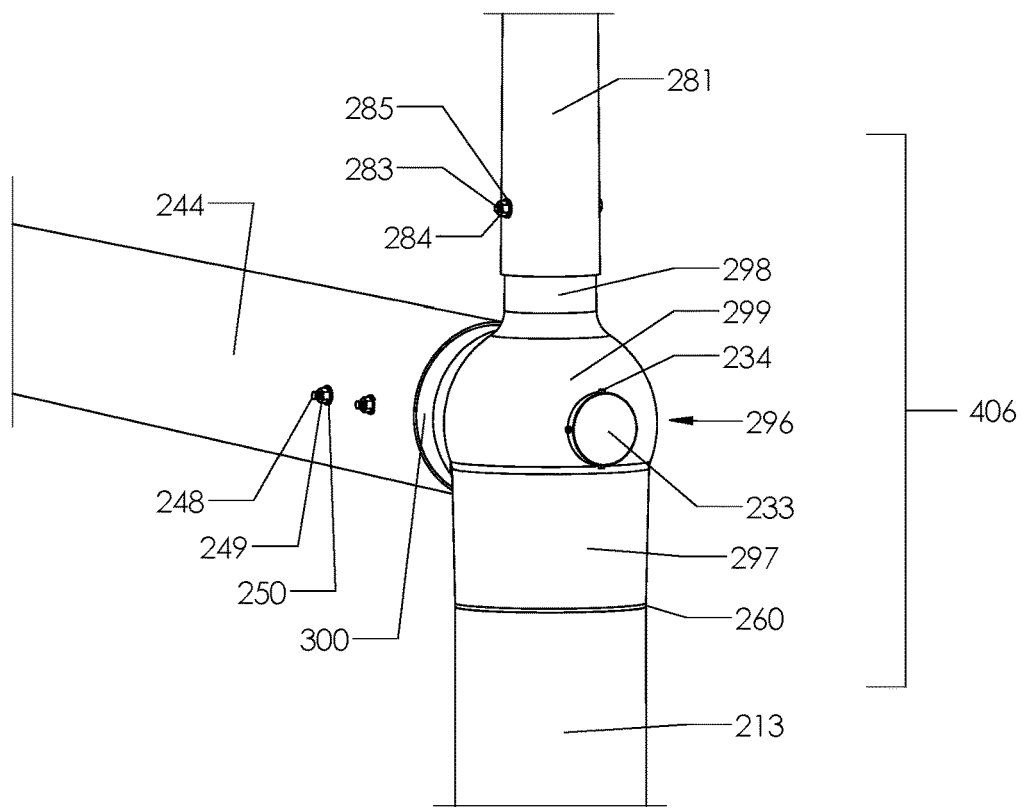
FIG. 38 is a perspective view of the junction between the mast arm, pole and vertical pole extension used in Exemplary Embodiments 6 and 7.
Figure 39:
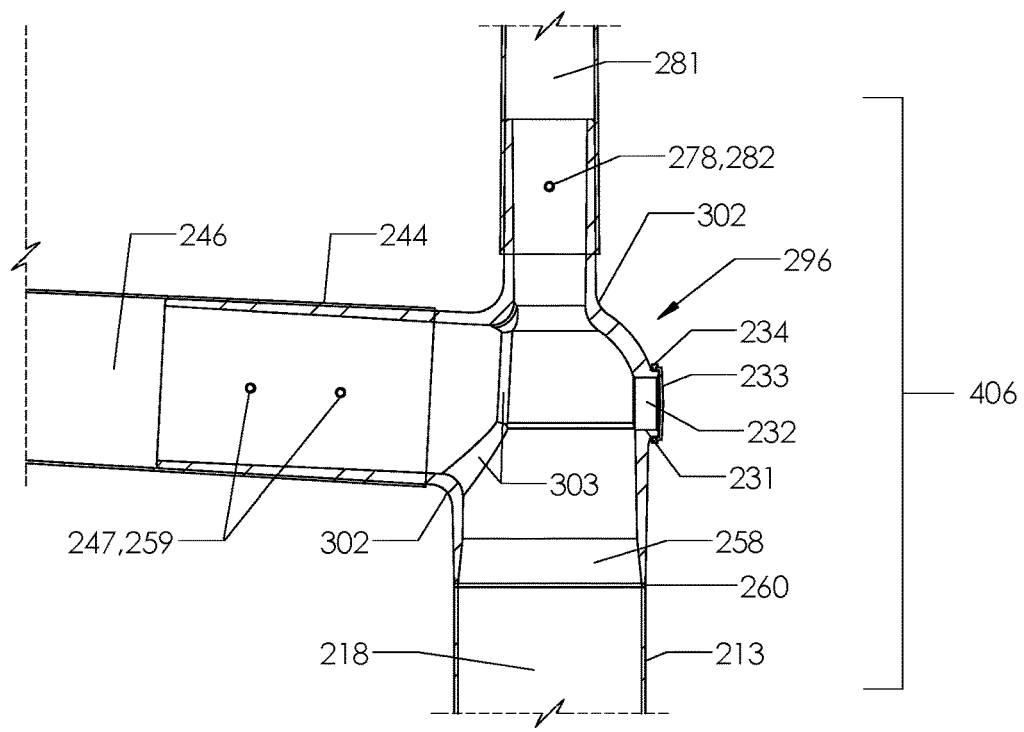
FIG. 39 is a cross section cut through the junction between the mast arm, pole and vertical pole extension used in Exemplary Embodiments 6 and 7.
Figure 40:
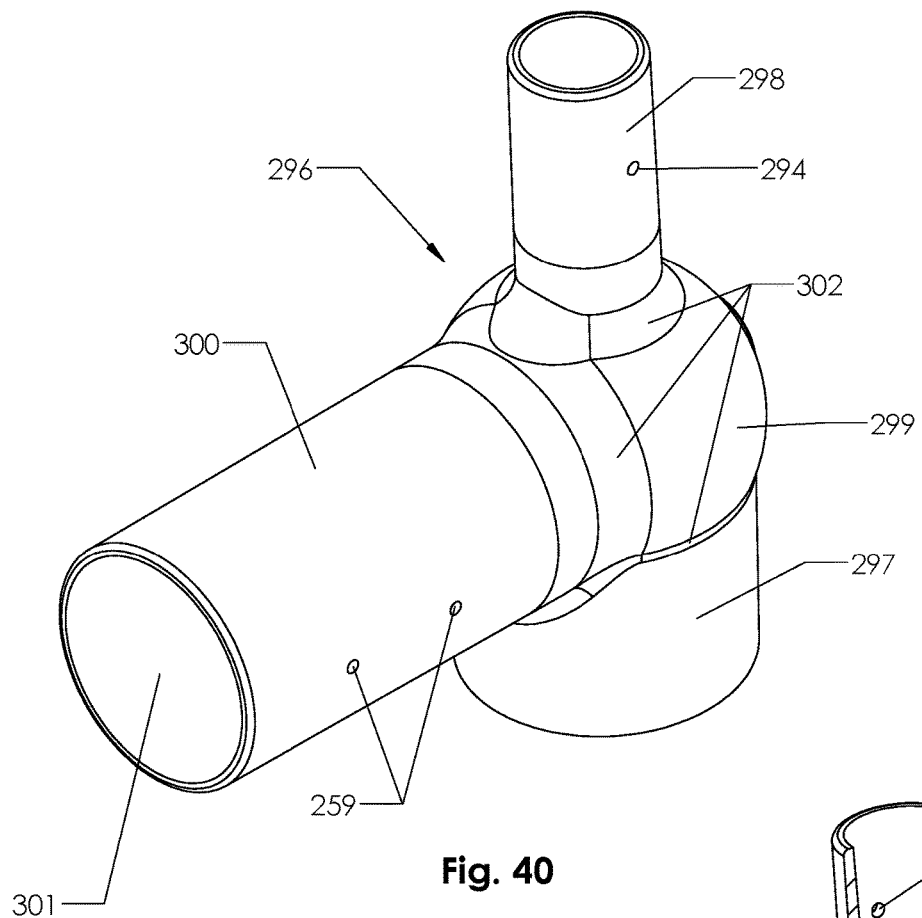
FIG. 40 is a perspective view of the mast arm connector casting used in Exemplary Embodiments 6 and 7.
Figure 41:
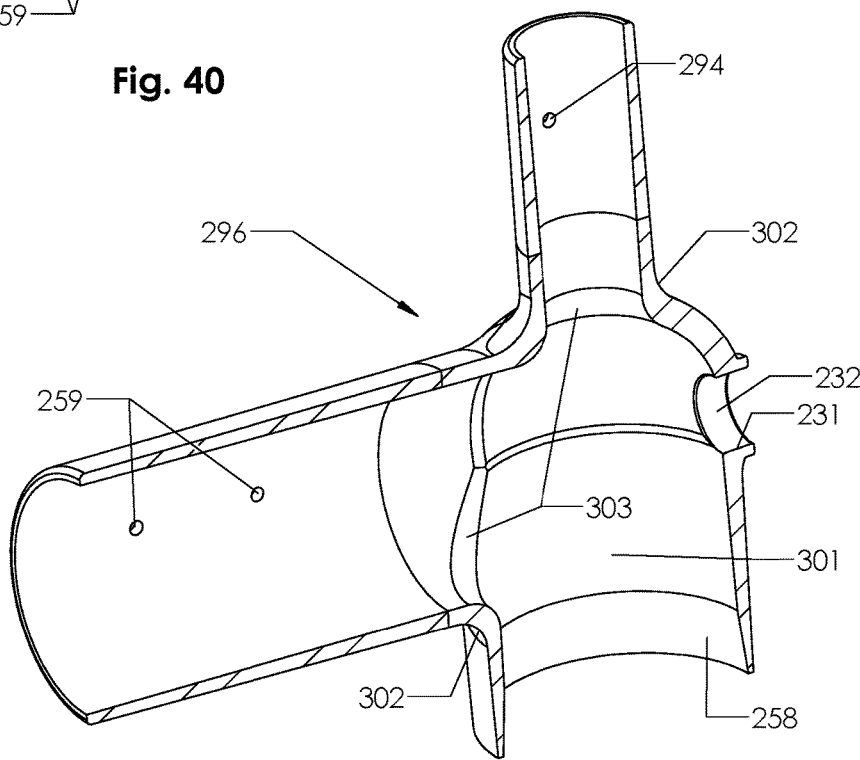
FIG. 41 is a cross section cut through the mast arm connector casting used in Exemplary Embodiments 6 and 7.
Figure 42:
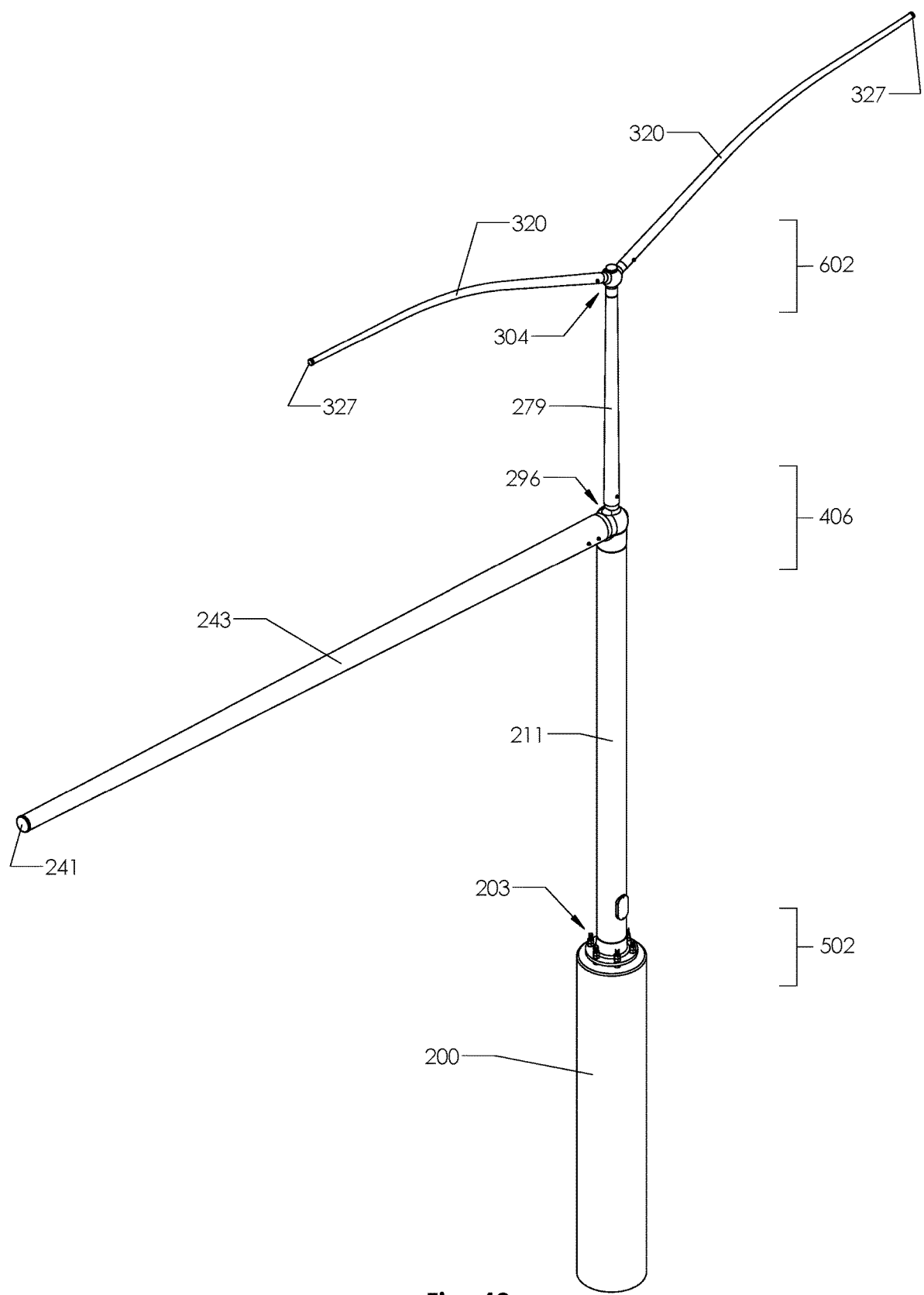
FIG. 42 is a perspective view of Exemplary Embodiment 7.
Figure 43:
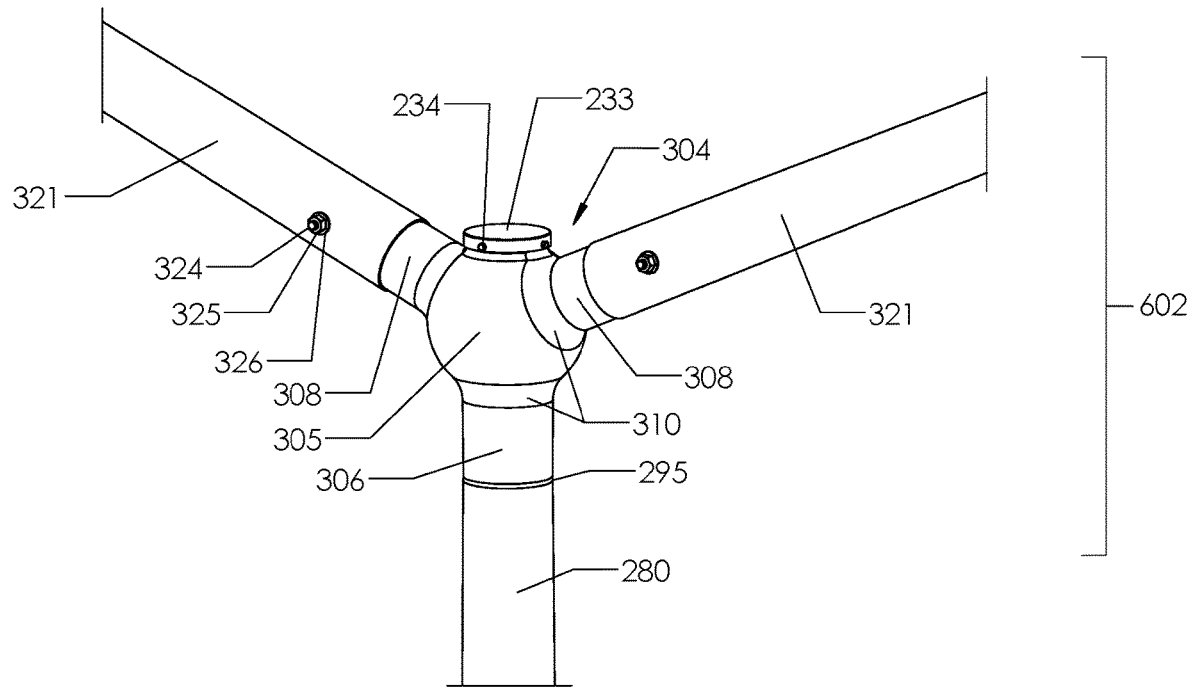
FIG. 43 is a perspective view of the junction between the luminaire arms and the vertical pole extension used in Exemplary Embodiments 7 and 8.
Figure 44:
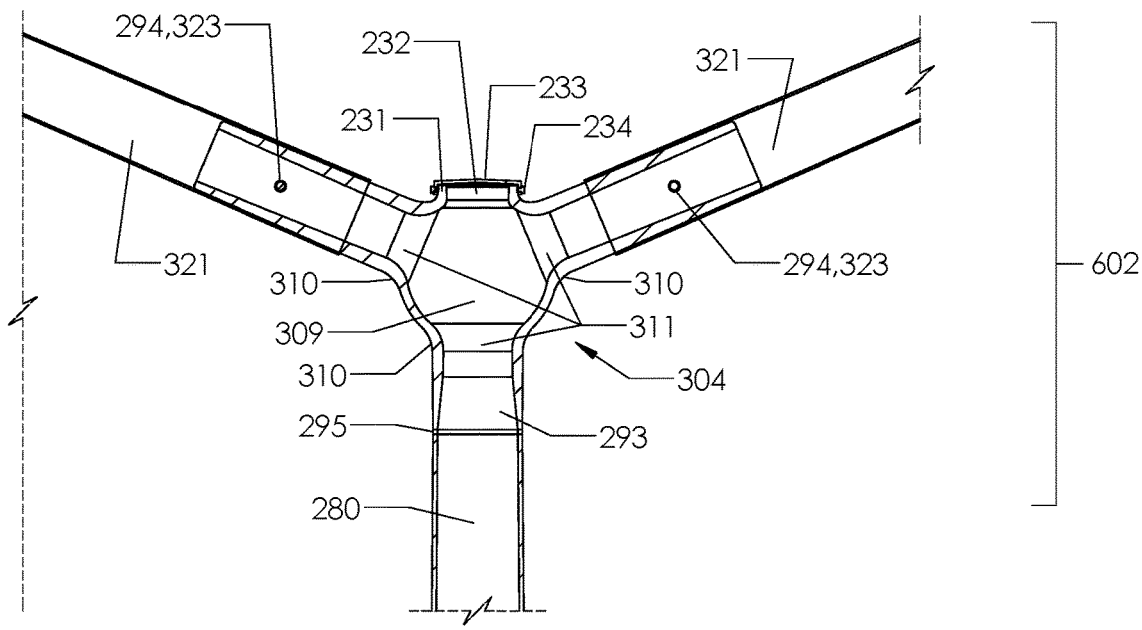
FIG. 44 is a cross section cut through the junction between the luminaire arms and the vertical pole extension used in Exemplary Embodiments 7 and 8.
Figure 45:
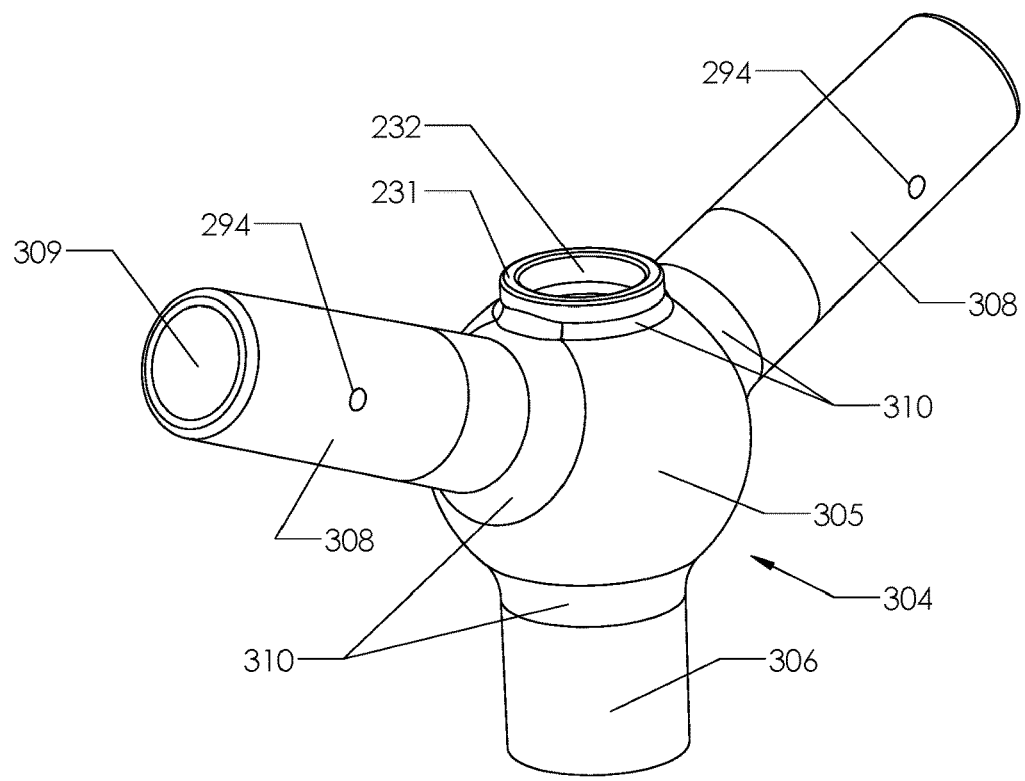
FIG. 45 is a perspective view of the luminaire arm connector casting used in Exemplary Embodiments 7 and 8.
Figure 46:
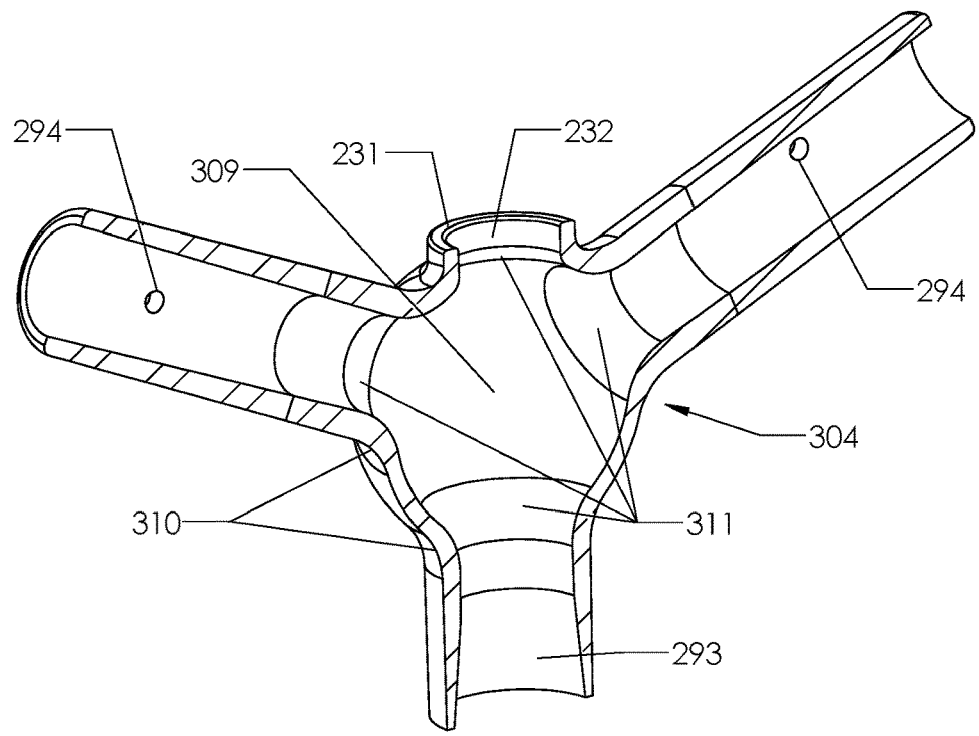
FIG. 46 is a cross section cut through the luminaire arm connector casting used in Exemplary Embodiments 7 and 8.
Figure 47:
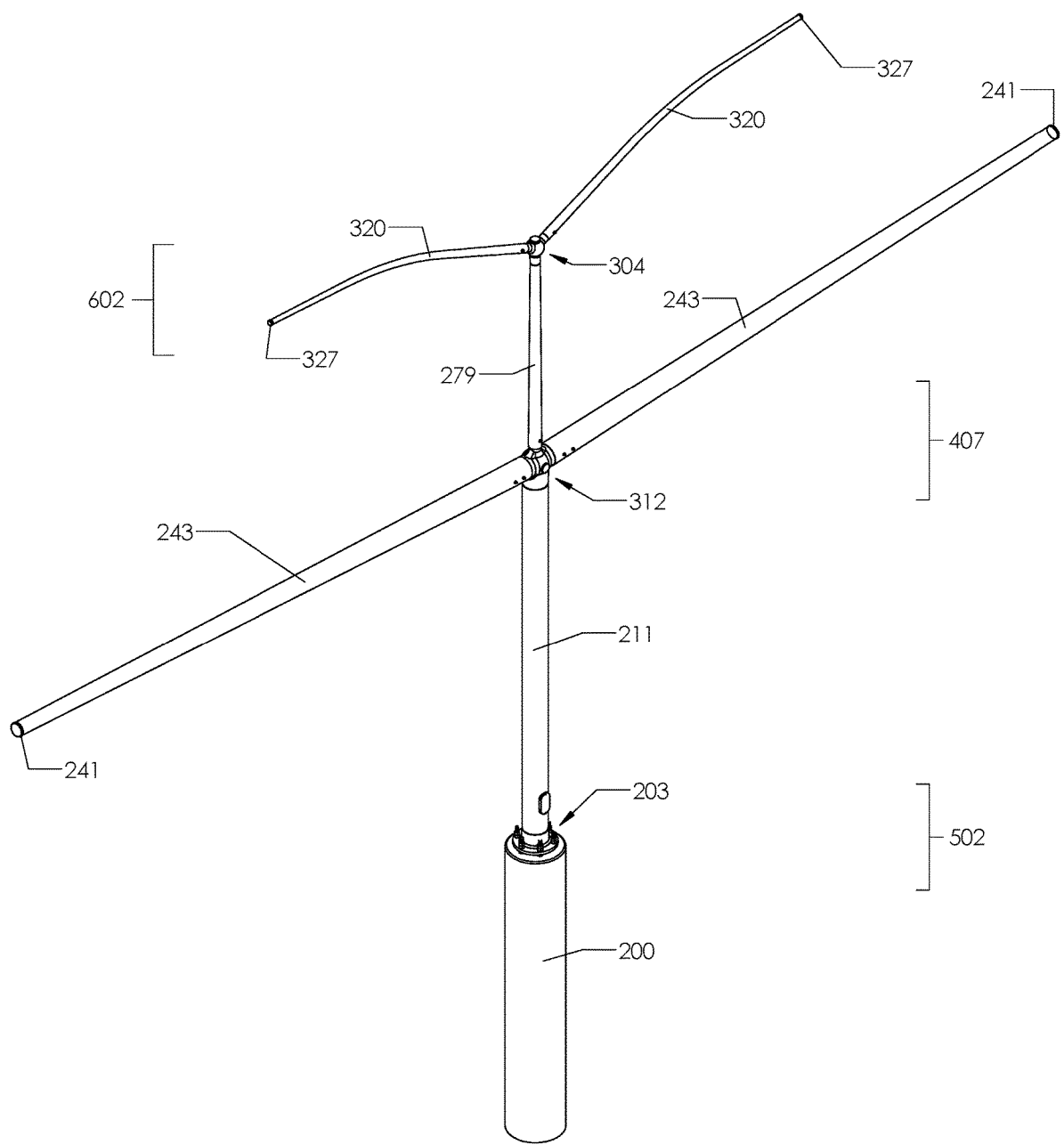
FIG. 47 is a perspective view of Exemplary Embodiment 8.
Figure 48:
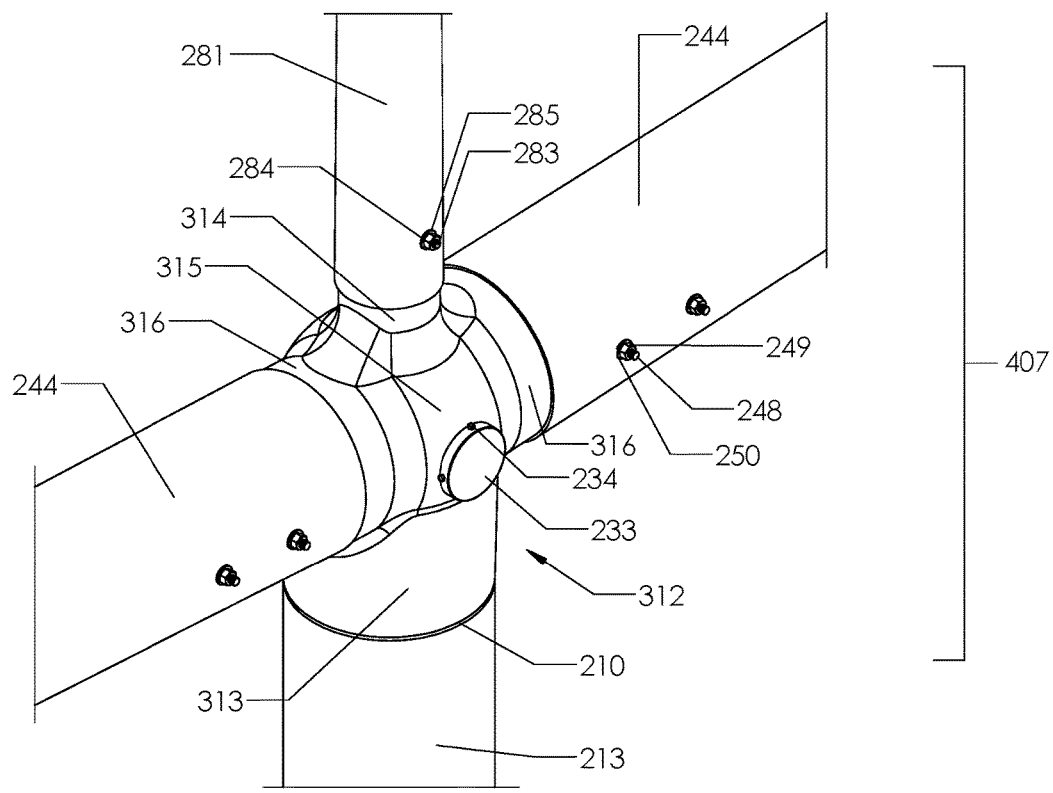
FIG. 48 is a perspective view of the junction between the mast arms, pole, and vertical pole extension used in Exemplary Embodiment 8.
Figure 49:
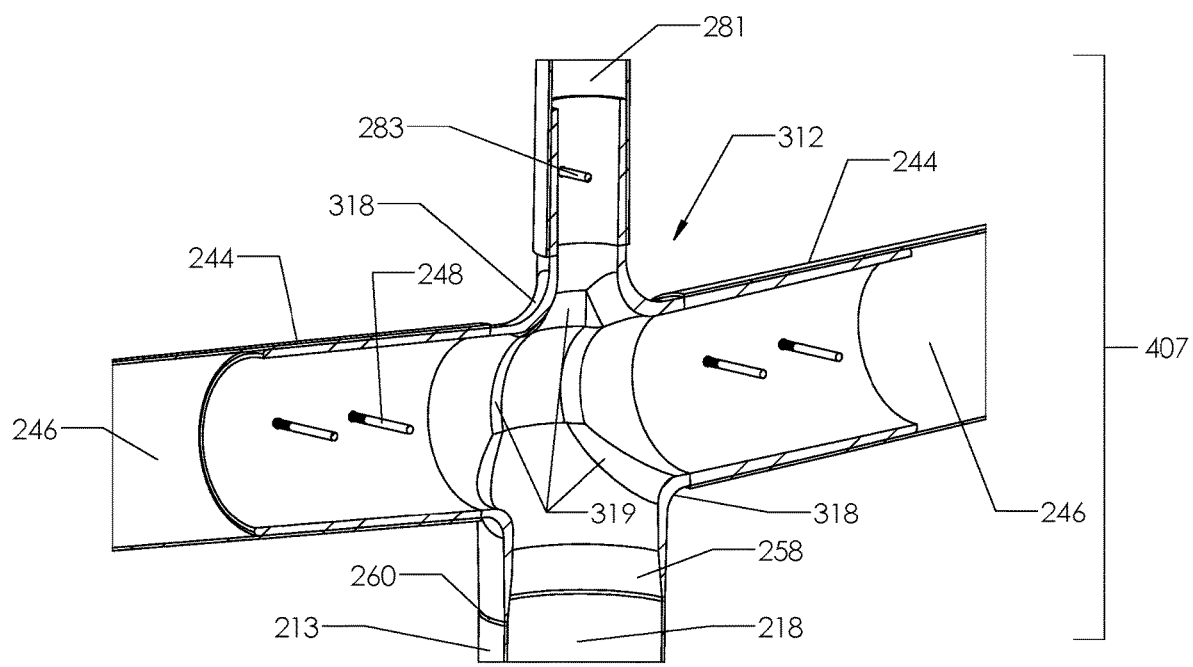
FIG. 49 is a cross section cut through the junction between the mast arms, pole, and vertical pole extension used in Exemplary Embodiment 8.
Figure 50:
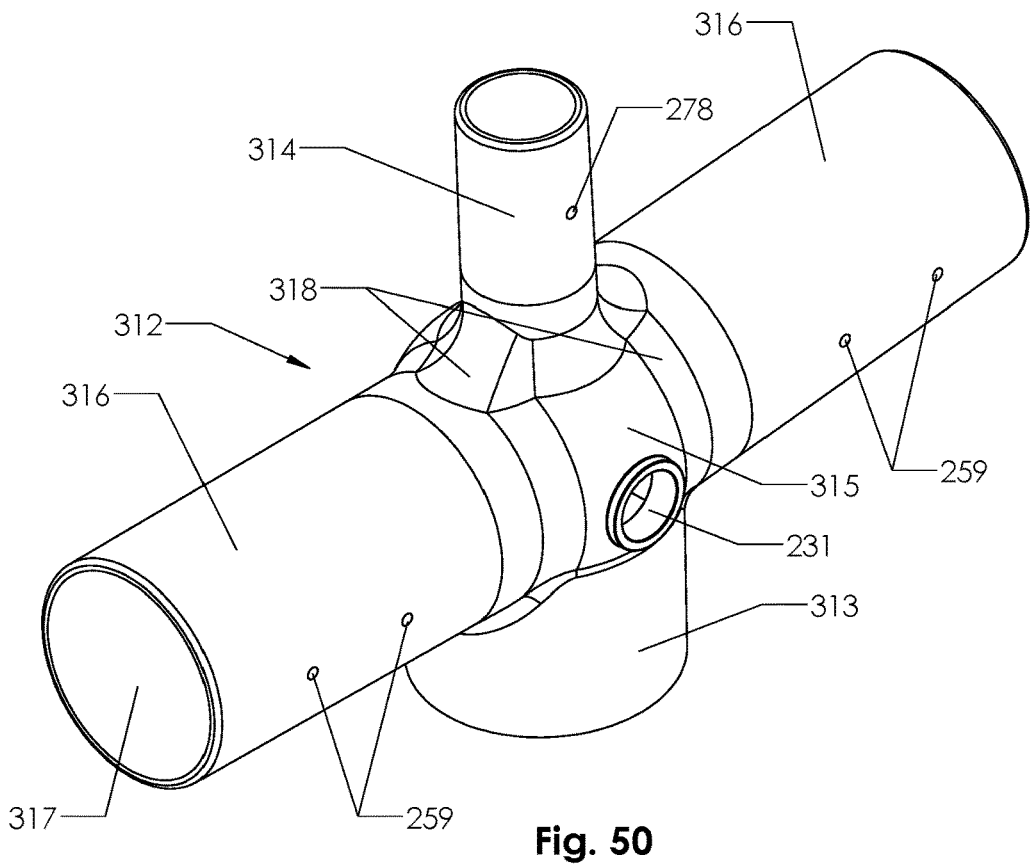
FIG. 50 is a perspective view of the mast arm connector casting used in Exemplary Embodiment 8.
Figure 51:
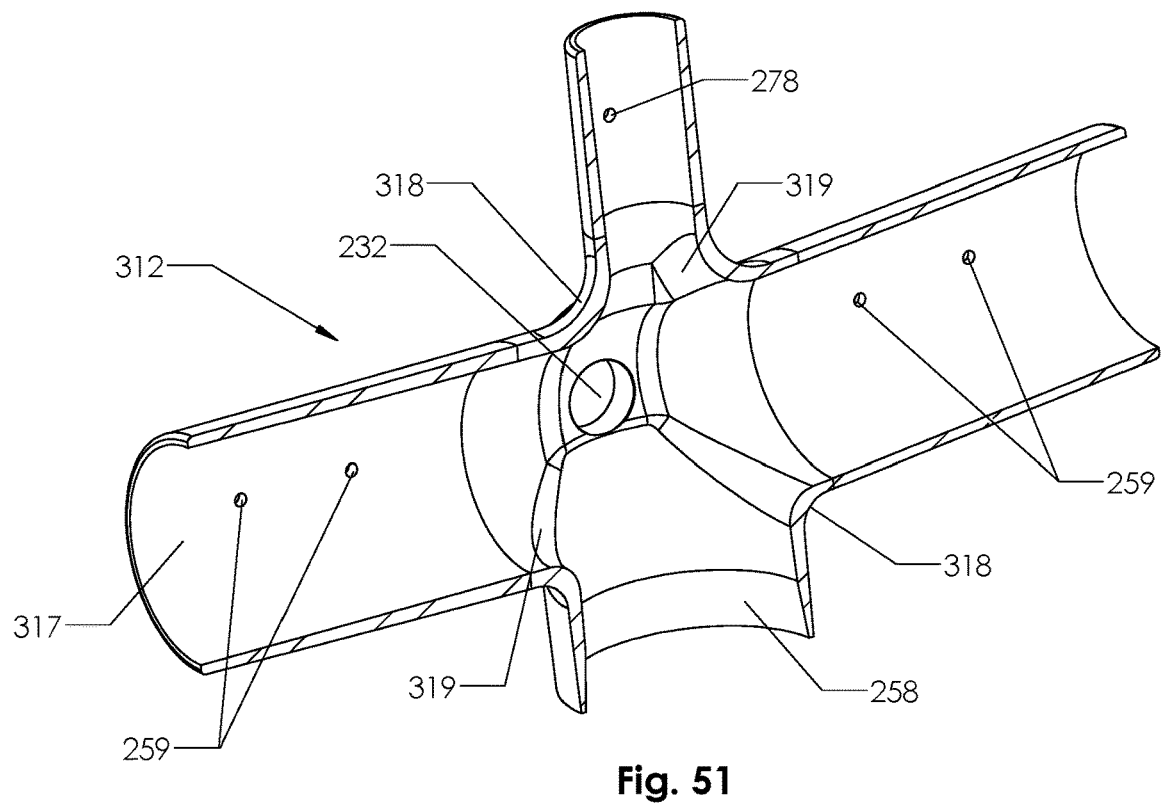
FIG. 51 is a cross section cut through the mast arm connector casting used in Exemplary Embodiment 8.
Figures 63, 64, 65:
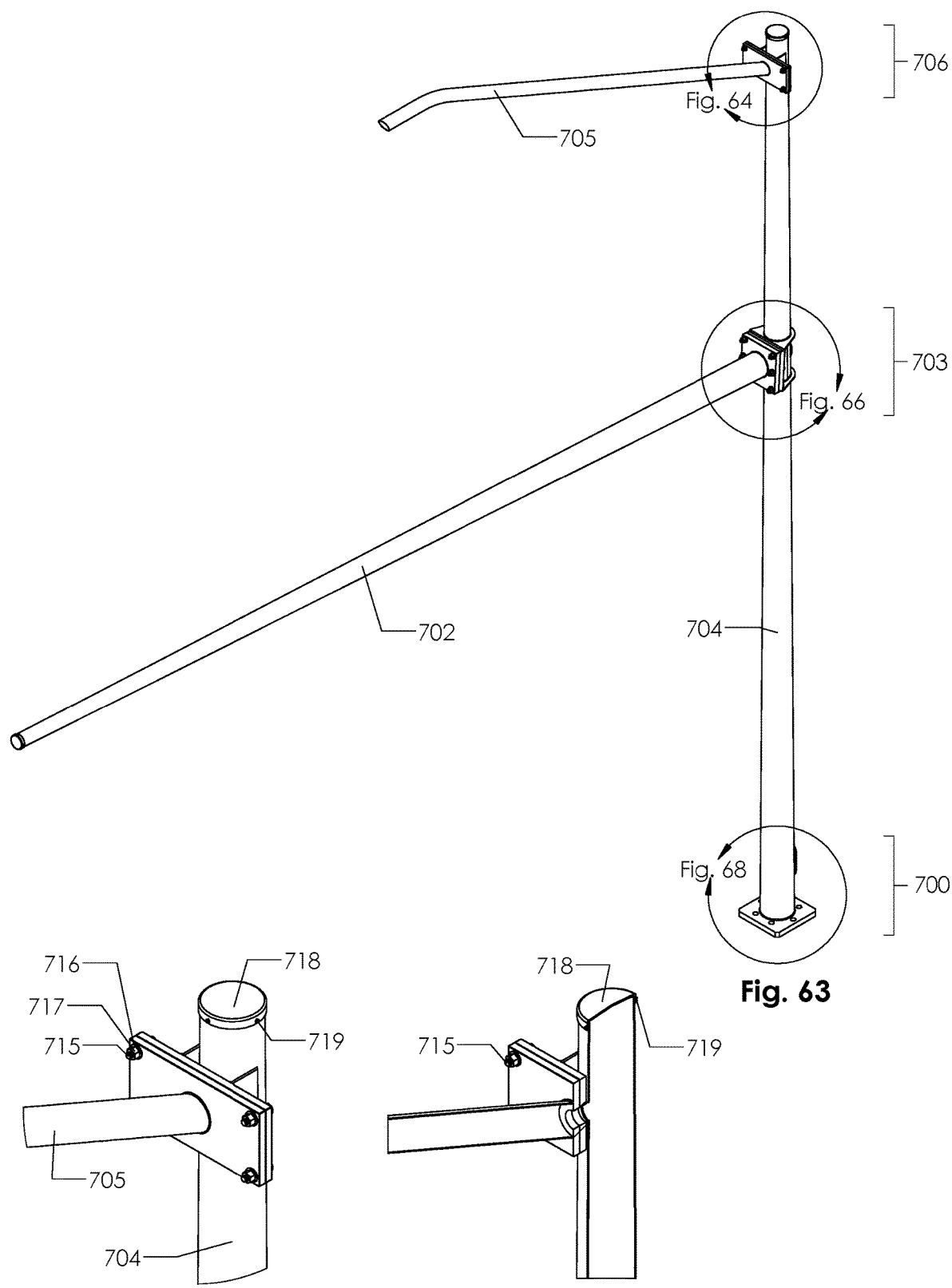
FIG. 63 is a prior art depiction of a perspective view of a traditional sign, traffic signal, and luminaire support structural system.
FIG. 64 is a prior art depiction of a perspective view of the luminaire to pole connection for a traditional sign, traffic signal, and luminaire support structural system.
FIG. 65 is a prior art depiction of a cross section cut through the luminaire to pole connection for a traditional sign, traffic signal, and luminaire support structural system.

FIGS. 30 and 32 illustrate the mast arm to pole junction assembly 405. This junction assembly 405 is the same as assembly 402 described in Exemplary Embodiment 2 except that 405 has a vertical pole extension extending upward from the mast arm connector casting 268. The bottom 281 of a tapered vertical extension pole 279 is sleeved and threaded rod connected to the upper vertical portion (or vertical extension portion) 270 of casting 268. The threaded rod 283 passes through holes 278 and 282. After installing the threaded rod 283, washers 285, and high strength nuts 284 are installed using the methods described previously for sleeved connections.

FIG. 30 also shows the distal end 322 of the luminaire arm, the luminaire arm cap 327, and screws 328 to secure the cap in place.

Casting 268 is further comprised of a spherical portion 271, a lower vertical portion 269, a horizontal portion 272, and a flange 276 with bolt holes 277. These four portions, along with the upper vertical portion 270, are connected via structurally optimized exterior and interior fillets 274 and 275 to reduce stress concentrations and improve fatigue resistance.

Figure 29:
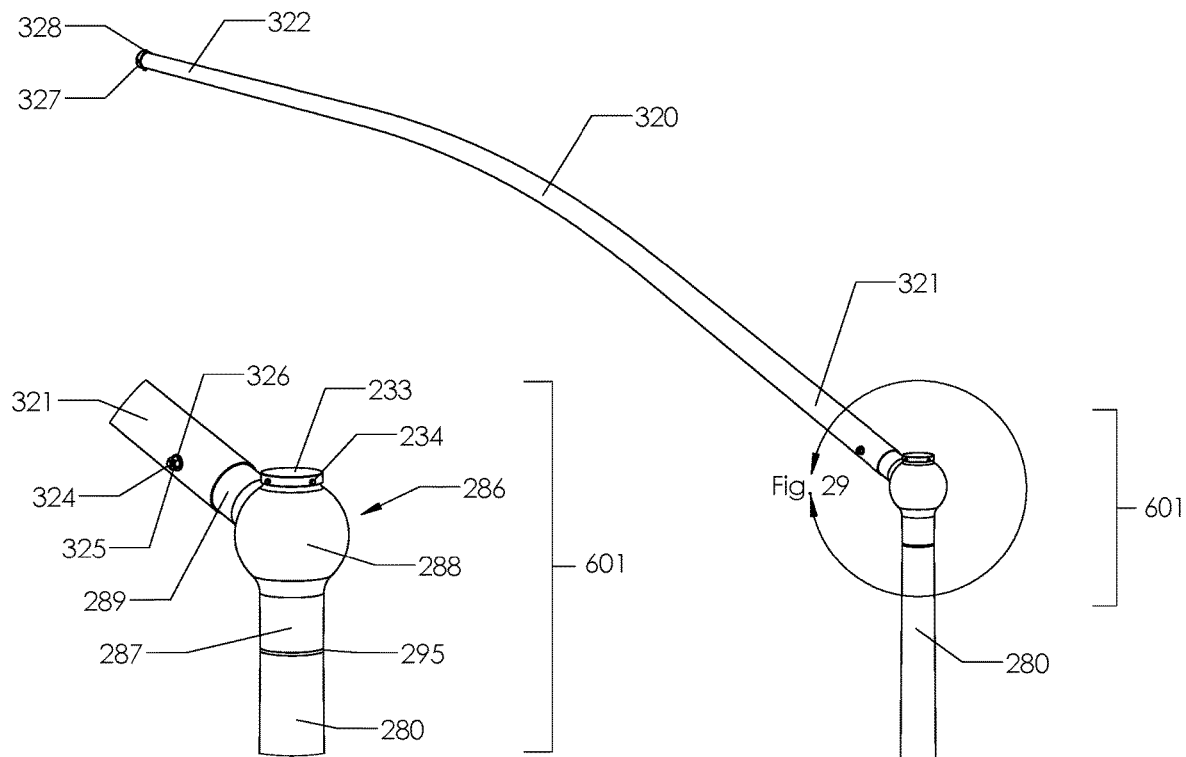
FIG. 29 is a perspective view of the junction between the luminaire arm and the vertical pole extension used in Exemplary Embodiment 5.
Figure 31:
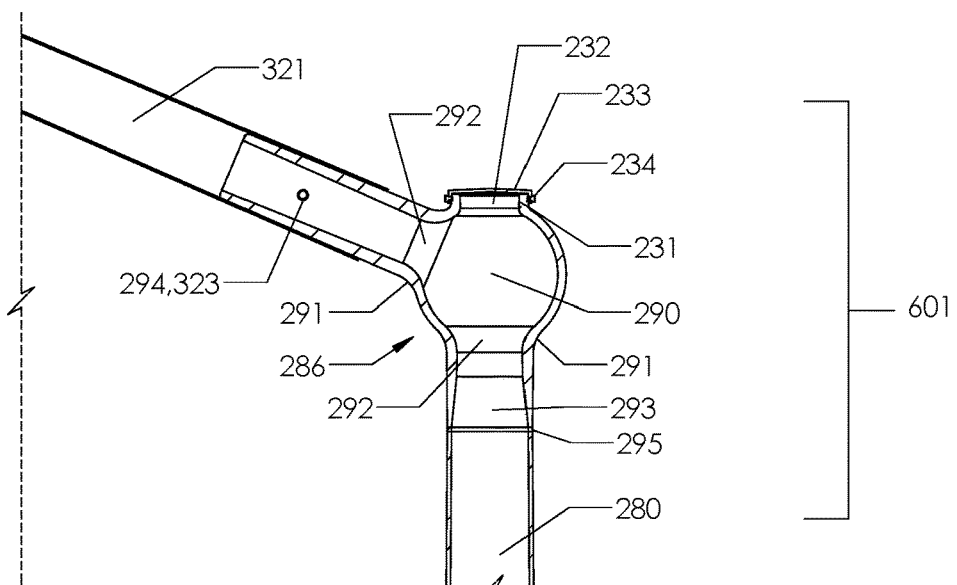
FIG. 31 is a cross section cut through the junction between the luminaire arm and vertical pole extension used in Exemplary Embodiments 5 and 6.

FIGS. 29 and 31 illustrate the luminaire arm to vertical pole junction assembly 601. The major components used in this junction include the top 280 of the tapered extension pole 279, a tapered, sleeved and bolted luminaire arm 320, and a luminaire connector casting 286. The proximal end of the tapered luminaire arm 321 is sleeved over the angled portion 289 of casting 286 and bolted using high strength threaded rod 324, washers 326, and high strength nuts 325. The threaded rod passes through holes 294 and 323. The vertical portion 287 of the luminaire connector casting 286 is connected to 280 using a CJP weld 295 ground smooth to adjacent surfaces.

Casting 286 is further comprised of a spherical portion 288 that is connected to vertical portion 287 and angled portion 289 using structurally optimized exterior and interior fillets 291 and 292, respectively. A bevel 293 is machined into the interior wall of casting 286 to facilitate the weld process and to improve the flow of stress between mated parts. This also results in a better detail for fatigue resistance. Bevel 293 is also used in the bottom of casting 304 for the same reasons mentioned previously.

Exemplary Embodiment 6

A sixth embodiment is shown in FIGS. 37 through 41. The major components used in Exemplary Embodiment 6 include one pole connector casting 203, a prismatic pole 211, a mast arm connector casting 296, one tapered, sleeved and bolted mast arm 243, one tapered vertical extension pole 279, one luminaire connector casting 286, and one tapered (straight or curved) luminaire arm 320.

The primary difference between Exemplary Embodiments 5 and 6 can be seen at the mast arm to pole junction assembly. Junction assembly 406 is similar to junction assembly 403 from Exemplary Embodiment 3, except that 406 has a vertical pole extension upward from the mast arm connector casting 296. The bottom 281 of a tapered vertical extension pole 279 is sleeved and connected via threaded rod to the upper vertical portion 298 of casting 296.

Casting 296 is further comprised of a lower vertical portion 297, a spherical portion 299, and a horizontal portion 300. Exterior and interior fillets 302 and 303, respectively, connect the various portions of the casting in such a way that geometric discontinuity is minimized thereby increasing fatigue resistance.

Exemplary Embodiment 7

A seventh embodiment is shown in FIGS. 42 through 46. The major components used in Exemplary Embodiment 7 include one pole connector casting 203, a prismatic pole 211, a mast arm connector casting 296, one tapered, sleeved and bolted mast arm 243, one tapered vertical extension pole 279, one luminaire connector casting 304, and two tapered (straight or curved) luminaire arms 320.

The primary difference between Exemplary Embodiments 6 and 7 can be seen at the luminaire arm to pole junction assembly. Junction assembly 602 is the substantially the same as junction assembly 601, except that 602 has two luminaire arms being supported by the luminaire arm connector casting. In embodiments, the two luminaire arms 320 form an angle of between about 90° and 180° around the longitudinal axis of the pole 211.

Casting 304 is comprised of a lower vertical portion 306, a spherical portion 305, and two angled (or canted upward) portions 308. It should be noted that angled portions 308 can be sized differently from one side of the casting to the other to accommodate different luminaire arm proximal end diameters. It should also be noted that angled portions 308 can be angled differently from one side of the casting to the other, and the angled portions 308 may also be angled the same or differently from the mast arm 243. Exterior and interior fillets 310 and 311, respectively, connect the various portions of the casting in such a way that geometric discontinuity is minimized thereby increasing fatigue resistance.

Exemplary Embodiment 8

An eighth embodiment is shown in FIGS. 47 through 51. The major components used in Exemplary Embodiment 8 include one pole connector casting 203, a prismatic pole 211, a mast arm connector casting 312, two tapered, sleeved and bolted mast arms 243, one tapered vertical extension pole 279, one luminaire connector casting 304, and two tapered (straight or curved) luminaire arms 320. In embodiments, the two luminaire arms 320 form an angle of between about 90° and 180° around the longitudinal axis of the pole 211. Further, in embodiments, the two mast arms 243 form an angle of between about 90° and 180° around the longitudinal axis of the pole 211. In embodiments, the angled portions 308 and/or mast arms 243 can be sized differently from one side of the casting to the other to accommodate different luminaire arm and/or mast arm proximal end diameters. Additionally, the angled portions 308 and/or mast arms 243 may be angled differently from one side of the casting to the other, and the angled portion 308 may also be angled the same or differently from the mast arm 243 located on its side.

The primary difference between Embodiments 4 and 8 can be seen at the mast arm to pole junction assembly. Junction assembly 407 is substantially the same as junction assembly 404, except that 407 has a vertical pole extension upward from the mast arm connector casting 312. The bottom 281 of the tapered vertical extension pole 279 is sleeved and threaded rod connected to the upper vertical portion 314 of casting 312.

Casting 312 is further comprised of a lower vertical portion 313, a spherical portion 315, and horizontal portions 316. Exterior and interior fillets 318 and 319, respectively, connect the various portions of the casting in such a way that geometric discontinuity is minimized thereby increasing fatigue resistance.

Exemplary Embodiments 9 and 10

A ninth embodiment and a tenth embodiment are shown in FIGS. 52 through 59. The major components common between both embodiments include existing tapered mast arms 342, existing vertical poles with built up plate connections 343, high strength bolts 219, nuts 220, and washers 221. Embodiment 9 (FIGS. 52 through 55) uses a welded retrofit casting 329 while Embodiment 10 (FIGS. 56 through 59) uses a sleeved and bolted retrofit casting 336.

Casting 329 is further comprised of a flange 330 with bolt holes 331, interior and exterior fillets 332 and 333, an end bevel 334, and a through hole 335 to facilitate a hollow structure. Similarly, casting 336 is comprised of a flange 337 with bolt holes 338, interior and exterior fillets 339 and 340, and a through hole 341. Casting 336 also includes holes 259 for high strength threaded rod to pass through.

The mast arm to pole junction assemblies 408 and 409 illustrate potential retrofit options for structures found to have damaged mast arms at some point during their service life. Retrofit castings 329 and 336 can be sized to fit a cleanly cut proximal end of an existing mast arm. It should be noted that six bolt holes are shown in the flanges of each retrofit casting. The actual number of bolt holes will depend on the existing built-up connection used at the top of the existing pole. The number of bolt holes and the dimensions of the flange plates used in retrofit castings 329 and 336 can be modified to match the built-up connection plates used at the mast arm to pole connection locations on existing poles.

REFERENCES

AASHTO (2014). LRFD Bridge Design Specifications, Seventh Edition, American Association of State Highway and Transportation Officials, Washington, D.C. These specifications are incorporated herein by reference in their entirety.

AASHTO (2015a). LRFD Specifications for Structural Supports for Highway Signs, Luminaires, and Traffic Signals, First Edition, American Association of State Highway and Transportation Officials, Washington, D.C. These specifications are incorporated herein by reference in their entirety.

AASHTO (2015b). LRFD Specifications for Structural Supports for Highway Signs, Luminaires, and Traffic Signals, Sixth Edition with 2015 Revisions, American Association of State Highway and Transportation Officials, Washington, D.C. These specifications are incorporated herein by reference in their entirety.

Christopher M. Foley, Scott J. Ginal, John L. Peronto, Raymond A. Fournelle, Structural Analysis of Sign Bridge Structures and Luminaire Supports, Research Report WHRP 04-03, Wisconsin Highway Research Program, March, 2004. This reference is incorporated herein by reference in its entirety.

Christopher M. Foley, Joseph A. Diekfuss, Baolin Wan, Fatigue Risks in the Connections of Sign Support Structures, Research Report WHRP 0092-09-07, Wisconsin Highway Research Program, February, 2013. This reference is incorporated herein by reference in its entirety.

Christopher M. Foley, Joseph A. Diekfuss, "Reliability-Based Inspection Protocols for Mast-Arm Sign Support Structures", Journal of Structural Engineering, Volume 142, Number 7, American Society of Civil Engineers, Reston, Va., 2016. This reference is incorporated herein by reference in its entirety.

Joseph A. Diekfuss, Christopher M. Foley, "Detail Categories for Reliability-Based Fatigue Evaluation of Mast-Arm Sign Support Structures", Journal of Structural Engineering, Volume 142, Number 7, American Society of Civil Engineers, Reston, Va., 2016a. This reference is incorporated herein by reference in its entirety.

Joseph A. Diekfuss, Christopher M. Foley, "Modeling Error Uncertainty Characterization for Reliability-Based Fatigue Assessment in Sign Support Structures", Journal of Structural Engineering, Volume 142, Number 7, American Society of Civil Engineers, Reston, Va., 2016b. This reference is incorporated herein by reference in its entirety.

Sougata Roy, Y. C. Park, Richard Sause, John W. Fisher, Eric J. Kaufmann, Cost-Effective Connection Details for Highway Sign, Luminaire, and Traffic Signal Structures, Research Report NCHRP Project 10-70, Web-Only Document 176, National Cooperative Research Program, Transportation Research Board, March, 2011. This reference is incorporated herein by reference in its entirety.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A traffic signal or sign support assembly, comprising:
   a vertical pole having a first end and a second end, the first end being configured to be fixed to a foundation;
   a mast arm having a third end and a fourth end;
   a cast steel pole junction configured to connect the third end of the mast arm to the second end of the pole to fix the mast arm to the vertical pole at an angle of between 75° to about 125° relative to the pole; and
   a base junction configured to fix the first end of the vertical pole to the foundation for the assembly.

2. The assembly of claim 1, wherein the base junction is fabricated from cast steel.

3. The assembly of claim 2, wherein the cast steel pole junction includes at least first and second cast steel portions and a plurality of bolts fastening the first cast steel portion to the second cast steel portion.

4. The assembly of claim 2, wherein the vertical pole has a hollow cross-section and is fabricated from steel, and the vertical pole is welded to the base junction.

5. The assembly of claim 1, further comprising a vertical mast pole, wherein the vertical pole and the mast pole each have longitudinal axes wherein the cast steel pole junction is further configured to connect the mast pole to the vertical pole such that the longitudinal axes are substantially parallel, the assembly further comprising a cast steel mast junction configured to attach at least one mast arm to the mast pole.

6. The assembly of claim 1, wherein the third end of the mast arm has a hollow cross-section of a first predefined shape and the cast steel pole junction includes a first extension having a cross-section having an exterior shape substantially the same as the first predefined shape such that the third end of the mast slides over the first extension to form a friction fit between the third end and the first extension.

7. The assembly of claim 6, wherein the first predefined shape is circular.

8. The assembly of claim 6, wherein the second predefined shape is circular.

9. The assembly of claim 1, wherein the second end of the vertical pole has a hollow cross-section of a second predefined shape and the cast steel pole junction includes a second extension at an angle to the first extension and having a cross-section having an exterior shape substantially the same as the second predefined shape such that the second end of the vertical pole slides over the second extension to form a friction fit between the second end and the second extension.

10. A traffic signal or sign support structure, comprising:
    a pole having a first end and a second end, the first end being configured to be mounted to a foundation;
    a mast arm arranged at an angle of between about 75° to about 125° relative to the pole, the mast arm having a third end and a fourth end; and
    a pole junction assembly including a first portion that extends from the second end of the pole along a first longitudinal axis of the pole, the first portion including a first plate configured to connect the third end of the mast arm to the second end of the pole, the assembly further including a second portion including a connection portion, the third end of the mast arm being sleeved around the connection portion such that the second portion extends from the third end of the mast arm along a second longitudinal axis of the mast arm, the second portion including a second plate;
    wherein the mast arm and the pole are each joined to the pole junction assembly in an area of geometric continuity,
    the first plate and the second plate are connected via a plurality of bolts; and
    the second end of the pole is welded to the first portion and the third end of the mast arm is welded to the second portion, each of the welds being a complete joint penetration weld ground smooth to an adjacent surface.

11. The traffic signal or sign support structure of claim 10, further comprising a base including a transverse plate, a pole attachment portion, and a fillet in the transition between the pole attachment portion and the transverse plate, and wherein the base is configured to mount the first end of the pole to the foundation via a plurality of bolts extending through the transverse plate and into the foundation.

12. A traffic signal or sign support structure, comprising:
a pole having a first end and a second end, the first end being configured to be mounted to a foundation;
a mast arm arranged at an angle of between about 75° to about 125° relative to the pole, the mast arm having a third end and a fourth end; and
a pole junction assembly configured to connect the third end of the mast arm to the second end of the pole;
the pole junction assembly including
a first casting, having:
a first flange arranged perpendicularly to a longitudinal axis defined by the pole; and
a first portion that extends from the first flange along the longitudinal axis towards the second end of the pole; and
a second casting, comprising:
a second flange arranged perpendicularly to the longitudinal axis;
a second portion that extends from the first flange along the longitudinal axis and away from the second end of the pole;
a first spherical portion extending from the second portion; and
a mast arm attachment portion extending from the spherical portion at a first angle transverse to the longitudinal axis;
wherein the mast arm and the pole are each joined to the pole junction assembly in an area of geometric continuity, the first flange of the first casting is joined to the second flange of the second casting with a plurality of bolts, and
the third end of the mast arm is joined to the second casting with a complete joint penetration weld ground smooth to an adjacent surface.

13. The traffic signal or sign support structure of claim 12, wherein the mast arm attachment portion of the second casting comprises a first beveled edge that reduces a first wall thickness of the mast arm attachment portion to a second wall thickness of the third end of the mast arm.

14. The traffic signal or sign support structure of claim 13, wherein the first portion of the first casting comprises a second beveled edge that reduces a third wall thickness of the first portion to a fourth wall thickness of the second end of the pole; and
wherein the first casting is joined to the second end of the pole with a complete joint penetration weld ground smooth to an adjacent surface.

15. The traffic signal or sign support structure of claim 12, wherein the second casting further comprises an extension pole attachment portion extending from the first spherical portion along the longitudinal axis; and
wherein the traffic signal or sign support structure further comprises:
an extension pole having a fifth end and a sixth end, the fifth end being sleeved over the extension pole attachment portion of the second casting;
a luminaire connector casting, comprising:
a third vertical portion connected to the sixth end of the vertical extension pole;
a second spherical portion extending from the third vertical portion; and
a first angled extension portion extending from the second spherical portion at a second angle transverse to the longitudinal axis; and a first luminaire mast arm having a seventh end and an eighth end, the seventh end being sleeved over the angled extension portion;
wherein the first luminaire mast arm is secured to the first angled extension portion with a threaded rod and nuts, the threaded rod being inserted through the seventh end of the first luminaire mast arm and through the first angled extension portion and the nuts being threaded onto opposite ends of the threaded rod.

16. The traffic signal or sign support structure of claim 15, wherein the luminaire connector casting further comprises a second angled extension portion extending from the second spherical portion at a third angle transverse to the longitudinal axis; and
wherein the traffic signal or sign support structure further comprises a second luminaire mast arm having a ninth end and a tenth end, the ninth end being sleeved over the second angled extension portion.

17. The traffic signal or sign support structure of claim 16, wherein the second angle is the same as the third angle and wherein the first angle is less than the second angle.

18. A traffic signal or sign support structure, comprising:
a pole having a first end and a second end, the first end being configured to be mounted to a foundation;
a mast arm arranged at an angle of between about 75° to about 125° relative to the pole, the mast arm having a third end and a fourth end; and
a cast steel pole junction assembly configured to connect the third end of the mast arm to the second end of the pole;
wherein the pole junction assembly includes;
a first portion extending from the second end of the pole along a longitudinal axis defined by the pole;
a first spherical portion extending from the first portion; and
a first mast arm attachment portion extending from the first spherical portion at a first angle transverse to the first portion;
wherein the mast arm and the pole are each joined to the pole junction assembly in an area of geometric continuity, and the third end of the mast arm is sleeved over the first mast arm attachment portion;
wherein the first mast arm attachment portion includes at least a first set of holes, the first set of holes including a first hole and a second hole arranged diametrically;
wherein the third end of the mast arm includes at least a second set of holes, including a third hole and a fourth hole arranged diametrically; and
wherein a threaded rod is inserted through the first hole, the second hole, the third hole, and the fourth hole and secured on opposite ends by nuts tightened against the third end of the mast arm.

19. The traffic signal or sign support structure of claim 18, wherein the first portion of the pole junction assembly comprises a beveled edge that reduces a first wall thickness of the first portion to a second wall thickness of the second end of the pole; and
wherein the first portion is joined to the second end of the pole with a complete joint penetration weld ground smooth to an adjacent surface.

20. The traffic signal or sign support structure of claim 18, wherein the pole junction assembly further comprises a second mast arm attachment portion configured to connect a second mast arm to the pole, the second mast arm comprising a fifth end and a sixth end; and
wherein the fifth end of the mast arm is sleeved over the second mast arm attachment portion.

21. The traffic signal or sign support structure of claim 20, wherein the first mast arm and the second mast arm form an angle of between about 90° and 180° around the longitudinal axis.

22. The traffic signal or sign support structure of claim 18, wherein the pole junction assembly further comprises an extension pole attachment portion extending from the first spherical portion along the longitudinal axis; and
wherein the traffic signal or sign support structure further comprises:
an extension pole having a fifth end and a sixth end, the fifth end being sleeved over the extension pole attachment portion of the pole junction assembly;
a luminaire connector casting, comprising:
a second portion connected to the sixth end of the extension pole;
a second spherical portion extending from the second portion; and
a first angled extension portion extending from the second spherical portion at a second angle transverse to the longitudinal axis; and
a first luminaire mast arm having a seventh end and an eighth end, the seventh end being sleeved over the angled extension portion;
wherein the first luminaire mast arm is secured to the first angled extension portion with a threaded rod and nuts, the threaded rod being inserted through the seventh end of the first luminaire mast arm and through the first angled extension portion and the nuts being threaded onto opposite ends of the threaded rod.

23. The traffic signal or sign support structure of claim 22, wherein the luminaire connector casting further comprises a second angled extension portion extending from the second spherical portion at a third angle transverse to the longitudinal axis; and
wherein the traffic signal or sign support structure further comprises a second luminaire mast arm having a ninth end and a tenth end, the ninth end being sleeved over the second angled extension portion.

24. The traffic signal or sign support structure of claim 23, wherein the first luminaire mast arm and the second luminaire mast arm form an angle of between about 90° and 180° around the longitudinal axis.

25. The traffic signal or sign support structure of claim 22, wherein the second portion of the luminaire connector casting comprises a beveled edge that reduces a first wall thickness of the second portion to a second wall thickness of the sixth end of the extension pole, and wherein the luminaire connector casting is joined to the sixth end of the extension pole with a complete joint penetration weld ground smooth to an adjacent surface.

26. A traffic signal or sign support structure, comprising:
a pole having a first end and a second end, the first end being configured to be mounted to a foundation;
a mast arm arranged at an angle of between about 75° to about 125° relative to the pole, the mast arm having a third end and a fourth end;
a pole junction assembly configured to connect the third end of the mast arm to the second end of the pole, wherein the mast arm and the pole are each joined to the pole junction assembly in an area of geometric continuity; and
a casting including;
a flange arranged perpendicularly to a longitudinal axis defined by the pole; and
a portion that extends from the flange along the longitudinal axis towards the first end of the pole;
wherein the portion is joined to the first end of the pole with a complete joint penetration weld ground smooth to an adjacent surface, and
a plurality of anchor rods are inserted through the flange into the foundation to anchor the pole to the foundation.

27. A traffic signal or sign support structure, comprising:
a pole having a first end and a second end, the first end being configured to be mounted to a foundation;
a mast arm arranged at an angle of between about 75° to about 125° relative to the pole, the mast arm having a third end and a fourth end; and
a pole junction assembly configured to connect the third end of the mast arm to the second end of the pole,
wherein the mast arm and the pole are each joined to the pole junction assembly in an area of geometric continuity the pole junction including:
a connection plate having a first side and a second side,
two stiffening rings extending from the first side of the connection plate around the pole, each of the two stiffening rings being welded to the pole,
a flange having a third side and a fourth side, the third side of the flange facing the second side of the connection plate, and
an extension portion extending from the fourth side of the flange;
wherein the flange is connected to the connection plate with a plurality of bolts, and
the third end of the mast arm is joined to the extension portion with a complete joint penetration weld ground smooth to an adjacent surface.

28. A traffic signal or sign support structure, comprising:
a pole having a first end and a second end, the first end being configured to be mounted to a foundation;
a mast arm arranged at an angle of between about 75° to about 125° relative to the pole, the mast arm having a third end and a fourth end; and
a pole junction assembly configured to connect the third end of the mast arm to the second end of the pole;
wherein the mast arm and the pole are each joined to the pole junction assembly in an area of geometric continuity, wherein the pole junction includes:
a connection plate having a first side and a second side,
two stiffening rings extending from the first side of the connection plate around the pole, each of the two stiffening rings being welded to the pole,
a flange having a third side and a fourth side, the third side of the flange facing the second side of the connection plate, and
an extension portion extending from the fourth side of the flange;
wherein the third end of the mast arm is sleeved over the extension portion,
the extension portion includes at least a first set of holes, the first set of holes including a first hole and a second hole arranged diametrically,
the third end of the mast arm includes at least a second set of holes, including a third hole and a fourth hole arranged diametrically, and
a threaded rod is inserted through the first hole, the second hole, the third hole, and the fourth hole and secured on opposite ends by nuts tightened against the third end of the mast arm.

* * * * *